US012598571B2

(12) United States Patent
Kim et al.

(10) Patent No.: US 12,598,571 B2
(45) Date of Patent: Apr. 7, 2026

(54) METHOD AND APPARATUS FOR ACTIVATING OR DEACTIVATING CELL GROUP IN NEXT-GENERATION WIRELESS COMMUNICATION SYSTEM

(71) Applicant: Samsung Electronics Co., Ltd., Gyeonggi-do (KR)

(72) Inventors: Donggun Kim, Gyeonggi-do (KR); Jaehyuk Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 457 days.

(21) Appl. No.: 18/090,859

(22) Filed: Dec. 29, 2022

(65) Prior Publication Data

US 2023/0217398 A1 Jul. 6, 2023

(30) Foreign Application Priority Data

Dec. 29, 2021 (KR) ........................ 10-2021-0191112
Jan. 20, 2022 (KR) ........................ 10-2022-0008771

(51) Int. Cl.
H04W 56/00 (2009.01)
H04W 24/08 (2009.01)
H04W 76/20 (2018.01)

(52) U.S. Cl.
CPC ......... H04W 56/005 (2013.01); H04W 24/08 (2013.01); H04W 76/20 (2018.02)

(58) Field of Classification Search
CPC ... H04W 56/005; H04W 24/08; H04W 76/20; H04W 56/0045; H04W 76/15;

(Continued)

(56) References Cited

U.S. PATENT DOCUMENTS 11,924,747 B2 * 3/2024 Kim ...................... H04W 76/15
12,132,672 B2 * 10/2024 Park ................. H04W 28/0278
(Continued)

FOREIGN PATENT DOCUMENTS

CN 113840320 A * 12/2021 ........ H04W 36/0088
EP 4 258 731 10/2023
(Continued)

OTHER PUBLICATIONS

ZTE Corporation, Sanechips, "Introduction of SCG Deactivation and Activation", R2-2111635, 3GPP TSG-RAN WG2 Meeting #116-e, Nov. 1-12, 2021, 26 pages (Year: 2021).*

(Continued)

*Primary Examiner* — Ayaz R Sheikh
*Assistant Examiner* — Louis Samara
(74) *Attorney, Agent, or Firm* — The Farrell Law Firm, P.C.

(57) ABSTRACT

The disclosure relates to a 5G or 6G communication system for supporting a higher data transmission rate. Provided is a method performed by a terminal in a wireless communication system that includes receiving a radio resource control (RRC) message including information associated with a deactivation of a secondary cell group (SCG), and resetting a medium access control (MAC) of the SCG based on the RRC message, with a timing alignment timer (TAT) associated with the SCG not being stopped for resetting the MAC of the SCG.

12 Claims, 17 Drawing Sheets

(58) Field of Classification Search
CPC ... H04W 76/34; H04W 76/30; H04W 74/002;
H04W 36/0088
See application file for complete search history.

(56) References Cited

U.S. PATENT DOCUMENTS

| | | | | |
|---|---|---|---|---|
| 2017/0332408 | A1* | 11/2017 | Dinan ................. | H04W 74/002 |
| 2020/0351968 | A1 | 11/2020 | Yilmaz et al. | |
| 2020/0412437 | A1* | 12/2020 | Cirik ................. | H04W 56/0045 |
| 2021/0013951 | A1* | 1/2021 | Chen .................... | H04W 76/19 |
| 2021/0281552 | A1 | 9/2021 | Van Der Velde et al. | |
| 2021/0410181 | A1* | 12/2021 | Jeon .................. | H04W 52/0258 |
| 2022/0132333 | A1* | 4/2022 | Mattam ................. | H04L 5/0035 |
| 2022/0140884 | A1* | 5/2022 | Shi ........................ | H04W 24/10 |
| | | | | 370/329 |
| 2023/0217525 | A1* | 7/2023 | Kim .................. | H04W 28/0263 |
| | | | | 370/329 |
| 2023/0337020 | A1* | 10/2023 | Da Silva ................ | H04B 7/088 |
| 2024/0008115 | A1* | 1/2024 | Wu ........................ | H04W 76/15 |
| 2024/0064785 | A1* | 2/2024 | Tsuboi .................. | H04W 76/27 |

FOREIGN PATENT DOCUMENTS

| | | | | |
|---|---|---|---|---|
| EP | 4 398 672 | 7/2024 | | |
| KR | 20190143782 A | * 12/2019 | ............ | H04W 76/27 |
| WO | WO-2019184629 A1 | * 10/2019 | ............. | H04L 5/001 |
| WO | WO 2019/216805 | 11/2019 | | |

OTHER PUBLICATIONS

J. Xin, H. Zhang, S. Xu and S. Xiong, "Efficient Activation and Deactivation in MR-DC," 2021 IEEE Conference on Telecommunications, Optics and Computer Science (TOCS), Shenyang, China, 2021 (Year: 2021).*

J. Xin, H. Zhang, S. Xu and S. Xiong, "Efficient Activation and Deactivation in MR-DC," 2021 IEEE Conference on Telecommunications, Optics and Computer Science (TOCS), Shenyang, China, 2021, pp. 106-109, doi: 10.1109/TOCS53301.2021. (Year: 2021).*

Vice Chairman (Nokia), "Report on LTE Legacy, 71 GHz, DCCA, Multi-SIM and RAN Slicing", R2-2111291, 3GPP TSG-RAN WG2 Meeting #116 Electronic, Nov. 2021, 69 pages.

ETSI MCC, "Report of 3GPP TSG RAN WG2 Meeting #116-e, Online", R2-22xxxxx, 3GPP TSG-RAN WG2 Meeting #116bis-e, Nov. 1-12, 2021, 379 pages.

European Search Report dated Nov. 22, 2024 issued in counterpart application No. 22916784.6-1215, 12 pages.

3GPP TS 38.323 V16.5.0, 3GPP, 3rd Generation Partnership Project; Technical Specification Group Radio Access Network; NR; Packet Data Convergence Protocol (PDCP) Specification (Release 16), Sep. 2021, 40 pages.

3GPP TS 38.321 V16.7.0, 3GPP, 3rd Generation Partnership Project; Technical Specification Group Radio Access Network; NR; Medium Access Control (MAC) Protocol Specification (Release 16), Dec. 2021, 158 pages.

Samsung, [AT116-3][221][R17 DCCA] UP Issues for SCG Deactivation (Samsung), R2-2111314, 3GPP TSG-RAN WG2 #116e, Nov. 1-12, 2021, 20 pages.

Samsung, [AT115-e][220][R17 DCCA] Bearer Handling of SCG Deactivation (Samsung), R2-2108862, 3GPP TSG-RAN WG2 #115e, Aug. 16-27, 2021, 22 pages.

ZTE Corporation, Sanechips, "Introduction of SCG Deactivation and Activation", R2-2111635, 3GPP TSG-RAN WG2 Meeting #116-e, Nov. 1-12, 2021, 26 pages.

Samsung, "[AT116-e][221][R17 DCCA] UP Issues for SCG Deactivation (Samsung)", R2-2111314, 3GPP TSG-RAN WG2 #116e, Nov. 1-12, 2021, 20 pages.

International Search Report dated Mar. 31, 2023 issued in counterpart application No. PCT/KR2022/021581, 7 pages.

* cited by examiner

FIG. 16

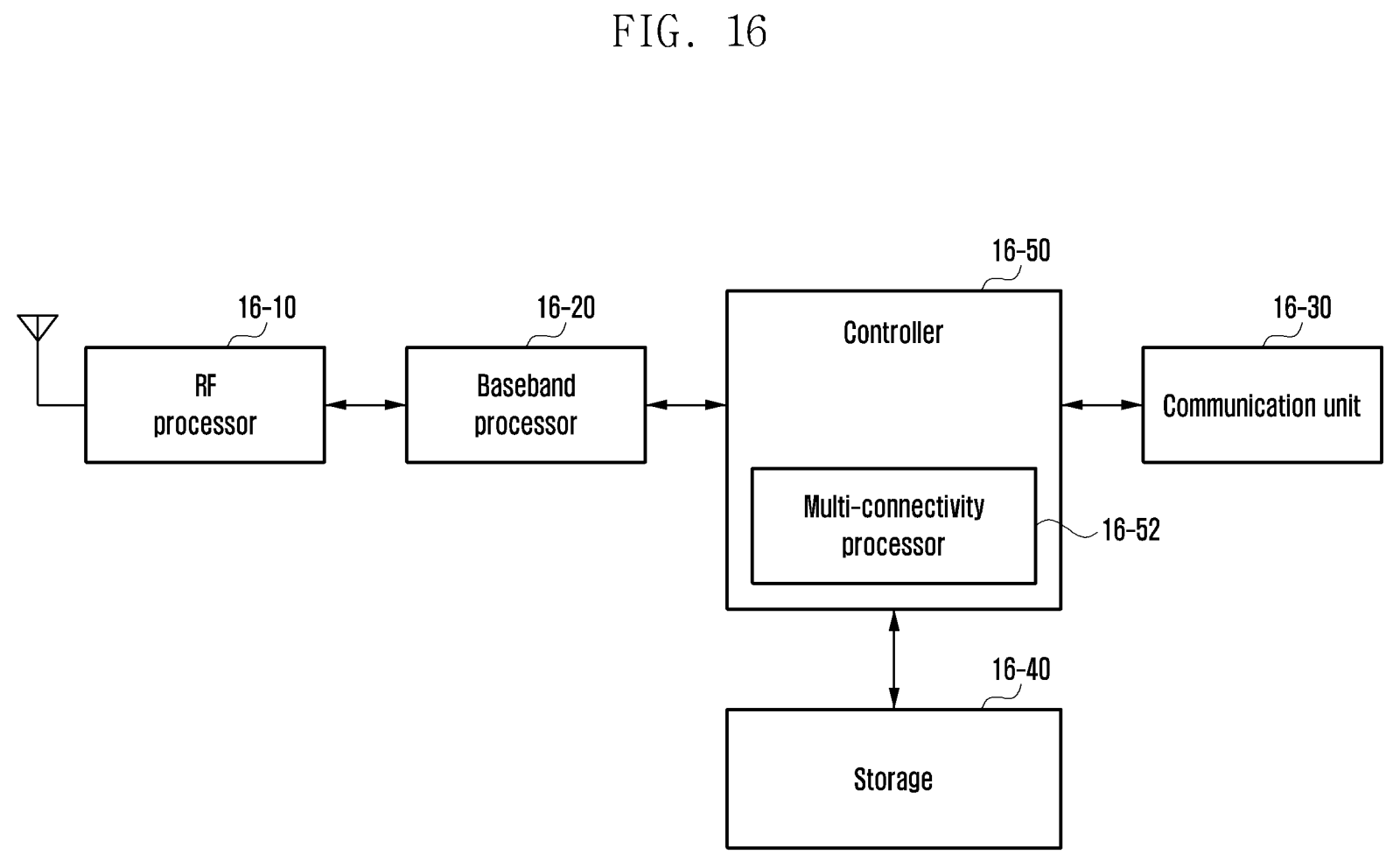

16-30
Communication unit 16-50
Controller 16-52
Multi-connectivity processor 16-40
Storage 16-20
Baseband processor 16-10
RF processor

METHOD AND APPARATUS FOR ACTIVATING OR DEACTIVATING CELL GROUP IN NEXT-GENERATION WIRELESS COMMUNICATION SYSTEM

CROSS-REFERENCE TO RELATED APPLICATION(S)

This application is based on and claims priority under 35 U.S.C. § 119 to Korean Patent Application Nos. 10-2021-0191112 and 10-2022-0008771, which were filed in the Korean Intellectual Property Office on Dec. 29, 2021, and Jan. 20, 2022, respectively, the entire disclosure of each which is herein incorporated by reference.

BACKGROUND

1. Field

The disclosure relates generally to a method and an apparatus that activate a cell in a next-generation wireless communication system and, more specifically, to a method and an apparatus for supporting activation or deactivation of a cell group in a next-generation wireless communication system.

2. Description of Related Art

Fifth generation (5G) mobile communication technologies define broad frequency bands such that high transmission rates and new services are possible, and can be implemented in sub 6 GHz bands such as 3.5 GHz, and in above 6 GHz bands referred to as mmWave including 28 GHz and 39 GHz. In addition, it has been considered to implement sixth generation (6G) mobile communication technologies (referred to as beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer (PHY) standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN), which is UE-satellite direct communication for providing coverage in an area in which communication with terrestrial networks is unavailable, and positioning.

There has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access channel (RACH) procedures (2-step RACH for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks. Thus, it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Further, such development of 5G mobile communication systems will serve as a basis for developing new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

A next-generation wireless communication system may use carrier aggregation (CA) technology or dual connectivity (DC) technology to provide a terminal with a service having a high data rate and low latency. However, there is a demand for a method for preventing a processing delay that may occur when CA technology or DC technology is configured and activated for a terminal connected to a network, or is deactivated after CA technology or DC technology is used. In particular, if multiple cells maintain an activated state with respect to a terminal so as to use CA technology or DC technology, the terminal must perform physical downlink (DL) control channel (PDCCH) monitoring for each of the cells, thereby significantly increasing power consumption of the terminal. On the other hand, when the multiple cells maintain deactivated to decrease power consumption of the terminal and CA technology or DC technology is used, latency occurs when activating the multiple cells, such that a delay may occur in data transmission and reception.

SUMMARY

The disclosure has been made to address at least the above-mentioned problems and/or disadvantages, and to provide at least the advantages described below.

An aspect of the disclosure is to provide a method for detecting and recovering a beam failure resulting from a channel state change signals in a wireless communication system.

In accordance with an aspect of the disclosure, a method performed by a terminal in a wireless communication system is provided. The method includes receiving a radio resource control (RRC) message including information associated with deactivation of a secondary cell group (SCG) and resetting a medium access control (MAC) of the SCG based on the RRC message, with a timing alignment timer (TAT) associated with the SCG continuing to run regardless of reset of the MAC of the SCG.

In accordance with another aspect of the disclosure, a terminal in a wireless communication system is provided. The method includes a transceiver and a controller configured to receive an RRC message including information associated with deactivation of an SCG, and to reset a MAC of the SCG based on the RRC message, with a TAT associated with the SCG continuing to run regardless of reset of the MAC of the SCG.

BRIEF DESCRIPTION OF THE DRAWINGS

The above and other aspects, features, and advantages of certain embodiments will be more apparent from the following description taken in conjunction with the accompanying drawings, in which:

FIG. 16 illustrates a base station according to an embodiment.

DETAILED DESCRIPTION

Hereinafter, various embodiments of the disclosure will be described in detail with reference to the accompanying drawings.

In the following description of the disclosure, a detailed description of known functions or configurations incorporated herein will be omitted when it is determined that the description may make the subject matter of the disclosure unnecessarily unclear.

The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, etc., are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards, for convenience and without limitation. The term eNB may be interchangeably used with the term gNB. That is, a base station described as eNB may indicate gNB.

Figure 1:
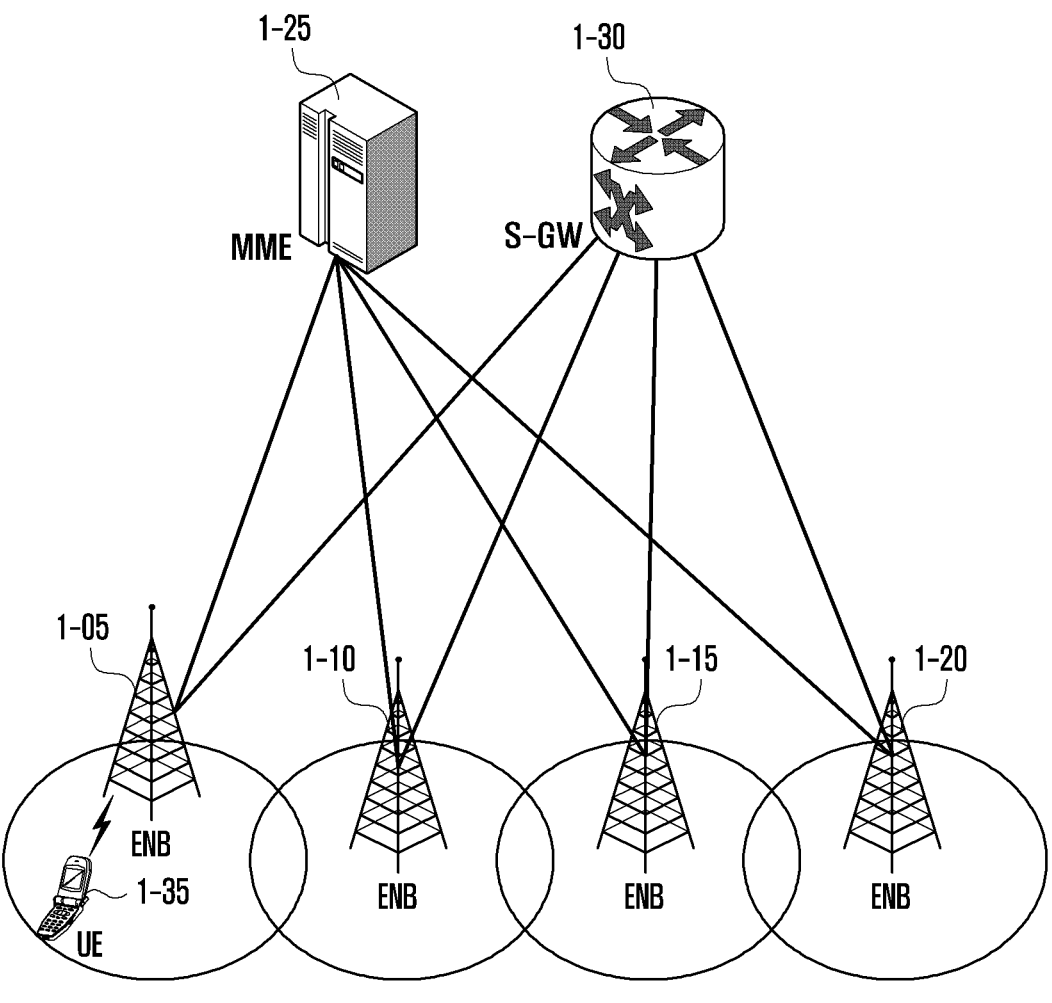
FIG. 1 illustrates a long term evolution (LTE) system to which the disclosure is applicable.

FIG. 1 illustrates an LTE system to which the disclosure is applicable.

Referring to FIG. 1, a radio access network (RAN) of an LTE system includes next-generation base stations (e.g., evolved Node Bs (ENBs), node Bs, or base stations) 1-05, 1-10, 1-15, and 1-20, a mobility management entity (MME) 1-25, and a serving gateway (S-GW) 1-30. A UE (or terminal) 1-35 accesses an external network through the ENBs 1-05, 1-10, 1-15, and 1-20 and the S-GW 1-30.

The ENBs 1-05, 1-10, 1-15, and 1-20 correspond to the conventional Node Bs of a UMTS. The ENBs 1-05, 1-10, 1-15, and 1-20 are connected to the UE 1-35 via a radio channel, and perform more complex functions than the conventional Node B. In the LTE system, user traffic including real-time services such as voice over Internet protocol (VoIP) via Internet protocol are serviced through a shared channel, and thus a device for collecting state information such as buffer state information of UEs, available transmission power state information of UEs, and channel state information (CSI) of UEs, and performing scheduling is required, wherein each of the ENBs 1-05, 1-10, 1-15, and 1-20 serves as such a device.

A single ENB generally controls multiple cells. For example, the LTE system uses a radio access technology such as orthogonal frequency-division multiplexing (OFDM) in a bandwidth of 20 MHz to achieve a data rate of 100 Mbps. In addition, the LTE system also applies an adaptive modulation & coding (AMC) scheme for determining a modulation scheme and a channel-coding rate in accordance with the channel state of a terminal. The S-GW 1-30 is a device for providing a data bearer, and generates or releases the data bearer under the control of the MME 1-25. The MME 1-25 is a device for performing a mobility management function and various control functions for a terminal, and is connected to multiple base stations.

Figure 2:
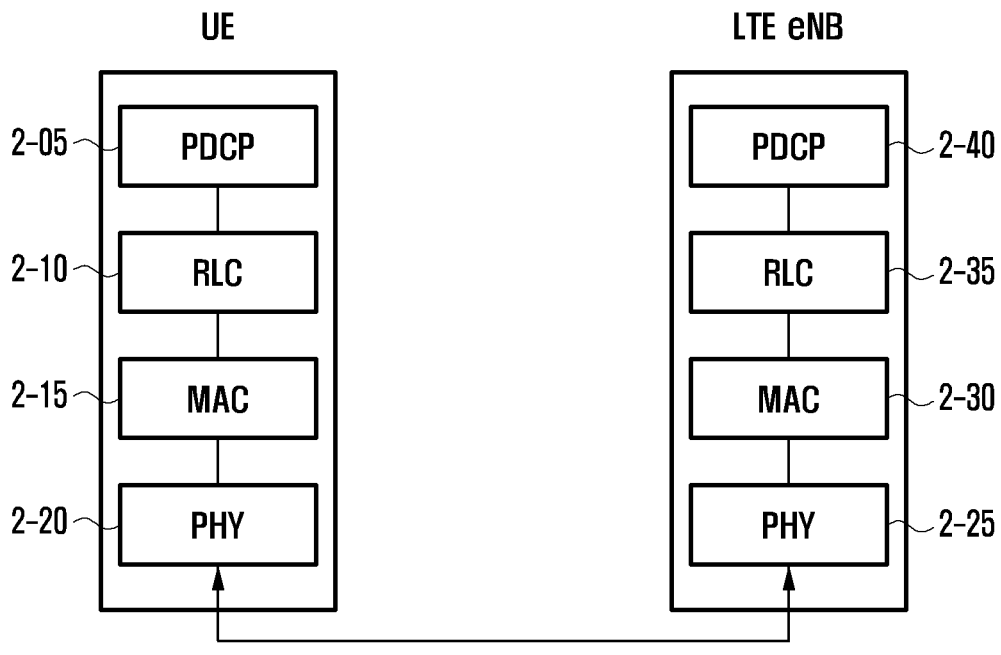
FIG. 2 illustrates a radio protocol structure in an LTE system to which the disclosure is applicable.

FIG. 2 illustrates a radio protocol structure in an LTE system to which the disclosure is applicable.

Referring to FIG. 2, the radio protocol in the LTE system includes packet data convergence protocols (PDCPs) 2-05 and 2-40, radio link controls (RLCs) 2-10 and 2-35, and MACs 2-15 and 2-30 in a terminal and an ENB, respectively. The PDCPs 2-05 and 2-40 perform operations of IP header compression/recovery and the like. The main functions of the PDCP are:

Header compression and decompression: robust header compression (ROHC) only.

Transfer of user data.

In-sequence delivery of upper layer packet data units (PDUs) at PDCP re-establishment procedure for RLC AM.

For split bearers in DC (only support for RLC acknowledge mode (AM)): PDCP PDU routing for transmission and PDCP PDU reordering for reception.

Duplicate detection of lower layer service data units (SDUs) at PDCP re-establishment procedure for RLC AM.

Retransmission of PDCP SDUs at handover and, for split bearers in DC, of PDCP PDUs at PDCP data-recovery procedure, for RLC AM.

Ciphering and deciphering.

Timer-based SDU discard in uplink (UL).

The (RLCs 2-10 and 2-35 reconfigure a PDCP PDU or an RLC SDU at an appropriate size to perform an automatic repeat request (ARQ) operation or the like. The main functions of the RLC are:

Transfer of upper layer PDUs.

Error correction through ARQ (only for AM data transfer).

Concatenation, segmentation, and reassembly of RLC SDUs (only for unacknowledged mode (UM) and AM data transfer).

Re-segmentation of RLC data PDUs (only for AM data transfer).

Reordering of RLC data PDUs (only for UM and AM data transfer).

Duplicate detection (only for UM and AM data transfer).

Protocol error detection (only for AM data transfer).

RLC SDU discard (only for UM and AM data transfer).

RLC re-establishment.

The MACs 2-15 and 2-30 are connected to several RLC layer devices configured in one device, and perform an operation of multiplexing RLC PDUs into a MAC PDU and demultiplexing the RLC PDUs from the MAC PDU. The main functions of the MAC are:

Mapping between logical channels and transport channels.

Multiplexing/demultiplexing of MAC SDUs belonging to one or different logical channels into/from transport blocks (TB) delivered to/from the physical layer on transport channels.

Scheduling information reporting.

Hybrid ARQ (HARQ) function (error correction through HARQ).

Priority handling between logical channels of one UE.

Priority handling between UEs by means of dynamic scheduling.

Multimedia broadcast/multicast service (MBMS) service identification.

Transport format selection.

Padding.

Physical layers 2-20 and 2-25 generate an OFDM symbol by performing channel-coding and modulating of upper-layer data, and transmit the same through a radio channel, or perform demodulating and channel-decoding of the OFDM symbol received through the radio channel, and transmit the same to an upper layer.

Figure 3:
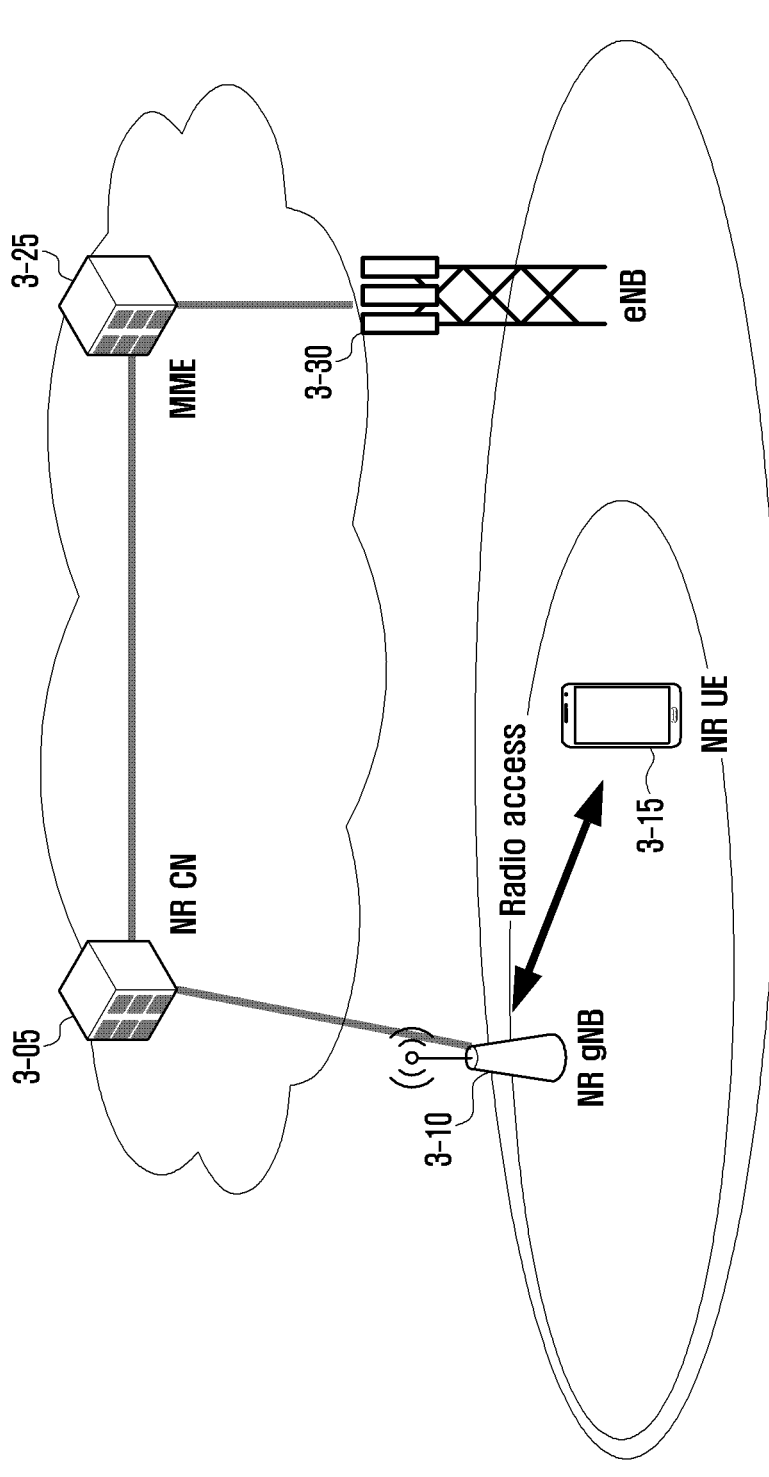
FIG. 3 illustrates a next-generation mobile communication system to which the disclosure is applicable.

FIG. 3 illustrates a next-generation mobile communication system to which the disclosure is applicable.

Referring to FIG. 3, a RAN in the next-generation mobile communication system (NR or 5G) includes a next-generation base station (e.g., a new-radio node B (NR gNB) or NR base station) 3-10 and an NR core network (CN) 3-05. A UE (e.g., an NR UE or an NR terminal) 3-15 accesses an external network through the NR gNB 3-10 and the NR CN 3-05.

In FIG. 3, the NR gNB 3-10 corresponds to an evolved node B (eNB) in a conventional LTE system. The NR gNB is connected to the NR UE 3-15 through a radio channel, and thus provides service superior to that of the conventional node B. In the next-generation mobile communication system, all user traffic is serviced through shared channels, and thus a device for collecting state information, such as buffer state information of UEs, available transmission power state information of UEs, and CSI of UEs, and performing scheduling is required, and the NR NB 3-10 serves as such a device. A single NR gNB generally controls multiple cells. In order to implement ultra-high-speed data transmission as compared with the conventional LTE, a bandwidth that is equal to or higher than the conventional maximum bandwidth is applied, and a beamforming technology may be additionally combined using OFDM as radio connection technology. In addition, an AMC scheme that determines a modulation scheme and a channel-coding rate in accordance with the channel state of the terminal is applied. The NR CN 3-05 performs a function such as mobility support, bearer configuration, and quality of service (QoS) configuration. The NR CN 3-05 is a device that performs not only terminal mobility management functions but also various types of control functions, and is connected to multiple base stations. In addition, the next-generation mobile communication system may be linked with the conventional LTE system, and the NR CN 3-05 is connected to the MME 3-25 through a network interface. The MME 3-25 is connected to an eNB 3-30 corresponding to the conventional base station.

Figure 4:
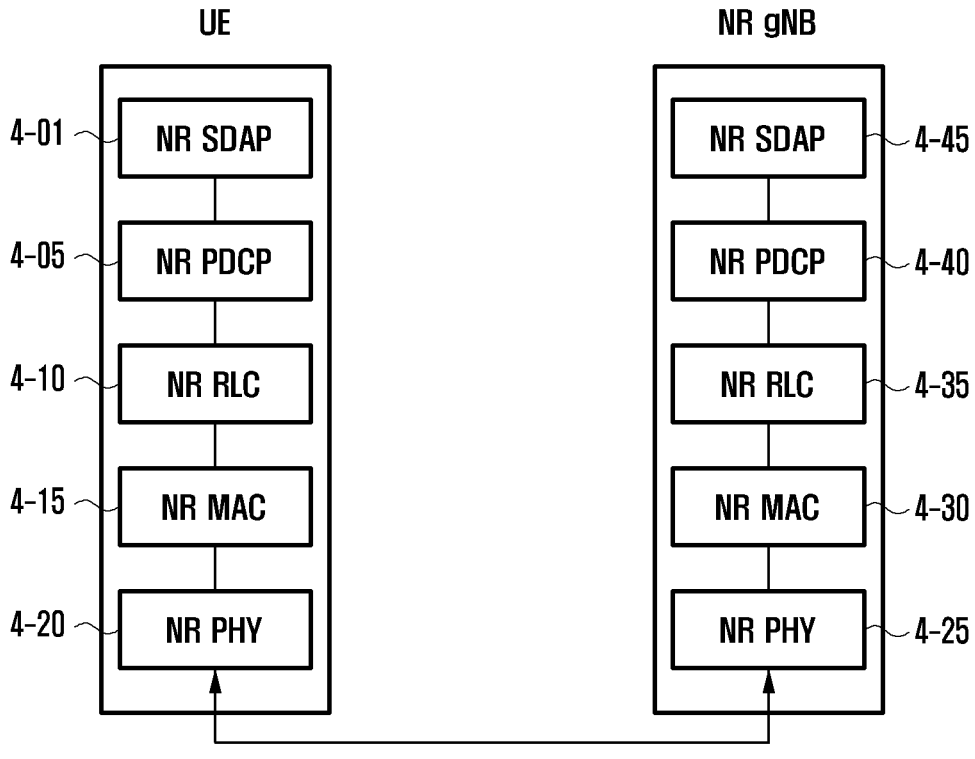
FIG. 4 illustrates a radio protocol structure in a next-generation mobile communication system to which the disclosure is applicable.

FIG. 4 illustrates a radio protocol structure in a next-generation mobile communication system to which the disclosure is applicable.

Referring to FIG. 4, a terminal and an NR base station include NR service data adaption protocols (SDAPs) 4-01 and 4-45, NR PDCPs 4-05 and 4-40, NR RLCs 4-10 and 4-35, and NR MACs 4-15 and 4-30, respectively.

The main functions of the NR SDAPs 4-01 and 4-45 may include some of the following functions:

Transfer of user plane data

Mapping between a QoS flow and a data radio bearer (DRB) for both DL and UL

Marking QoS flow ID in both DL and UL packets

Reflective QoS flow to DRB mapping for the UL SDAP PDUs.

For an SDAP-layer device, the terminal may receive, through an RRC message, a configuration as to whether to use a header of the SDAP-layer device or to use a function of the SDAP-layer device for each PDCP layer device, each bearer, or each logical channel. When an SDAP header is configured, the terminal may be indicated to update or reconfigure, with an NAS reflective QoS 1-bit indicator and an AS reflective QoS 1-bit indicator of the SDAP header, mapping information for UL and DL QoS flows and a data bearer. The SDAP header may include QoS flow ID information indicating the QoS. The QoS information may be used as data-processing priority, scheduling information, or like in order to support a smooth service.

The main functions of the NR PDCPs 4-05 and 4-40 may include some of the following functions:

Header compression and decompression: ROHC only

Transfer of user data

In-order delivery of upper layer PDUs

Out-of-order delivery of upper layer PDUs

PDCP PDU reordering for reception

Duplicate detection of lower layer SDUs

Retransmission of PDCP SDUs

Ciphering and deciphering

Integrity protection and verification

Timer-based SDU discard in UL.

The reordering function of the NR PDCP device refers to a function of sequentially rearranging PDCP PDUs received in a lower layer, based on a PDCP sequence number. The reordering function of the NR PDCP device may include: a function of delivering data to an upper layer in the rearranged order; a function of directly delivering data without considering an order; a function of recording lost PDCP PDUs by rearranging an order; a function of reporting a state of the lost PDCP PDUs to a transmission end; and a function of requesting retransmission of the lost PDCP PDUs.

The main functions of the NR RLCs 4-10 and 4-35 may include some of the following functions:

Transfer of upper layer PDUs

In-order delivery of upper layer PDUs

Out-of-order delivery of upper layer PDUs

Error Correction through ARQ

Concatenation, segmentation, and reassembly of RLC SDUs

Re-segmentation of RLC data PDUs

Reordering of RLC data PDUs

Duplicate detection

Protocol error detection

RLC SDU discard

RLC re-establishment.

The in-order delivery function of the NR RLC device refers to a function of sequentially delivering RLC SDUs received from a lower layer, to an upper layer. When a single RLC SDU is divided into multiple RLC SDUs and the divided multiple RLC SDUs are received, the in-order delivery function of the NR RLC device may include a function of rearranging and delivering the same. The in-order delivery function of the NR RLC device may include: a function of rearranging the received RLC PDUs, based on an RLC sequence number or a PDCP sequence number; a function of recording lost RLC PDUs by rearranging an order; a function of reporting the state of the lost RLC PDUs to a transmission end; and a function of requesting retransmission of the lost RLC PDUs. When there is a lost RLC SDU, the in-order delivery function of the NR RLC device may include a function of sequentially delivering only RLC SDUs preceding the lost RLC SDU to the upper layer. Alternatively, when there is a lost RLC SDU but the timer expires, the in-order delivery function of the NR RLC device may include a function of sequentially delivering, to the upper layer, all RLC SDUs received before a predetermined timer starts. Alternatively, when there is a lost RLC SDU but the predetermined timer expires, the in-order delivery function of the NR RLC device may include a function of sequentially delivering, to the upper layer, all currently received RLC SDUs. In addition, the NR RLC device may process the RLC PDUs in the received order (in an arriving order, regardless of the order of serial numbers or sequence numbers), and may deliver the processed RLC PDUs to the PDCP device regardless of order (out-of-order delivery), and when the NR RLC device receives a segment, the NR RLC device may receive segments which are stored in a buffer or are to be received later, reconfigure the segments into one complete RLC PDU, and then deliver the same to the PDCP device. The NR RLC layer may not include a concatenation function and may perform the function in the NR MAC layer or may replace the function with a multiplexing function of the NR MAC layer. In the above description, whether to perform the in-order delivery or the out-of-order delivery may be configured via an RRC message.

The out-of-order delivery function of the NR RLC device refers to a function of directly delivering, to the upper layer regardless of order, the RLC SDUs received from the lower layer. When a single RLC SDU is divided into multiple RLC SDUs and the divided multiple RLC SDUs are received, the out-of-order delivery function of the NR RLC device may include a function of rearranging and delivering the divided multiple RLC SDUs. The out-of-order delivery function of the NR RLC device may include a function of storing the PDCP sequence number or the RLC sequence number of each of the received RLC PDUs, arranging the RLC PDUs, and recording the lost RLC PDUs.

The NR MACs 4-15 and 4-30 may be connected to several NR RLC layer devices configured in one device, and the main functions of the NR MAC may include some of the following functions:

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding.

NR Physical layers 4-20 and 4-25 may generate an OFDM symbol by performing channel-coding and modulating of upper-layer data, and transmit the same through a radio channel, or may perform demodulating and channel-decoding of the OFDM symbol received through the radio channel, and transmit the same to the upper layer.

Since a significantly high band frequency can be used in the next-generation mobile communication system, a frequency bandwidth may also be very wide. However, in terminal implementation, completely supporting the very wide bandwidth requires high implementation complexity, and incurs high costs. Accordingly, the next-generation mobile communication system may introduce the concept of a BWP, and thus multiple BWPs may be configured in one cell (special cell (SPCell) or SCell), and data may be transmitted or received in one or multiple BWPs upon indication of the base station.

Various embodiments propose a state transition method or BWP switching method or a detailed operation, in consideration of a state of an SCell and multiple BWPs configured in the SCell when a dormant BWP is introduced. In addition, various embodiments propose proposes a method for managing a dormant mode in units of BWPs (BWP-levels) and transitioning a state or a BWP switching method, and also propose a detailed BWP operation according to a state of each SCell or a state or a mode (active, inactive, or dormant) of each BWP. In addition, to enable prompt activation of a cell (e.g., an SCell) or a BWP, first channel measurement configuration information is configured for the cell or the BWP via an RRC message or a MAC control element (CE), and an indication is made via the RRC message or MAC CE so that the terminal can apply and use (activate) the first channel measurement configuration information, which enables the terminal to promptly measure a channel signal (e.g., a reference signal (RS)) for the cell or the BWP and promptly report a result of the measurement to the base station, whereby the cell or the BWP can be promptly activated. Activating a cell or a BWP may mean processes in which the terminal monitors a PDCCH in the cell or the BWP; in which the base station transmits the PDCCH to the terminal; the base station transmits DL data (a physical DL shared channel (PDSCH)) to the terminal; the terminal transmits UL data (a physical UL control channel (PUSCH)); the terminal transmits a measurement result or a HARQ acknowledgement (ACK) or negative ACK (NACK) through a physical UL control channel (PUCCH); the terminal transmits a sounding RS (SRS); the terminal measures a channel measurement signal (e.g., a synchronization signal block (SSB), a CSI-RS, or an RS) transmitted by the base station; or the terminal measures the channel measurement signal transmitted by the base station and reports a result of the measurement. The first channel measurement configuration information may include information on a configuration by the base station for a channel measurement signal for a specific terminal (or terminals) in the cell or the BWP. For example, the first channel measurement configuration information may include the period of the channel measurement signal, the number of times of transmission of the signal, signal transmission duration, an offset for a signal transmission time, the length of time between transmitted signals, a list of multiple transmittable channel measurement signals, a time transmission resource (or a frequency transmission resource) indicating the position of a transmitted signal, a transmission resource (a time transmission resource or a frequency transmission resource) for reporting a measurement result, a measurement result reporting period, or the like. In addition, the first channel measurement configuration information configured via the RRC message may include information on multiple channel measurement signals, and measurement signal information or beam configuration information of one channel, among the above-configured information on the multiple channel measurement signals, is indicated via the RRC message, MAC CE, or DL control information (DCI) so that the terminal can perform channel measurement or channel measurement reporting by applying and using the indicated channel measurement signal information and beam configuration information. As another method, channel measurement signal information may be configured or indicated via the RRC message or MAC CE so that the terminal can perform channel measurement or channel measurement reporting by applying or using the configured (indicated) channel measurement signal information. In addition, for multiple cells or BWPs configured via the RRC message, the first channel measurement configuration information may be configured differently for each cell or each BWP, and to support for the terminal to easily measure a transmission resource for channel measurement, beam-related configuration information (transmission configuration indication (TCI) state or quasi co-location (QCL)) such as a beam direction, a beam number, or a beam position may be configured together. In addition, a timing advance value (an offset value) for synchronization of a DL signal of the base station or a UL signal of the base station, or a timer (i.e., a TAT or a timer value (a TAT value)) indicating validity of a time alignment value may be configured for the first channel measurement configuration information, so that channel measurement or channel measurement reporting can be accurately performed.

The first channel measurement configuration information may be configured only for DL BWP configuration information of each cell. That is, the first channel measurement configuration information may not be configured for UL BWP configuration information of each cell. This is because the terminal needs to measure a channel for DL first to report a measurement result of the channel or cell, and then accurately receive the PDCCH and follow the indication of the base station.

The first channel measurement configuration information is initially deactivated at the time of configuration via the RRC message or after handover, and may be later activated via the MAC control information, DCI of the PDCCH, or the RRC message. As in the above case where the configuration is made via the RRC message, an initial state needs to be a deactivated state so that the base station can easily manage a cell state or channel measurement procedure of the terminal and also accurately manage a timing indicating when and how the terminal performs channel measurement, without an RRC message processing delay problem.

In addition, multiple BWPs are configured for one cell (e.g., an SPCell, a PCell, a PSCell, or an SCell) for each DL or UL, and a BWP to an active BWP (active DL BWP or active UL BWP), a dormant BWP (dormant BWP or dormant DL BWP), or an inactive BWP (inactive or deactivated DL/UL BWP) may be configured and operated through BWP switching. That is, for the one cell, a data transmission rate can be increased in a method similar to CA through transitioning of a DL or UL BWP to an active state. In addition, the terminal is configured not perform PDCCH monitoring for the cell through transitioning or switching from the DL BWP to a dormant BWP, thereby saving battery power. The UE is configured to perform channel measurement on the DL BWP and report a channel measurement result so that prompt activation of a cell or BWP can be supported later. In addition, battery power of the terminal can be also saved through transitioning of the DL (or UL) BWP to an inactive state in the one cell. BWP-specific state transition indication or BWP switching indication for each cell may be configured and indicated via an RRC message, a MAC CE, or DCI of a PDCCH.

The dormant BWP may be also extended and applied to DC technology, and may be also applied to, e.g., a PSCell of an SCG. As another method, the dormant BWP may be extended to the concept of cell group suspension or cell group deactivation, wherein cell group suspension or cell group deactivation is indicated to one cell group (e.g., SCG) of a terminal for which DC technology has been configured, so that data transmission or reception is suspended, PDCCH monitoring is suspended, or PDCCH monitoring is intermittently performed based on a very long cycle, in the indicated cell group, whereby power consumption of the terminal can be saved. In addition, when the cell group suspension or deactivation is indicated to the terminal, the terminal may perform a channel measurement procedure in a cell group to which cell group suspension or deactivation has been indicated, and may report a channel measurement result to a network (e.g., to a master cell group (MCG) or an SCG), so as to support prompt activation of DC technology. With respect to the cell group for which cell group suspension or deactivation has been indicated, the terminal may perform the above-described procedure, maintain and store cell group configuration information without discarding or releasing the same, or restore the cell group configuration information upon the cell group activation or resumption indication from the network. For example, the cell group configuration information (e.g., configuration information, bearer configuration information, or cell-specific configuration information of each of PDCP, RLC, and MAC layer devices) configured for the terminal may be stored or maintained without change. However, if the cell group is suspended or deactivated, the bearers or RLC bearers of the bearer may be suspended, or transmission (or data transmission, e.g., SCG transmission) may be suspended in the cell group. If receiving a cell group resumption or activation indication for the cell group for which cell group suspension or deactivation has been indicated, the terminal may resume, restore, or reapply configuration information of the cell group, resume transmission (e.g., SCG transmission) for the bearer, the RLC bearer, or the cell group, restart data transmission or reception, restart PDCCH monitoring, perform channel measurement reporting, or reactivate a periodically configured transmission resource.

When a cell group is suspended or deactivated, suspending a bearer (a bearer using an RLC UM mode) or a bearer using an RLC AM mode) may mean suspending a PDCP layer device or an RLC layer device (or suspending data transmission or reception or data processing), and not transmitting (or receiving) data for the bearer (corresponding to a logical channel identifier (ID) corresponding to the bearer) in a MAC layer device (or not selecting the logical channel ID in a logical channel prioritization (LCP) procedure). The procedure of suspending the PDCP layer device may apply embodiments discussed below.

When a cell group is suspended or deactivated, suspending an RLC bearer (an RLC bearer using an RLC UM mode or an RLC bearer mode using an RLC AM mode) may mean suspending an RLC layer device (or suspending data transmission or reception or data processing), and not transmitting (or receiving) data for the bearer (data corresponding to a logical channel ID corresponding to the bearer) in a MAC layer device (or not selecting the logical channel ID in an LCP procedure). The suspending of the RLC bearer may mean that a PDCP layer device connected to the RLC layer device may continuously perform data processing. For example, the PDCP layer device connected to the suspended RLC bearer may process and transmit or receive and process data through another RLC bearer (e.g., an RLC bearer belonging to a cell group (e.g., an MCG) different from the cell group (e.g., an SCG)).

When a cell group is suspended or deactivated, suspending transmission for the cell group (e.g., an SCG transmission) may mean not transmitting (or receiving) data for a bearer belonging to the cell group (a bearer using an RLC UM mode or a bearer using an RLC AM mode) (or data corresponding to a logical channel ID corresponding to the bearer) in a MAC layer device (or not selecting the logical channel ID in an LCP procedure). However, the suspending of the transmission of the cell group (e.g., an SCG transmission) may mean that a PDCP layer device or an RLC layer device may perform data processing or data pre-processing. For example, data of an upper-layer device (or UL data) is not transmitted in the cell group, but data processing may be performed in advance for transmission in the PDCP layer device, the RLC layer device, or the MAC layer device.

When a cell group is resumed or activated, resuming a bearer (a bearer using an RLC UM mode or a bearer using an RLC AM mode) may mean resuming a PDCP layer device or an RLC layer device (or resuming data transmission or reception or data processing), and transmitting (or receiving) data for the bearer (data corresponding to a logical channel ID corresponding to the bearer) in a MAC layer device (or selecting the logical channel ID in an LCP procedure).

When a cell group is resumed or activated, resuming an RLC bearer (an RLC bearer using an RLC UM mode or an RLC bearer mode using an RLC AM mode) may mean resuming an RLC layer device (or resuming data transmission or reception or data processing), and transmitting (or receiving) data for the bearer (data corresponding to a logical channel ID corresponding to the bearer) in a MAC layer device (or selecting the logical channel ID in an LCP procedure). The resuming of the RLC bearer may mean that data is transferred from a PDCP layer device connected to the RLC layer device or data is received from the PDCP layer device.

When a cell group is resumed or activated, resuming transmission for the cell group (e.g., SCG transmission) may mean transmitting (or receiving) data for a bearer belonging to the cell group (a bearer using an RLC UM mode or a bearer using an RLC AM mode) (or data corresponding to a logical channel ID corresponding to the bearer) in a MAC layer device (or selecting the logical channel ID in an LCP procedure). However, the resuming of the transmission of the cell group (for example SCG transmission) may mean that a PDCP layer device or an RLC layer device may perform data processing or data pre-processing. For example, data of an upper-layer device (or UL data) may be transmitted in the cell group, but data processing may be performed in advance for transmission in the PDCP layer device, the RLC layer device, or the MAC layer device.

As another method, when a cell group is suspended or deactivated, a bearer (or an RLC bearer) using an RLC UM mode may be suspended, a PDCP layer device or an RLC layer device may be suspended, data transmission or reception may be suspended, data processing may be suspended, or data transmission or reception in a MAC layer device may be suspended. However, for a bearer (or an RLC bearer)

using an RLC AM mode, transmission for the cell group may be suspended, data processing for the PDCP layer device or the RLC layer device may be continuously performed, or data transmission or reception in the MAC layer device may be suspended. This is because when a security key is changed, there is a retransmission (or regeneration) procedure for the RLC AM bearer (therefore, when the security key is not changed, data processing speed can be reduced, and when the security key is changed, data loss does not occur due to the retransmission (or regeneration) procedure), but there is no retransmission (or regeneration) procedure for the RLC UM bearer, and thus data loss may occur in the terminal if the data processing procedure is performed in advance in the RLC UM bearer (when the security key is not changed, data processing speed can be reduced, but when the security key is changed, there is no retransmission (or regeneration) procedure, all data is discarded in a PDCP layer device and RLC layer device reestablishment procedure, and thus data loss occurs).

Accordingly, different procedures may be applied to a bearer (or an RLC bearer) using an RLC AM mode and a bearer (an RLC bearer) using an RLC UM mode. The procedure of suspending the PDCP layer device may apply embodiments to be specifically proposed below.

The cell group configuration information or cell (e.g., an SPCell (i.e., PCell or PSCell) or an SCell) configuration information, the previously configured cell group configuration information or cell configuration information, or a message indicating cell group or cell (SPcell activation or resumption (e.g., an RRC message, RRCReconfiguration, MAC control information, or DCI of a PDCCH) may be configured to include first channel measurement configuration information for prompt cell group or cell activation. With respect to the first channel measurement configuration information, for prompt activation of the cell group, cell configuration information of the cell group may include, to allow the base station to temporally transmit many channel measurement signals or frequently transmit a channel measurement signal to enable prompt channel measurement in the cell, configuration information such as a period for a frequent channel measurement signal (e.g., a radio resource, a temporary RS (TRS), an SSB, an CSI-RS, or an RS), transmitted transmission resource information (i.e., a frequency or time transmission resource via which the frequent channel measurement signal is transmitted), an interval or frequency (e.g., the number of times the frequent channel measurement signal is transmitted), a timer value (e.g., a time period in which the frequent channel measurement signal is transmitted), a time interval (e.g., an interval in which the frequent channel measurement signal is transmitted (e.g., an offset of a time unit (slot, subframe, symbol, or the like))), or a transmission resource, cycle, interval, timing, an offset, or the like via which the terminal should report a measurement result. The first channel measurement configuration information may allow a configuration of a short reporting cycle (or transmission resource) in which the terminal may report a channel measurement result, or a configuration of a transmission resource for channel measurement so that the base station can transmit a plurality of channel measurement signals (or transmission resources (e.g., radio resources or TRSs) or frequently transmit a channel measurement signal so as to support the terminal to perform prompt channel measurement or more signal measurements. As described above, the first channel measurement configuration information may include information on a configuration by the base station for a channel measurement signal for a specific terminal (or terminals) in the cell or the BWP. For example, the first channel measurement configuration information may include the period of the channel measurement signal, the number of times of transmission of the signal, signal transmission duration, an offset for a signal transmission time, the length of time between transmitted signals, a list of multiple transmittable channel measurement signals, a time transmission resource (or a frequency transmission resource) indicating the position of a transmitted signal, a transmission resource (a time transmission resource or a frequency transmission resource) for reporting a measurement result, a measurement result reporting period, or the like. In addition, for multiple cells or BWPs configured via the RRC message, the first channel measurement configuration information may be configured differently for each cell or each BWP, and to support for the terminal to easily measure a transmission resource for channel measurement, beam-related configuration information (TCI state or QCL) such as a beam direction, a beam number, or a beam position may be configured together. In addition, a timing advance value (an offset value) for synchronization of a DL signal of the base station or a UL signal of the base station, or a timer (a TAT or a TAT value) indicating validity of the TA value may be configured for the first channel measurement configuration information, so that channel measurement or channel measurement reporting can be accurately performed. In addition, the first channel measurement configuration information configured via the RRC message may include information on multiple channel measurement signals, and measurement signal information or beam configuration information of one channel, among the above-configured information on the multiple channel measurement signals, is indicated via the RRC message, MAC CE, or DCI so that the terminal can perform channel measurement or channel measurement reporting by applying and using the indicated channel measurement signal information and beam configuration information. The indicating method may include defining mapping between a bitmap, an index, or an ID to each configured channel measurement signal information configured above, and indicating based on the definition. As another method, channel measurement signal information may be configured or indicated via the RRC message or MAC CE so that the terminal can perform channel measurement or channel measurement reporting by applying or using the configured (indicated) channel measurement signal information.

The first channel measurement configuration information proposed herein is initially deactivated at the time of configuration via the RRC message or after handover, and may be later activated via the MAC control information, DCI of the PDCCH, or the RRC message. As in the above case where the configuration is made via the RRC message, an initial state needs to be a deactivated state so that the base station can easily manage a cell state or channel measurement procedure of the terminal and also accurately manage a timing indicating when and how the terminal performs channel measurement, without an RRC message processing delay problem.

The first channel measurement configuration information may be configured only for DL BWP configuration information of each cell. That is, the first channel measurement configuration information proposed may not be configured for UL BWP configuration information of each cell. This is because the terminal needs to measure a channel for DL first to report a measurement result of the channel or cell, and then accurately receive the PDCCH and follow the indication of the base station.

In addition, the message indicating cell group or cell (SPcell (PCell or PSCell) or SCell) activation or resumption (e.g., an RRC message, RRCReconfiguration MAC control information, or DCI of a PDCCH) may include second channel measurement configuration information for measuring a signal of the cell of the cell group. The second channel measurement configuration information may include general channel measurement configuration information such as a transmission resource, cycle, time interval, or frequency of the channel measurement signal, or a transmission resource, cycle, or time interval for channel measurement reporting.

The terminal may perform channel measurement by applying the first channel measurement configuration information or the second channel measurement configuration information, and may report a measurement result to the base station, according to the following conditions:

1> If the terminal has received a message (e.g., PDCCH indicator, MAC control information, or RRC message) indicating to activate (or resume) a cell (e.g., a PCell, a PSCell, or an SCell) or a cell group (or if the cell group has been in the deactivated state previously), ■ 2> if the first channel measurement configuration information is configured for the terminal, ◆ 3> the terminal may identify that the base station is to frequently transmit many channel measurement signals according to the first channel measurement configuration information of the terminal, and may measure many channel measurement signals or measure a channel measurement signal frequently according to the first channel measurement configuration information for a temporary period (e.g., up to a time interval (e.g., subframe, slot, or symbol) configured in the first channel measurement configuration information, for an appointed (or predetermined) time interval in consideration of an offset, or for a specific time (e.g., while a timer is running)) or until a first condition is satisfied. In addition, the terminal may report the obtained channel measurement result according to the cycle or transmission resource configured in the first channel measurement configuration information, up to a time interval (e.g., subframe, slot, or symbol) configured in the first channel measurement configuration information, for an appointed (or predetermined) time interval in consideration of an offset, for a specific time (e.g., while a timer is running), or until a first condition is satisfied. Therefore, as the terminal is able to promptly and frequently measure the channel measurement signal and promptly report the measurement result, the cell (e.g., a PCell, an SCell, or a PSCell) or the cell group may be promptly activated (or resumed), or scheduling information may be promptly indicated. If second channel measurement configuration information is configured for the terminal after the time interval (e.g., subframe, slot, or symbol) configured in the first channel measurement configuration information, after the appointed (or predetermined) time interval, after the specific time (e.g., when the timer expires), or after the first condition is satisfied, the terminal may suspend or clear application of the first channel measurement configuration information, and may measure the channel measurement signal according to the second channel measurement configuration information. For example, fallback may be performed from the first channel measurement configuration information to the second channel measurement configuration information, or the second channel measurement configuration information may be applied instead of the first channel measurement configuration information. In addition, the obtained channel measurement result may be reported according to the cycle or transmission resource configured in the second channel measurement configuration information. If the second channel measurement configuration information is not configured, channel measurement may not be performed.

■ 2> otherwise (if the first channel measurement configuration information is not configured for the terminal), ◆ 3> if the second channel measurement configuration information is configured for the terminal, a channel measurement signal may be measured according to the second channel measurement configuration information.

In addition, the obtained channel measurement result may be reported according to the period or transmission resource configured in the second channel measurement configuration information. If the second channel measurement configuration information is not configured, channel measurement may not be performed.

The first condition described above may be one of the conditions set forth below, providing efficient conditions to enable the base station not to transmit an unnecessarily large amount of transmission resources or frequently transmit resources when, under the first condition, a cell is activated, a cell group is activated or resumed (or the cell group is activated from a deactivated state), or the terminal in an RRC inactive mode resumes a connection in RRC connection resumption. For example, channel measurement or channel measurement reporting may be performed by applying the first channel measurement configuration information until one of the following conditions is satisfied:

The terminal may determine that the first condition is satisfied when the terminal successfully completes a random access procedure (4-step random access procedure or 2-step random access procedure) in the cell (e.g., PCell, SCell, or PSCell) or in a cell (e.g., PSCell or SCell) of the cell group, when random access is successfully completed and a first UL transmission resource is allocated, or when a UL transmission resource is initially indicated to the terminal.

■ More specifically, e.g., if the terminal performs contention-free random access (CFRA) (e.g., if a pre-dedicated preamble or a terminal cell ID (e.g., a cell radio network temporary ID (C-RNTI)) is allocated):

◆ The terminal may determine that the first condition is satisfied because it may be considered that a random access procedure is successfully completed when the terminal transmits a pre-dedicated preamble to the cell and receives a random access response (RAR) message, or when the terminal receives an indication of a PDCCH for the RAR. As another method, when a UL transmission resource is received for the first time after RAR reception, the terminal may determine that the first condition is satisfied.

■ If the terminal performs contention-based random access (CBRA) (e.g., if neither a pre-dedicated preamble nor a terminal cell ID (e.g., C-RNTI) is allocated):

◆ the terminal may determine that the first condition is satisfied because the terminal may consider that a random access procedure to a target base station has been successfully completed when the terminal transmits a preamble (e.g., random preamble) to the cell, receives a RAR message, transmits message 3 (e.g., handover completion message) by using a UL transmission resource allocated, included, or indicated in the RAR message, and receives, from the target base station via message 4, a MAC CE (contention resolution MAC CE) indicating that contention has been resolved, or when the terminal receives a UL transmission resource via a PDCCH corresponding to C-RNTI of the terminal. As another method, if the size of the UL transmission resource allocated in the RAR message is sufficient so that the terminal may transmit message 3 and may additionally transmit UL data, the terminal may determine that the UL transmission resource is received for the first time and may determine that the first condition is satisfied. That is, when the RAR is received, the terminal may determine that the UL transmission resource is received for the first time, and may determine that the first condition is satisfied.

1> If the terminal performs a configured or indicated 2-step random access procedure, 1> Or if the terminal supports 2-step random access procedure in a terminal capability even if the 2-step random access procedure is not configured or indicated in the message, and if the 2-step random access procedure is supported in system information of the cell, and information (e.g., random access resource, threshold value for determination of whether to perform or not perform 2-step random access, or the like) for the 2-step random access procedure is broadcasted in system information, or if the terminal receives the system information, and the terminal performs the 2-step random access procedure for the cell since a signal strength is sufficient or is greater than the threshold value broadcasted in the system information, ■ 2> if the 2-step random access procedure is successfully completed, the terminal may determine that the first condition is satisfied.

■ 2> the 2-step random access procedure may be performed specifically by one of CBRA or CFRA methods.

◆ 3> if the terminal performs a CBRA-based 2-step random access above:

● 4> the terminal may transmit a preamble in a transmission resource (e.g., physical random access channel (PRACH) occasion, transmission resource configured by the base station via the RRC message, or transmission resource broadcasted in the system information) for 2-step random access, and may transmit data (e.g., MsgA MAC PDU) in a transmission resource (e.g., PUSCH occasion) for data transmission. The data may include MAC control information (C-RNTI MAC CE) including a terminal ID (e.g., a C-RNTI) or an RRC message (RRCReconfigurationComplete message or handover completion message).

● 4> the terminal may monitor a PDCCH scrambled with the terminal ID (C-RNTI) or a first ID (MsgB-RNTI) derived by a time or frequency at which the preamble is transmitted.

● 4> if the terminal receives the PDCCH scrambled with the terminal ID, if a DL transmission resource is allocated via the PDCCH, or if the terminal receives MAC control information (timing advance command MAC CE) for timing adjustment in the DL transmission resource, ■ 5> the terminal may determine that the 2-step random access procedure has been successfully completed, and may determine that the first condition is satisfied.

● 4> if the terminal receives the PDCCH scrambled with the first ID (MsgB-RNTI), if a DL transmission resource is allocated via the PDCCH, or if a fallback RAR for the preamble transmitted by the terminal is received in the DL transmission resource (that is, if the base station has received the preamble but has failed to receive MsgA, or if a fallback RAR indicating to transmit MsgA via another transmission resource is received), ■ 5> the terminal may transmit data (MsgA MAC PDU) via the transmission resource indicated in the RAR for fallback.

■ 5> the terminal may monitor the PDCCH scrambled with the terminal ID (C-RNTI).

■ 5> if the terminal receives the PDCCH scrambled with the terminal ID, or if a UL transmission resource is allocated via the PDCCH, the terminal may determine that the 2-step random access procedure has been successfully completed, and may determine that the first condition is satisfied.

◆ 3> if the terminal performs a CFRA-based 2-step random access procedure:

● 4> the terminal may transmit a preamble in a transmission resource (e.g., PRACH occasion, or transmission resource designated by the base station via the RRC message) for 2-step random access, and may transmit data (e.g., MsgA MAC PDU) in a transmission resource (e.g., PUSCH occasion) for data transmission. The data may include MAC control information (C-RNTI MAC CE) including a terminal ID (C-RNTI) or an RRC message (RRCReconfigurationComplete message or handover completion message).

● 4> the terminal may monitor a PDCCH scrambled with the terminal ID (C-RNTI) or the first ID (MsgB-RNTI) derived by a time or frequency at which the preamble is transmitted.

● 4> if the terminal receives the PDCCH scrambled with the terminal ID, if a DL transmission resource is allocated via the PDCCH, or if the terminal receives MAC control information (timing advance command MAC CE) for timing adjustment in the DL transmission resource, ■ 5> the terminal may determine that the 2-step random access procedure has been successfully completed, and may determine that the first condition is satisfied.

● 4> if the terminal receives the PDCCH scrambled with the first ID (MsgB-RNTI), if the UE a DL transmission resource is allocated via the PDCCH, or if a fallback RAR for the preamble transmitted by the terminal is received in the DL transmission resource (that is, if the base station has received the preamble but has failed to receive MsgA, or if a fallback RAR indicating to transmit MsgA via another transmission resource is received), ■ 5> the terminal may determine that the 2-step random access procedure has been successfully completed, and may determine that the first condition is satisfied.

■ 5> the terminal may transmit data (MsgA MAC PDU) via the transmission resource indicated in the RAR for fallback.

1> The terminal may determine that the first condition is satisfied when a random access procedure is started or when a preamble for the random access procedure is transmitted.

1> As another method, if a 2-step random access procedure is configured or indicated for the terminal via the message, the terminal may determine that the first condition is satisfied. For example, in the above case, before starting the 2-step random access procedure, the terminal may determine that the first condition is satisfied.

1> As another method, if a 2-step random access procedure is configured or indicated for the terminal via the message, and a transmission resource (e.g., a PUSCH) configured for data transmission in the 2-step random access procedure is greater than a first threshold, or if a configuration value (timing advance value) for timing adjustment is included in the RRC message, the terminal may determine that the first condition is satisfied. The first threshold value may be configured by the base station via the RRC message (e.g., RRCReconfiguration message), may be broadcasted in the system information, or may be configured as the size of data that the terminal has for transmission. For example, in the above case, before starting the 2-step random access procedure, the terminal may determine that the first condition is satisfied. As another method, if a configuration value (timing advance value) for timing adjustment is included in the RRC message, or if the 2-step random access procedure is configured, the terminal may directly transmit data from the configured transmission resource (e.g., transmission resource configured via the RRC message, or transmission resource indicated by a PDCCH of a target base station, where the terminal monitors the PDCCH) without transmitting a preamble. Therefore, in the above case, before starting the 2-step random access procedure, when transmitting the data, or before transmitting the data, the terminal may determine that the first condition is satisfied. As another method, if a configuration value (timing advance value) for timing adjustment is included in the RRC message, or if the 2-step random access procedure is configured, the terminal may directly transmit data via the configured transmission resource (e.g., a PUSCH) (e.g., transmission resource configured via the RRC message, or transmission resource indicated by a PDCCH of a target base station, where the terminal monitors the PDCCH) without transmitting a preamble. In the above case, if the configured transmission resource (e.g., a PUSCH) (e.g., transmission resource configured via the RRC message, or transmission resource indicated by a PDCCH of a target base station, where the terminal monitors the PDCCH) is greater than the first threshold value, or if the RRC message includes the configuration value (timing advance value) for timing adjustment, the terminal may determine that the first condition is satisfied, before starting the 2-step random access procedure, when transmitting the data, or before transmitting the data.

1> The terminal may determine that the first condition is satisfied when the terminal in the RRC inactive mode transmits an RRCResumeRequest message and then receives an RRCResume message (or RRCSetup message) in response thereto.

1> If a timer indicating a channel measurement period has expired when the terminal performs channel measurement based on the first channel measurement configuration information configured in the RRC message, 1> If a time interval indicating a channel measurement period has passed (or has expired), or if the time interval has been all used (or applied) when the terminal performs channel measurement based on the first channel measurement configuration information configured in the RRC message, 1> If channel measurement signals are all measured (or completed) by a configured number of times, or if signals are received by the configured number of times when the terminal performs channel measurement based on the first channel measurement configuration information configured in the RRC message, 1> If channel measurement has been completed (channel measurement has expired), or if channel measurement reporting has been completed (or channel measurement reporting has expired) when the terminal performs channel measurement based on the first channel measurement configuration information configured in the RRC message.

If the first condition is satisfied, an upper layer device (e.g., an RRC layer deice) may perform indication using an indicator to a lower layer device (e.g., a PDCP layer device, an RLC layer device, a MAC layer device, or a PHY layer device), or the lower layer device may perform indication to the upper layer device.

The above-proposed methods for configuring or applying the first channel measurement configuration information may be extended to a case where a cell group (or PSCell) is activated or resumed, an SCell is activated, an RRC connection is resumed in an RRC deactivated mode (e.g., when an RRCResume message is used), or a handover procedure is performed (e.g., an RRCReconfiguration message is used), so as to be configured and used.

A BWP may be used without distinction between a UL and a DL, and the BWP may indicate each of a UL BWP and a DL BWP according to context.

A link may be used without distinction between a UL and a DL, and the link may indicate each of a UL and a DL according to context.

A cell may indicate a PCell, an SCell (e.g., an SCell configured in an MCG), a PSCell (e.g., PCell of an SCG), or an SCell (e.g., SCell configured in an SCG)). For an SCell or PSCell of the terminal performing CA technology or DC technology, a dormant BWP (dormant BWP) may be configured or introduced, and battery consumption of the terminal can be thus reduced by preventing the terminal from performing PDCCH monitoring in the dormant BWP. The terminal is configured to perform channel measurement and report the channel measurement (e.g., report CSI or channel quality information (CQI) measurement), or perform beam measurement, beam tracking, or beam operation, in the dormant BWP, so that when data transmission is required, the terminal can perform switching to or activation of a normal BWP (normal BWP) and promptly start data transmission in the normal BWP.

The dormant BWP may be neither configured for nor applied to an SPCell (PCell of MCG or PCell (or PSCell) of SCG) or an SCell for which a PUCCH has been configured, wherein the SPCell needs to continuously monitor a signal, transmit or receive feedback, or identify and maintain synchronization.

If the terminal receives, via a PCell, an indication of switching to or activation of a dormant BWP for an SCell of an MCG, the terminal may perform channel measurement for the dormant BWP of the SCell, and may report the obtained channel measurement result via a transmission resource of a PCell of the MCG (e.g., via a PUCCH transmission resource of the PCell) or via a transmission resource of the SCell (e.g., via a PUCCH transmission resource) for which the PUCCH of the MCG is configured. In the above description, a transmission resource (e.g., PUCCH or PUSCH) of a cell, via which a channel measurement result for a certain cell or BWP thereof is to be reported, may be configured for the terminal via an RRC message for each cell or each BWP.

If the terminal receives, via the PSCell, an indication of switching to or activation of a dormant BWP for an SCell of an SCG, the terminal may perform channel measurement for the dormant BWP of the SCell, and may report the obtained channel measurement result via a transmission resource of the PSCell of the SCG (e.g., via a (PUCCH transmission resource of the PSCell) or via a transmission resource of the SCell (e.g., via a PUCCH) transmission resource) for which the PUCCH of the SCG is configured. In the above description, a transmission resource (e.g., PUCCH or PUSCH) of a cell, via which a channel measurement result for a certain cell or BWP thereof is to be reported, may be configured for the terminal via an RRC message for each cell or each BWP.

If the terminal receives, via the PCell, an indication of switching to or activation of a dormant BWP for the PSCell or SCell of the SCG, or if the terminal receives a cell group suspension (SCG suspension or cell group suspension) indication for the SCG (or PSCell), the terminal may perform channel measurement for the BWP (BWP configured via the RRC message or last active BWP) or the dormant BWP of the PSCell or SCell, and may report the obtained channel measurement result via a transmission resource of the PCell of the MCG (e.g., via a PUCCH transmission resource of the PCell), via a transmission resource of the SCell for which PUCCH of the MCG is configured (e.g., via a PUCCH transmission resource), or via a transmission resource of the PSCell of the SCG (e.g., via a PUCCH transmission resource of the PSCell). In the description above, a transmission resource (e.g., PUCCH or PUSCH) of a cell, via which a channel measurement result for a certain cell or BWP thereof is to be reported, may be configured for the terminal via an RRC message for each cell or each BWP.

Various embodiments are provided of operations performed based on DCI of PDCCH, a MAC CE, or an RRC message in order to operate the dormant BWP or cell group suspension state, proposed above, with respect to an SCell (e.g., an SCell of an MCG when CA technology is configured, or an SCell of an SCG when DC technology is configured) or a PSCell (e.g., a PCell of an SCG when DC technology is configured) of the terminal.

A network or a base station may configure an SPCell (PCell and PSCell) and multiple SCells for a terminal. The SPCell may indicate a PCell when the terminal communicates with a single base station, and may indicate a PCell of a master base station or a PSCell of a secondary base station when the terminal communicates with two base stations (master base station and secondary base station). The PCell or PSCell indicates a main cell used when the terminal and the base station communicate in each MAC layer device, and refers to a cell in which timing adjustment is performed for synchronization, random access is performed, HARQ ACK/NACK feedback is transmitted via a PUCCH transmission resource, and most control signals are exchanged. The technology, in which a base station operates multiple SCells with an SPCell so as to increase transmission resources and increase UL or DL data transmission resources, is referred to as CA technique technology or DC technology.

A PCell may indicate an MCG, and a PSCell may indicate an SCG). In addition, the MCG may include the PCell and SCells configured for the MCG, and the SCG may include the PSCell and SCells configured for the SCG. In addition, the cell may indicate the cell group, or the cell group may indicate the cell.

When an SPCell and multiple SCells are configured via an RRC message, a state (or mode) may be configured for the terminal via the RRC message, MAC CE, or DCI of a PDCCH for each cell (e.g., a PCell, a PSCell, or an SCell), each SCell, a BWP of each SCell, or a cell group. The state (or mode) of the cell may be configured to be one of an active mode or activated state, and a deactivated mode or deactivated state. In the above description, a cell in an active mode or active state may represent that, in a cell in the active mode or in an activated cell, the terminal may exchange UL or DL data with the base station in an activated BWP, an activated normal BWP, or a BWP other than an activated dormant BWP of the cell, may perform PDCCH monitoring for identification of an indication of the base station, may perform channel measurement for DL of the cell (or activated BWP, activated normal BWP, or BWP other than activated dormant BWP of the cell) in the active mode or the activated state, may periodically report measurement information to the base station, and may periodically transmit a pilot signal (e.g., an SRS) to the base station so that the base station can perform UL channel measurement. Alternatively, the terminal may activate or switch the BWP of the activated cell to the dormant BWP according to an indication (e.g., PDCCH, MAC CE, or RRC message) of the base station. If the dormant BWP is activated in the activated cell, the terminal may perform a processor of reporting channel measurement and reporting a channel measurement result, without performing PDCCH monitoring in the cell.

As another method, if the cell, in which the dormant BWP is activated, is the SCell, the terminal: may not perform PDCCH monitoring; may not receive DL data; may perform channel measurement or measurement result reporting; may suspend a configured periodic transmission resource (e.g., type 1 periodic transmission resource (configured UL grant type 1)); may clear or initialize a configured periodic transmission resource (e.g., type 2 periodic transmission resource (configured UL grant type 2)); may not transmit an SRS; may not transmit UL data; or may not transmit a PUCCH (e.g., scheduling request (SR) or preamble for random access). However, if the cell, in which the dormant BWP is activated or cell group suspension is indicated, is the PSCell, the terminal: may not perform PDCCH monitoring; may perform PDCCH monitoring in a very long cycle; may not receive DL data; may perform channel measurement or measurement result reporting; may suspend the configured periodic transmission resource (e.g., type 1 periodic transmission resource (configured UL grant type 1)); may clear or initialize the configured periodic transmission resource (e.g., type 2 periodic transmission resource (configured UL grant type 2)); may transmit an SRS; may not transmit UL data; may transmit a PUCCH (e.g., an SR or preamble for random access); or may perform a random access procedure.

If the cell, in which activation is performed to the BWP other than the dormant BWP, is the SCell, the terminal: may perform PDCCH monitoring; may receive DL data; may perform channel measurement or measurement result reporting; may resume the configured periodic transmission resource (e.g., type 1 periodic transmission resource (configured UL grant type 1)); may configure or activate the configured periodic transmission resource (e.g., type 2 periodic transmission resource (configured UL grant type 2)); may transmit an SRS; may transmit UL data; may transmit PUCCH (e.g., an SR or preamble for random access); or may perform a random access procedure.

If the cell, in which activation is performed to the BWP other than the dormant BWP or cell group resumption (SCG resumption) is indicated, is the PSCell, the terminal: may perform PDCCH monitoring; may receive DL data; may perform channel measurement or measurement result reporting; may resume the configured periodic transmission resource (e.g., type 1 periodic transmission resource (configured UL grant type 1)); may configure or activate the configured periodic transmission resource (e.g., type 2 periodic transmission resource (configured UL grant type 2)); may transmit an SRS; may transmit UL data; may transmit a PUCCH (e.g., an SR or preamble for random access); or may perform a random access procedure.

However, the deactivated mode or deactivated state of the cell may indicate a state in which BWPs configured for the cell are in the deactivated state, the configured BWPs are not activated, or there is no activated BWP among the configured BWPs, so that the terminal cannot exchange data with the base station, does not perform PDCCH monitoring to identify an indication of the base station, performs neither channel measurement nor measurement reporting, or transmits no pilot signal.

Accordingly, in order to activate cells in the deactivated mode, the base station first configures frequency measurement configuration information for the terminal via an RRC message, and the terminal performs cell or frequency measurement based on the frequency measurement configuration information. In addition, the base station may receive a cell or frequency measurement report of the terminal, and then may activate the deactivated cells, based on the frequency/channel measurement information. Accordingly, a significant amount of latency occurs for the base station to activate CA technology or DC technology for the terminal and start data transmission or reception.

Accordingly, a dormant BWP or a dormant state for a BWP of each activated cell (e.g., activated SCell or activated PSCell) is provided to save battery power of the terminal and promptly start data transmission or reception. Alternatively, the disclosure proposes configuration or introduction of a dormant BWP for each activated cell. Alternatively, a configuration or introduction of an active state, a dormant state, a suspended state, a deactivated state, or a resumed state of a cell group state for each cell group when DC technology is configured for the terminal, and a method is provided of performing an indication of cell group suspension (SCG suspension or cell group suspension) or cell group resumption (SCG resumption or cell group resumption) indicating state transition of the cell group, and terminal operations according thereto.

In the dormant BWP (e.g., dormant BWP in an activated SCell) or the BWP in the dormant mode of the activated cell, or when the dormant BWP is activated, the terminal cannot exchange data with the base station, does not perform PDCCH monitoring to identify an indication of the base station, or does not transmit a pilot signal, but the UE performs channel measurement and reports a measurement result for a measured frequency/cell/channel periodically or when an event occurs, according to a configuration by the base station. Therefore, since the terminal neither monitors a PDCCH nor transmits a pilot signal in the dormant BWP of the activated cell, the terminal can save battery power compared to a normal BWP (or BWP other than the dormant BWP) of the activated cell or compared to a case where the normal BWP (or BWP other than the dormant BWP) of the activated cell is activated, and since the terminal performs channel measurement reporting unlike the case where the cell is deactivated, the base station may promptly activate the normal BWP of the activated cell, based on a measurement report or a measurement report of the dormant BWP of the activated cell, and may allow CA technology to be promptly used, so as to reduce transmission latency.

Accordingly, the cell in the active mode or active state may represent that, in the cell in the active mode or in the activated cell, the terminal may exchange UL or DL data with the base station in an activated BWP, an activated normal BWP, or a BWP other than an activated dormant BWP of the cell, may perform PDCCH monitoring to identify an indication of the base station, may perform channel measurement for DL of the cell (or activated BWP, activated normal BWP, or activated BWP other than the dormant BWP of the cell) in the active mode or in the activated state, may periodically report measurement information to the base station, and may periodically transmit a pilot signal (an SRS) to the base station so that the base station can perform UL channel measurement. The cell in the active mode or active state may represent that, in the cell in the active mode or in the activated cell, the terminal in the dormant BWP of the activated cell cannot exchange UL or DL data with the base station or does not perform PDCCH monitoring to identify an indication of the base station, but may perform channel measurement for DL of the activated dormant BWP of the cell in the active mode or activated state, and may periodically report measurement information to the base station.

If the cell, in which the dormant BWP is activated or cell group suspension is indicated, is the PSCell, the terminal: may not perform PDCCH monitoring; may perform PDCCH monitoring in a very long cycle; may not receive DL data; may perform channel measurement or measurement result reporting; may suspend the configured periodic transmission resource (e.g., type 1 periodic transmission resource (configured UL grant type 1)); may clear or initialize the configured periodic transmission resource (e.g., type 2 periodic transmission resource (configured UL grant type 2)); may transmit an SRS; may not transmit UL data; may transmit a PUCCH (e.g., an SR or preamble for random access); or may perform a random access procedure.

As another method, if the cell in which the cell group deactivation (or suspension) is indicated is the PSCell (or SCG), the terminal: may not perform PDCCH monitoring; may perform PDCCH monitoring in a very long cycle; may not receive DL data; may not perform channel measurement or measurement result reporting; may suspend the configured periodic transmission resource (e.g., type 1 periodic transmission resource (configured UL grant type 1)); may clear or initialize the configured periodic transmission resource (e.g., type 2 periodic transmission resource (configured UL grant type 2)); may not transmit an SRS; may not transmit UL data; or may not transmit a PUCCH (e.g., an SR or preamble for random access). However, in the above description, when the cell group deactivation (or suspension) is indicated, if radio link monitoring (RLM) configuration information is configured in an RRC message indicating the cell group deactivation (or suspension), so that a frequency measurement (e.g., radio resource management (RRM)) procedure can be performed by using frequency measurement configuration information, a timer T310-based RLM procedure (a procedure in which a timer T310 is running if an indication of signal synchronization failure is received from a lower-layer device (PHY layer device), a radio link failure (RLF) is declared if the timer T310 expires, and the running timer T310 may be suspended if an indication of signal synchronization success is received) may be performed. In addition, in the above description, when the cell group deactivation (or suspension) is indicated, if beam-related configuration information is configured in an RRC message indicating the cell group deactivation (or suspension), so that a beam failure detection procedure is performed, the terminal may perform a beam failure detection procedure.

In addition, a dormant BWP may indicate a state of a BWP, or may be used as a name of a logical concept indicating a specific BWP. Therefore, the dormant BWP may be activated, deactivated, or switched. For example, an indication of switching from an activated second BWP to a dormant BWP in a first cell, an indication of shifting from the first cell to a dormant state or a dormant mode, or an indication of activating the dormant BWP of the first cell may be interpreted in the same way.

In addition, a normal BWP may indicate BWPs other than a dormant BWP, among BWPs configured for each cell of the terminal via an RRC message. In the normal BWP, the terminal may exchange UL or DL data with the base station, may perform PDCCH monitoring to identify an indication of the base station, may perform channel measurement for a DL, may periodically report measurement information to the base station, and may periodically transmit a pilot signal (e.g., an SRS) to the base station so as to enable the base station to perform UL channel measurement. In addition, the normal BWP may indicate a first active BWP, a default BWP, a first active BWP activated from dormancy, or an initial BWP.

In addition, only one dormant BWP may be configured, among BWPs configured for each cell of the terminal, and the dormant BWP may be configured for DL. As another method, one dormant BWP may be configured for UL or DL, among BWPs configured for each cell of the terminal.

In addition, a state of a cell group may be configured as an activated, suspended, or deactivated state. The state of the cell group may be indicated by a bitmap or an indicator of DCI of a PDCCH, may be indicated via MAC control information, or may indicated by an indicator of an RRC message. When the state of the cell group is indicated as the activated state, configuration information of the cell group configured or indicated via an RRC message (e.g., RRCReconfiguration message, RRCSetup message, or RRCResume message) may be stored and applied to the terminal, or may be restored or resumed, and the terminal: may perform PDCCH monitoring according to the configuration via the RRC message in the PCell, PSCell, or configured SCell of the cell group; may receive DL data; may perform channel measurement or measurement result reporting; may resume the configured periodic transmission resource (e.g., type 1 periodic transmission resource (configured UL grant type 1)); may configure or activate the configured periodic transmission resource (e.g., type 2 periodic transmission resource (configured UL grant type 2)); may transmit an SRS; may transmit UL data; may transmit a PUCCH (e.g., an SR or preamble for random access); or may perform a random access procedure.

In addition, when the state of the cell group is indicated as a suspended state or a deactivated state, configuration information of the cell group configured or indicated via the RRC message (e.g., RRCReconfiguration message, RRCSetup message, or RRCResume message) may be stored in the UE, or the configuration information may be not discarded but application thereof to the terminal may be suspended, and the terminal: may not perform PDCCH monitoring according to the configuration via the RRC message in the PCell, PSCell, or configured SCell of the cell group; may perform PDCCH monitoring in a very long cycle; may not receive DL data; may perform channel measurement or measurement result reporting; may suspend the configured periodic transmission resource (e.g., type 1 periodic transmission resource (configured UL grant type 1)); may clear or initialize the configured periodic transmission resource (e.g., type 2 periodic transmission resource (configured UL grant type 2)); may transmit an SRS; not transmit UL data; may transmit a PUCCH (e.g., an SR or preamble for random access); or may perform a random access procedure.

In addition, when the state of the cell group is indicated as a deactivated state, or when releasing of cell group configuration information is indicated, the terminal may clear or discard the configuration information of the cell group configured or indicated via the RRC message (e.g., RRCReconfiguration message, RRCSetup message, or RRCResume message).

Figure 5:
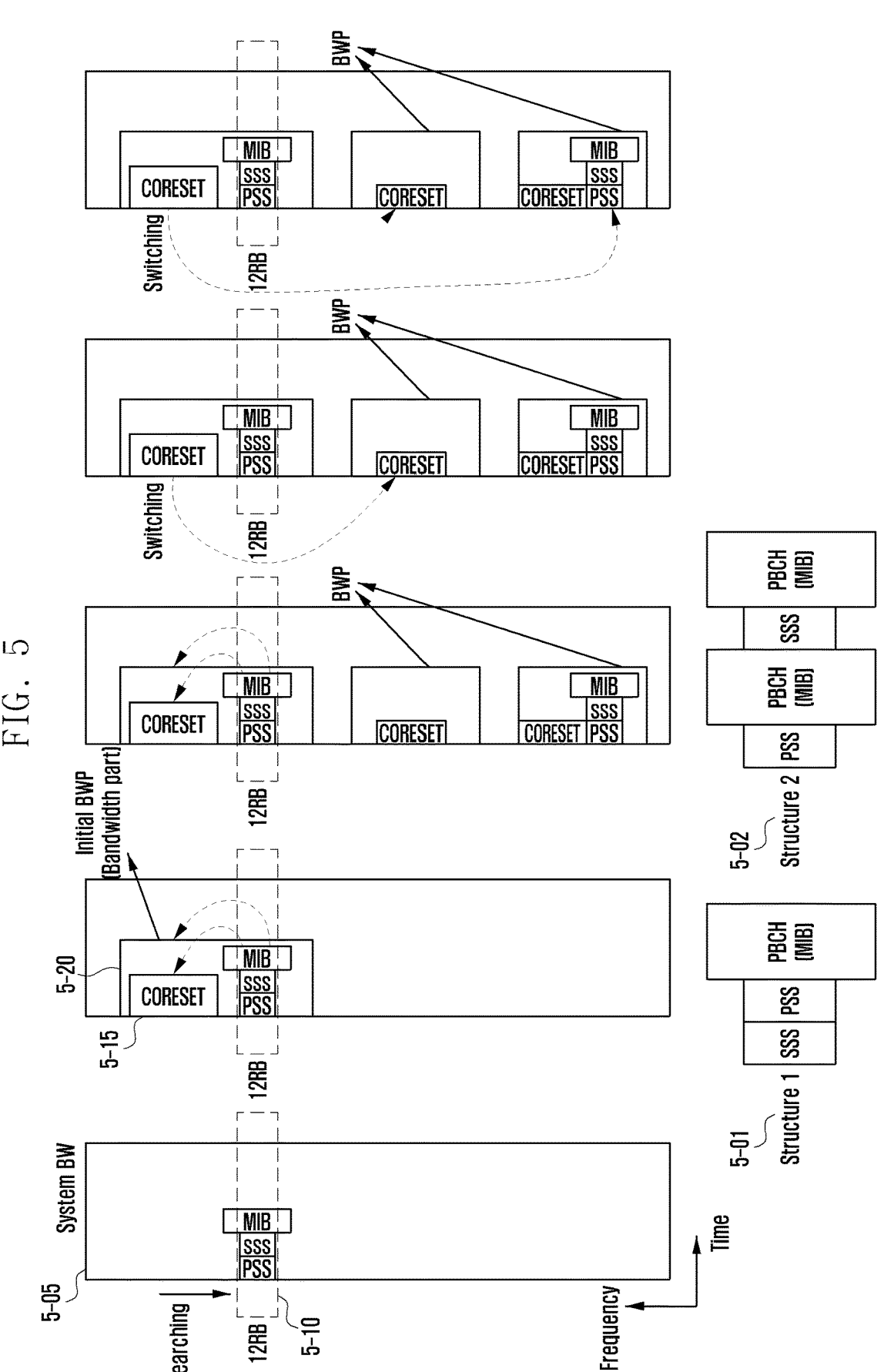
FIG. 5 illustrates a procedure of servicing a terminal by using a wide frequency bandwidth in a next-generation mobile communication system according to an embodiment.

FIG. 5 illustrates a procedure of servicing a terminal by efficiently using a significantly wide frequency bandwidth in a next-generation mobile communication system according to an embodiment.

In FIG. 5, a method of providing a service to terminals having different capabilities (or categories) by efficiently using a significantly wide frequency bandwidth and saving a battery in the next-generation mobile communication system is described.

One cell to which the base station provides a service may service a significantly wide frequency band as in a system band 5-05. However, in order to provide a service to terminals having different capabilities, the wide frequency band may be divided into multiple BWPs to manage the same as one cell.

A terminal, the power of which is initially turned on, may search the entire frequency band provided by a service provider (public land mobile network (PLMN)) in units of predetermined resource blocks (e.g., in units of 12 resource blocks (RBs)). That is, the terminal may start searching a primary synchronization sequence (PSS)/secondary synchronization sequence (SSS) in the entire system bandwidth in units of resource blocks (operation 5-10). If the terminal searches for the PSS/SSS 5-01 or 5-02 in units of resource blocks and then detects the signals, the terminal may acquire and interpret (decode) the signals to identify a boundary between a subframe and a radio transmission resource frame (radio frame). Accordingly, the terminal may identify subframes in units of 1 ms and synchronize a DL signal with the base station. The RB described above is the size of a predetermined frequency resource and a predetermined time resource, and may be defined as a two-dimensional unit. For example, time resources may be defined in units of slots (1 slot includes 14 symbols), and frequency resources may be defined as 12 subcarriers (1 carrier×15 kHz=180 kHz). When the terminal completes synchronization, the terminal may identify information on a control resource set (CORE-SET) by identifying a master information block (MIB) or minimum system information (MSI), and may identify initial access BWP information (operations 5-15 and 5-20). The CORESET information above refers to the location of time/frequency transmission resources through which a control signal is transmitted from the base station, and may indicate, e.g., the location of resources through which a PDCCH channel is transmitted. That is, the CORESET information is information indicating the location at which first system information (system information block 1 (SIB 1)) is transmitted, and indicates a frequency/time resource through which a PDCCH is transmitted. The terminal may identify information on an initial BWP by decoding the first system information. As described above, if the terminal completes synchronization of the DL signal with the base station and is able to receive a control signal, the terminal may perform a random-access procedure in the initial BWP of a cell on which the terminal camps, request an RRC connection configuration, and receive an RRC message to perform the RRC connection configuration.

In the RRC connection configuration, multiple BWPs may be configured in one cell (e.g., PCell, PSCell, SPCell, or SCell). Multiple BWPs may be configured for the DL within the one cell, and separately, multiple BWPs may be configured for the UL.

The multiple BWPs may be indicated and configured by a BWP ID to be used as an initial BWP, a default BWP, a first active BWP, a dormant BWP, or a first active BWP which is activated from dormancy.

The initial BWP above may be used as a cell-specifically determined BWP existing in each cell, and may be used as a BWP at which the terminal initially accessing the cell can configure a connection to the cell through a random access procedure or the terminal having configured the connection can perform synchronization. In addition, The base station may configure an initial DL BWP to be used in DL and an initial UL BWP to be used in UL, for each cell. In addition, configuration information of the initial BWP may be broadcasted through first system information (e.g., SIB 1) indicated by the CORESET, and may be configured again for the connected terminal by the baes station through an RRC message. In addition, the initial BWP may be used while being designated with BWP ID number 0 in each of the UL and the DL. That is, all terminals accessing the same cell may identically designate the same initial BWP to BWP ID number 0 and use the same. This is because there may be an advantage of easily performing a contention-based random-access procedure because the base station is enabled to transmit a RAR message in the initial BWP which all terminals can read, during the random access procedure.

The first active BWP may be terminal-specifically (UE-specifically) configured and may be designated to and indicated by a BWP ID among multiple BWPs. The first active BWP may be configured for each of the DL and the UL, and include a first active DL BWP and a first active UL BWP configured as respective BWP IDs. When multiple BWPs are configured in one cell, the first active BWP may be used to indicate a BWP to be activated and used first. For example, when a PCell or PSCell and multiple SCells are configured for the terminal and multiple BWPs are config-ured for each PCell or PSCell or each SCell, if the PCell, the PSCell, or the SCell is activated, the terminal may activate and use a first active BWP among the multiple BWPs configured for the PCell, PSCell, or SCell. That is, the first active DL BWP may be activated and used for the DL, and the first active UL BWP may be activated and used for the UL.

The operation in which the terminal switches the current or activated DL BWP for the cell and activates the same to the first active DL BWP (or a BWP configured or indicated by an RRC message), or the terminal switches the current or activated UL BWP and activates the same to the first active UL BWP (or a BWP configured or indicated by an RRC message) may be performed when an indication of activation of the cell or the BWP from a deactivated state is received via an RRC message, MAC control information, or DCI. In addition, the operation may be also performed when an indication of transitioning the cell or the BWP to the dormant state, or an indication of activation of the dormant BWP, via the RRC message, MAC control information, or DCI. This is because when the cell or the BWP is activated, the current or activated DL BWP is switched to and activated as the first active DL BWP (or the BWP configured or indicated by the RRC message) or the UL BWP is switched to and activated as the first active UL BWP (or the BWP configured or indicated by the RRC message), and thus even when a channel measurement report is transmitted in the dormant state, the base station can effectively use CA technology only by measuring and reporting a frequency/channel for the first active DL/UL BWP. The default BWP above may be terminal-specifically (or UE-specifically) con-figured, and may be designated to and indicated by the ID of a BWP among multiple BWPs.

The default BWP may be configured only for the DL. The default BWP may be used as a BWP on which fallback of the activated BWP is to be performed after a predetermined time, among multiple DL BWPs. For example, the base station may configure a BWP inactivity timer for each cell or each BWP through an RRC message, and the timer may start or restart when data transmission/reception is per-formed in the activated BWP rather than the default BWP, or start or restart when the activated BWP is switched to another BWP. If the timer expires, the terminal may perform fallback or switching of the DL BWP activated in the cell to the default BWP. The switching may mean a procedure of deactivating the currently activated BWP and activating the BWP for which switching is indicated, and the switching may be triggered through an RRC message, MAC CE), or layer 1 (L1) signaling (e.g., DCI of a PDCCH). The switch-ing may be triggered by an indication of the BWP to be activated or switched to, and the BWP may be indicated by a BWP ID (e.g., 0, 1, 2, 3, or 4).

The reason why the default BWP is applied only to and used for the DL is that the base station allows the terminal to receive an indication of the base station (e.g., DCI of a PDCCH) through fallback to the default BWP for each cell after a predetermined time, and thus base station scheduling can be facilitated. For example, if the base station configures the default BWP of the terminals accessing one cell as the initial BWP, the base station may continuously transmit a scheduling indication only in the initial BWP after a prede-termined time. If the default BWP is not configured through the RRC message, fallback of the default BWP to the initial BWP may be performed when the BWP inactivity timer expires by considering the initial BWP as the default BWP.

As another method, in order to increase implementation freedom of the base station, the default BWP may be also defined and configured for the UL and used in the same manner as the default BWP of the DL.

The dormant BWP above is a BWP in a dormant mode of the activated cell or a dormant BWP in the activated SCell. Alternatively, when the dormant BWP is activated, the terminal cannot exchange data with the base station, does not monitor a PDCCH to identify an indication of the base station, or does not transmit a pilot signal, but measures a channel, and reports a measurement result for the measured frequency/cell/channel periodically or when an event is generated according to a configuration of the base station. Accordingly, since the terminal does not monitor the PDCCH and does not transmit the pilot signal in the dormant BWP in the activated cell, the terminal may save a battery life compared to a normal BWP (or a BWP other than the dormant BWP) of the activated cell, or compared to a case where a normal BWP (or a BWP other than the dormant BWP) of the activated cell is activated, and since the channel measurement reporting is performed unlike a case where the cell is deactivated, the base station is enabled to promptly activate the normal BWP of the activated cell, based on the measurement report or the measurement report of the dormant BWP of the activated cell, and promptly use CA technology, whereby transmission latency can be reduced.

A first active BWP activated after switching from a dormant state or a dormant BWP (or a first active non-dormant BWP or a BWP configured or indicated through an RRC message) may be a BWP which should be activated through switching of the current or activated BWP of the activated cell by the terminal or a BWP which should be activated from a dormant state, configured in the RRC message according to an indication when the terminal receives, from the base station through DCI of PDCCH, a MAC CE, or an RRC message, an indication of switching a BWP of the activated cell from a dormant BWP to a normal BWP (or a BWP other than the dormant BWP), an indication of switching or transitioning of an active BWP in the dormant BWP to a normal BWP, or an indication indicating switching or transitioning of the active BWP in the dormant BWP to the normal BWP (e.g., a first active BWP activated from dormancy) when the terminal operates a BWP of one activated cell as a dormant BWP, when an activated BWP of the activated cell is a dormant BWP, or when switching to the dormant BWP is performed in the cell.

Figure 6:
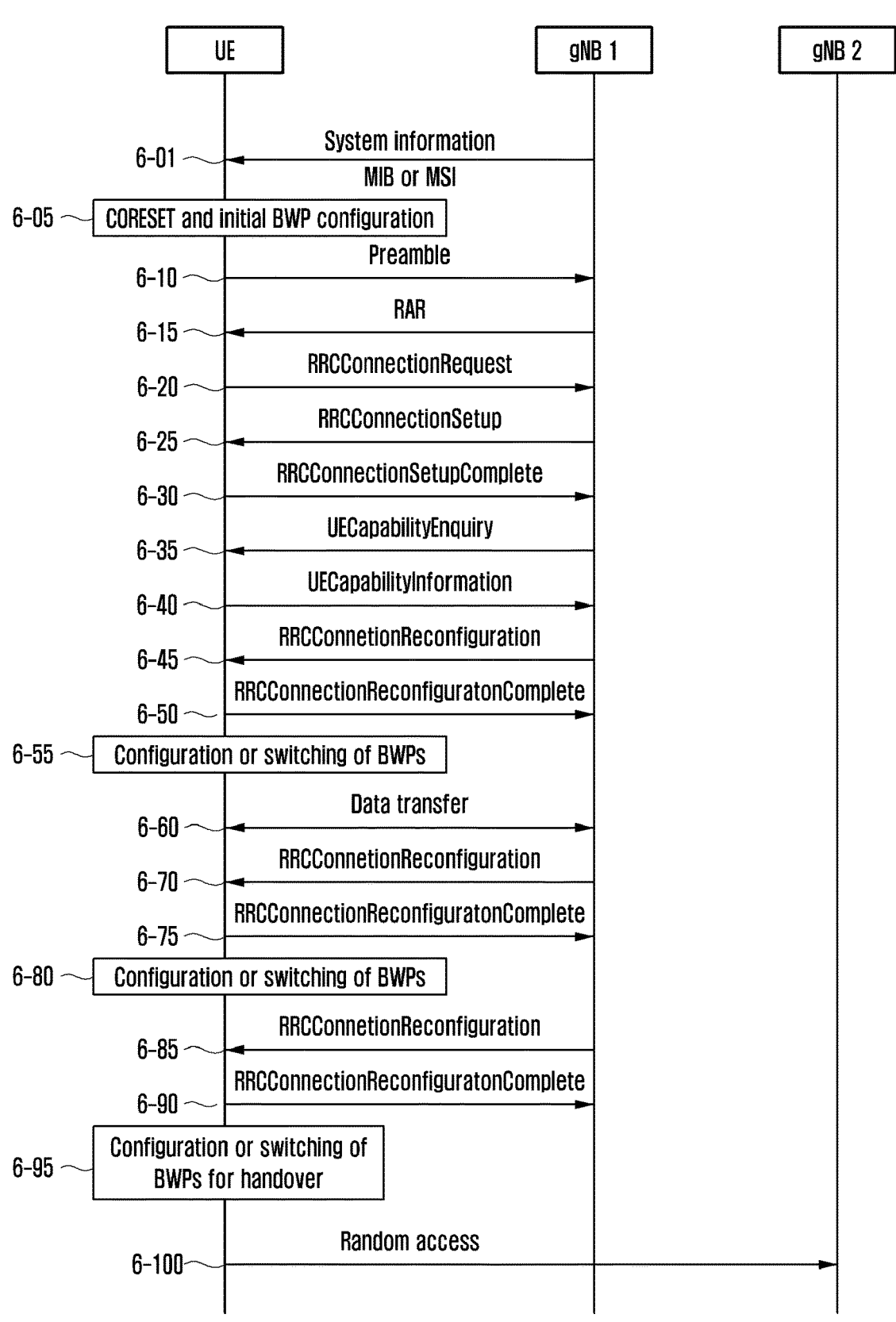
FIG. 6 illustrates a procedure in which a terminal switches from an RRC-idle mode to an RRC-connected mode in a next-generation mobile communication system according to an embodiment.

FIG. 6 illustrates a procedure in which a terminal switches from an RRC-idle mode to an RRC-connected mode in a next-generation mobile communication system according to an embodiment.

One cell to which the base station provides a service may service a significantly wide frequency band. A terminal may search the entire frequency band provided by a service provider (PLMN) in units of predetermined resource blocks (e.g., in units of 12 RBs). That is, the terminal may start searching a PSS/SSS in the entire system bandwidth in units of resource blocks. If the terminal searches for the PSS/SSS in units of resource blocks and then detects the signals, the terminal may interpret (decode) the signals to identify a boundary between a subframe and a radio transmission resource frame (radio frame). In the above description, if the terminal completes synchronization, the terminal may decode system information of a cell on which the terminal currently camps. That is, the terminal may identify information on a CORESET by identifying an MIB or an MSI, and may identify initial access BWP information by decoding the system information in steps 6-01 and 6-05. The CORESET information above refers to the location of time/frequency transmission resources through which a control signal is transmitted from the base station, and may indicate, e.g., the location of resources through which a PDCCH channel is transmitted.

As described above, when the terminal completes synchronization of the DL signal with the base station and is able to receive a control signal, the terminal may perform a random-access procedure in the initial BWP, receive a random-access response, request an RRC connection configuration, and receive an RRC message to perform the RRC connection configuration in steps 6-10, 6-15, 6-20, 6-25, and 6-30.

When the basic RRC connection configuration is completed, the base station may transmit, to the terminal, an RRC message (UECapabilityEnquiry) enquiring about a terminal capability (UE capability), so as to identify the terminal capability in step 6-35. As another method, the base station may enquire an MME or an AMF about the terminal capability to identify the terminal capability. This is because the MME or the AMF may have terminal capability information if the terminal previously accessed the MME or the AMF. If there is no terminal capability required by the base station, the base station may request the terminal capability from the terminal. When the terminal reports terminal capability, the terminal may report, to the base station, whether a dormant BWP is supported for an SCell of each cell group (MCG or SCG), whether a first embodiment, a second embodiment, a third embodiment, or a fourth embodiment, as disclosed herein, is supported, whether a dormant BWP is supported for a PSCell of each cell group, whether a cell group suspension or resumption procedure is supported for a PSCell of each cell group, the number of supported cell groups, or the like, as the terminal capability. In addition, in the RRC connection resumption procedure, the terminal may also report, to the base station through an RRCResume message, whether configuration information of an SCell of an MCG, an SCell of an SCG, or a PSCell of an SCG can be stored and restored, discarded, partially reconfigured, or activated, as the terminal capability.

The reason why the base station transmits the RRC message to the terminal to identify the terminal capability is to identify the terminal capability, e.g., identify the range of a frequency band that the terminal can receive (decode), or an area of the frequency band that the terminal can receive (decode). After identifying the terminal capability, the base station may configure an appropriate BWP for the terminal. When the terminal receives the RRC message enquiring about the terminal capability, the terminal may indicate, as a response to the RRC message, the range of bandwidth that the terminal supports or the range of bandwidth supported in the current system bandwidth, through indication of an offset from a reference center frequency, through direct indication of a start point and an end point of the supported frequency bandwidth, or through indication of a center frequency and a bandwidth in step 6-40.

The BWP above may be configured through an RRCSetup message of step 6-25, an RRCResume message, or an RRCReconfiguration message of steps 6-45, 6-70, and 6-85 of the RRC connection configuration, and the RRC message may include configuration information for a PCell, a PSCell, or multiple SCells, and multiple BWPs may be configured for each cell (PCell, PSCell, or SCell). UE transmits RRC Connection Reconfiguration complete message of steps 6-50, 6-75, and 6-90 as a response to the RRC Connection Reconfiguration message. When multiple BWPs are configured for each cell, multiple BWPs to be used in the DL of each cell may be configured, and in a case of a frequency division duplexing (FDD) system, multiple BWPs to be used in the UL of each cell may be configured to be distinguished from DL BWPs. In a case of a time division duplexing (TDD) system, multiple BWPs to be used in common for the DL and the UL of each cell may be configured.

The cell configuration information of each cell (PCell, PSCell, or SCell) or the information for BWP configuration may include some of the following information:

Cell ID (SCell index)

Cell configuration information

■ First channel measurement configuration information for each cell or each BWP

■ Second channel measurement configuration information for each cell or each BWP DL BWP configuration information of cell ■ Initial DL BWP configuration information ■ Multiple BWP configuration information pieces and BWP IDs corresponding to respective BWPs ■ Initial configuration information of DL BWP or cell (e.g., activated state, dormant state, or deactivated state)

■ BWP ID indicating first active DL BWP

■ BWP ID indicating default BWP

■ Configuration information for PDCCH monitoring each BWP (e.g., CORESET information, search space resource information, PDCCH transmission resources, periodicity, and subframe number information, etc.)

■ BWP ID indicating dormant BWP

■ BWP ID indicating a first active BWP activated from dormancy

■ BWP inactivity timer configuration and a timer value

■ First channel measurement configuration information for each cell or each BWP

■ Second channel measurement configuration information for each cell or each BWP UL BWP configuration information of cell ■ Initial UL BWP configuration information ■ Multiple BWP configuration information pieces and BWP IDs corresponding to respective BWPs ■ Initial configuration information of UL BWP of cell (e.g., activated state, dormant state, or deactivated state)

■ BWP ID indicating first active UL BWP

Configuration information relating to transmission resource through which channel measurement is to be performed and measurement result is to be reported in dormant BWP or BWP other than dormant BWP (e.g., PUCCH transmission resource information of PCell, PUCCH SCell, or PSCell)

With respect to first channel measurement configuration information which can be configured to be included the RRC message (RRCReconfiguration or RRCResume), for prompt activation of the cell group, cell (e.g., PCell, PSCell, or SCell) configuration information of the cell group may include, to allow the base station to temporally transmit many channel measurement signals or frequently transmit a channel measurement signal to enable prompt channel measurement in the cell, configuration information such as a period for a frequent channel measurement signal (e.g., a radio resource, a TRS, an SSB, an CSI-RS, or an RS), transmitted transmission resource information (a frequency or time transmission resource via which the frequent channel measurement signal is transmitted), an interval or frequency (the number of times the frequent channel measurement signal is transmitted), a time interval (an interval in which the frequent channel measurement signal is transmitted (e.g., a time unit (slot, subframe, symbol, or the like)), or a transmission resource, cycle, interval, timing, an offset, or the like via which the terminal should report a measurement result. The first channel measurement configuration information may allow a configuration of a short reporting cycle (or transmission resource) in which the terminal may report a channel measurement result, or a configuration of a transmission resource for channel measurement so that the base station can transmit many channel measurement signals (or transmission resources (e.g., radio resources or TRSs) or frequently transmit a channel measurement signal so as to support the terminal to perform prompt channel measurement or more signal measurements. The first channel measurement configuration information may include information on a configuration by the base station for a channel measurement signal for a specific terminal (or terminals) in the cell or the BWP. For example, the first channel measurement configuration information may include the period of the channel measurement signal, the number of times of transmission of the signal, signal transmission duration, an offset for a signal transmission time, the length of time between transmitted signals, a list of multiple transmittable channel measurement signals, a time transmission resource (or a frequency transmission resource) indicating the position of a transmitted signal, a transmission resource (a time transmission resource or a frequency transmission resource) for reporting a measurement result, a measurement result reporting period, or the like. In addition, for multiple cells or BWPs configured via the RRC message, the first channel measurement configuration information may be configured differently for each cell or each BWP, and to support for the terminal to easily measure a transmission resource for channel measurement, beam-related configuration information (TCI state or QCL) such as a beam direction, a beam number, or a beam position may be configured together. In addition, a timing advance value (an offset value) for synchronization of a DL signal of the base station or a UL signal of the base station, or a timer (i.e., a TAT or a TAT value) indicating validity of the TA value may be configured for the first channel measurement configuration information, so that channel measurement or channel measurement reporting can be accurately performed. In addition, the first channel measurement configuration information configured via the RRC message may include information on multiple channel measurement signals, and measurement signal information or beam configuration information of one channel, among the above-configured information on the multiple channel measurement signals, is indicated via the RRC message, MAC CE, or DCI so that the terminal can perform channel measurement or channel measurement reporting by applying and using the indicated channel measurement signal information and beam configuration information. The indicating method may include defining mapping between a bitmap, an index, or an ID to each configured channel measurement signal information configured above, and indicating based on the definition. As another method, channel measurement signal information may be configured or indicated via the RRC message or MAC CE so that the terminal can perform channel measurement or channel measurement reporting by applying or using the configured (indicated) channel measurement signal information.

The first channel measurement configuration information proposed in an embodiment is initially deactivated at the time of configuration via the RRC message or after handover, and may be later activated via the MAC control information, DCI of the PDCCH, or the RRC message, as proposed herein. As in the above case where the configuration is made via the RRC message, an initial state needs to be a deactivated state so that the base station can easily manage a cell state or channel measurement procedure of the terminal and also accurately manage a timing indicating when and how the terminal performs channel measurement, without an RRC message processing delay problem.

In addition, second channel measurement configuration information may be included or configured in the RRC message (RRCReconfiguration or RRCResume). The second channel measurement configuration information may include general channel measurement configuration information such as a transmission resource, cycle, time interval, or frequency of the channel measurement signal, or a transmission resource, cycle, or time interval for channel measurement reporting.

The above-configured initial BWP, default BWP, or first active BWP may be used for the following purpose, and may operate as described below so as to serve the purpose.

The initial BWP above may be used as a cell-specifically determined BWP existing in each cell, and may be used as a BWP at which the terminal initially accessing the cell can configure a connection to the cell through a random access procedure or the terminal having configured the connection can perform synchronization. In addition, the base station may configure an initial DL BWP to be used in DL and an initial UL BWP to be used in UL, for each cell. In addition, configuration information of the initial BWP may be broadcasted through first system information (e.g., SIB 1) indicated by the CORESET, and may be configured again for the connected terminal by the baes station through an RRC message. In addition, the initial BWP may be used while being designated with BWP ID number 0 in each of the UL and the DL. That is, all terminals accessing the same cell may identically designate the same initial BWP to BWP ID number 0 and use the same. This is because there may be an advantage of easily performing a contention-based random-access procedure because the base station is enabled to transmit a RAR message in the initial BWP which all terminals can read, during the random access procedure.

The first active BWP may be terminal-specifically (UE-specifically) configured and may be designated to and indicated by a BWP ID among multiple BWPs. The first active BWP may be configured for each of the DL and the UL, and include a first active DL BWP and a first active UL BWP configured as respective BWP IDs. When multiple BWPs are configured in one cell, the first active BWP may be used to indicate a BWP to be activated and used first. For example, when a PCell or PSCell and multiple SCells are configured for the terminal and multiple BWPs are configured for each PCell or PSCell or each SCell, if the PCell, the PSCell, or the SCell is activated, the terminal may activate and use a first active BWP among the multiple BWPs configured for the PCell, PSCell, or SCell. That is, the first active DL BWP may be activated and used for the DL, and the first active UL BWP may be activated and used for the UL.

The operation in which the terminal switches the current or activated DL BWP for the cell and activates the same to the first active DL BWP (or a BWP configured or indicated by an RRC message), or the terminal switches the current or activated UL BWP and activates the same to the first active UL BWP (or a BWP configured or indicated by an RRC message) may be performed when an indication of activation of a cell or a BWP of an activated cell from a deactivated state is received, or when an indication of switching to or activation of a normal BWP from a deactivated or dormant BWP is received through an RRC message, MAC control information, or DCI OF PDCCH. In addition, when the terminal receives, through an RRC message, MAC control information, or DCI OF PDCCH, an indication of transition of an activated cell or BWP to a dormant state, or an indication of switching to or activation of a dormant BWP, the terminal may switch or activate the BWP to a dormant BWP, or make the BWP dormant.

In the above description, making the BWP dormant, switching to the dormant BWP, or activation of the dormant BWP may mean performing of the operation proposed in the dormant state in various embodiments. That is, performing channel measurement for a DL BWP (or a dormant BWP) and reporting a result thereof to the base station, without performing PDCCH monitoring, may be performed. As another method, when the activated cell or BWP is switched to or activated as a normal BWP, the DL BWP is switched to and activated as a first active DL BWP and the UL BWP is switched to and activated as a first active UL BWP, and thus the dormant BWP may be configured as the first active DL or UL BWP or a default BWP. The default BWP above may be terminal-specifically (or UE-specifically) configured, and may be designated to and indicated by the ID of a BWP among multiple BWPs. The default BWP may be configured only for the DL. The default BWP may be used as a BWP on which fallback of the activated BWP is to be performed after a predetermined time, among multiple DL BWPs. For example, the base station may configure a BWP inactivity timer for each cell or each BWP through an RRC message, and the timer may start or restart when data transmission/reception is performed in the activated BWP rather than the default BWP, or start or restart when the activated BWP is switched to another BWP. If the timer expires, the terminal may perform fallback or switching of the DL BWP activated in the cell to the default BWP. The switching may mean a procedure of deactivating the currently activated BWP and activating the BWP for which switching is indicated, and the switching may be triggered through an RRC message, MAC control information (MAC CE), or L1 signaling (DCI of a PDCCH). The switching may be triggered by an indication of the BWP to be activated or switched to, and the BWP may be indicated by a BWP ID (e.g., 0, 1, 2, 3, or 4).

The reason why the default BWP is applied only to and used for the DL is that the base station allows the terminal to receive an indication of the base station (e.g., DCI of a PDCCH) through fallback to the default BWP for each cell after a predetermined time, and thus base station scheduling can be facilitated. For example, if the base station configures the default BWP of the terminals accessing one cell as the initial BWP, the base station may continuously transmit a scheduling indication only in the initial BWP after a predetermined time. If the default BWP is not configured through the RRC message, fallback of the default BWP to the initial BWP may be performed when the BWP inactivity timer expires by considering the initial BWP as the default BWP.

As another method, in order to increase implementation freedom of the base station, the default BWP may be defined and configured for the UL and used in the same manner as the default BWP of the DL.

The dormant BWP above is a BWP in a dormant mode of the activated cell or a dormant BWP in the activated SCell. Alternatively, when the dormant BWP is activated, the terminal cannot exchange data with the base station, does not monitor a PDCCH to identify an indication of the base station, or does not transmit a pilot signal, but measures a channel, and reports a measurement result for the measured frequency/cell/channel periodically or when an event is generated according to a configuration of the base station. Accordingly, since the terminal does not monitor the PDCCH and does not transmit the pilot signal in the dormant BWP in the activated cell, the terminal may save a battery life compared to a normal BWP (or a BWP other than the dormant BWP) of the activated cell, or compared to a case where a normal BWP (or a BWP other than the dormant BWP) of the activated cell is activated, and since the channel measurement reporting is performed unlike a case where the cell is deactivated, the base station is enabled to promptly activate the normal BWP of the activated cell, based on the measurement report or the measurement report of the dormant BWP of the activated cell, and promptly use CA technology, whereby transmission latency can be reduced.

The first active BWP activated from dormancy (or a first active non-dormant BWP) may be a BWP which should be activated or switched from a BWP of the activated cell by the terminal, or a first active BWP activated from dormancy, configured in the RRC message, according to an indication when the terminal receives, from the base station through DCI OF PDCCH, a MAC CE, or an RRC message, an indication of switching a BWP of the activated cell from a dormant BWP to a normal BWP (or a BWP other than the dormant BWP), an indication of switching or transitioning of an active BWP in the dormant BWP to a normal BWP, or an indication indicating switching or transitioning of the active BWP in the dormant BWP to the normal BWP (e.g., a first active BWP activated from dormancy) when the terminal operates a BWP of one activated cell as a dormant BWP, when an activated BWP of the activated cell is a dormant BWP, or when switching to the dormant BWP is performed in the cell.

In various embodiments, switching from a first BWP to a second BWP may be interpreted as activation of the second BWP, or may be interpreted as deactivation of the activated first BWP and activation of the second BWP.

In addition, in the above description, a state transition timer may be configured in the RRCSetup message or the RRCResume message of step 6-25 or the RRCReconfiguration message 6-45 of the RRC connection configuration so that the terminal can perform state transmission by itself even though the terminal does not receive an indication by the base station through an RRC message, a MAC control information, or DCI OF PDCCH. For example, a cell deactivation timer (ScellDeactivationTimer) may be configured for each cell, and when the cell deactivation timer expires, the cell may be transitioned to a deactivated state.

In addition, in the RRCSetup message, RRCResume message of step 6-25, or RRCReconfiguration message of step 6-45 of the RRC connection configuration, frequency measurement configuration information (measurement configuration), frequency measurement gap information (measurement gap information), and the like may be configured, and frequency measurement object (measurement object) information may be included. In addition, in the RRCSetup message of step 6-25, RRCResume message, or RRCReconfiguration message of step 6-45 of the RRC connection configuration, a function (power saving mode) for reducing power consumption may be configured, and configuration information, such as a DRX cycle, an offset, an on-duration time (time during which the UE needs to monitor PDCCH), time information, or the like, information on a time at which a PDCCH of the base station is monitored or detected before the on-duration time in the DRX cycle, short time cycle information, or the like may be configured together with the function for reducing power consumption. If the function for reducing power consumption of the terminal is configured, the terminal may configure a DRX cycle, and detect a wake-up signal (WUS) in a period configured for monitoring of a PDCCH of the base station before the on-duration time, and the base station may indicate, via DCI of PDCCH of the WUS, to the terminal whether to skip (or not perform) or perform PDCCH monitoring in an immediately following on-duration time. The terminal always needs to monitor the PDCCH in the on-duration time, wherein the base station indicates, via the WUS, to the terminal not to perform PDCCH monitoring in the on-duration time, so as to enable reduction of battery consumption.

When the RRC connection configuration is completed as described above, the terminal may configure multiple BWPs according to an indication configured via an RRC message (step 6-55, 6-80, 6-95). UE and gNB 1 performs data transfer 6-60. In order to save battery, one or a small number of bandwidths among the multiple configured BWPs may be activated. For example, the base station may indicate, to the terminal, one BWP to be activated. The base station may indicate activation of the BWP via an RRC message, MAC control information (e.g., a MAC CE), or L1 signaling (PHY layer control signal such as DCI of a PDCCH), so as to indicate switching from an initial access BWP to a new BWP. As another method, new bitmap information may be defined in DCI of the PDCCH, and whether to activate a normal BWP (or a BWP other than a dormant BWP), whether to activate a dormant BWP, or whether to deactivate a BWP may be indicated.

As another method, the bitmap may indicate whether to activate a normal BWP (e.g., first active BWP to be activated from dormancy), whether to activate a dormant BWP, whether to switch to a dormant BWP, or whether to perform BWP switching. Since there may be many other new users accessing the initial access BWP, it may be more advantageous, in terms of scheduling, to allocate a new BWP and separately manage connected users. This is because the initial access BWP is not terminal-specifically configured, but may be shared and used in common for all terminals. Further, in order to reduce signaling overhead, a default BWP may be dynamically indicated via MAC control information, L1 signaling, or system information.

In the above description, in the RRC message (RRCSetup message, RRCResume message of step 6-25, or RRCConnectionReconfiguration message of step 6-70), configuration information for a cell group may be also included. The configuration information for a cell group may include some or multiple pieces of information from the following information, or may indicate a state, procedure, application or releasing of configuration information, or the like for each cell group:

Cell group ID indicating cell group (e.g., cell group ID or index)

Indicator indicating state of cell group (e.g., active state, suspended state, or deactivated state)

Indicator indicating state of cell group (e.g., indicator for suspending (or deactivating) cell group (e.g., a cell-group (e.g., an SCG) suspension indicator) or indicator for resuming (or activating) cell group (e.g., a cellgroup resumption indicator))

Indicator for triggering procedure of corresponding protocol layer (e.g., SDAP layer, PDCP layer, RLC layer, or MAC layer) according to indicator indicating state of cell group (e.g., PDCP re-establishment indicator, PDCP data recovery indicator, indicator triggering new procedure, RLC re-establishment indicator, MAC layer reset indicator, or MAC layer partial reset indicator)

When an indicator for suspending (or deactivating) a state of a cell group is included, second DRX configuration information (e.g., monitoring time, active time (on duration) length, cycle, offset, or the like) which enables PDCCH monitoring to be performed with a very long cycle in a PSCell of the cell group may be configured. For example, when the terminal receives an indicator for suspending the cell group, the terminal may perform PDCCH monitoring based on a very long cycle by applying the second DRX configuration information, so as to save power of the terminal. As another method, when the terminal receives the indicator for suspending the cell group, the terminal may, by applying BWP configuration information for the PSCell of the cell group, activate or switch a DL BWP of the PSCell of the cell group to a dormant BWP, and may perform terminal operations in a cell having an activated dormant BWP, which are proposed in various embodiments. In addition, when the terminal receives the indicator for suspending the cell group, the terminal may deactivate all SCells configured in the cell group. As another method, when the terminal receives the indicator for suspending the cell group, the terminal may activate or switch a DL BWP to a dormant BWP for an SCell having a dormant BWP configured therein, among the SCells configured in the cell group, and may perform terminal operations in a cell having an activated dormant BWP, which are proposed in various embodiments, or may perform deactivation for an SCell having no dormant BWP configured therein. As another method, when the terminal receives, via the RRC message, the indicator for suspending the cell group, the terminal may, according to the indicator or configuration information on each SCell of the cell group, which is included in the RRC message, activate or deactivate each SCell, make each SCell dormant, or activate a dormant BWP, or the terminal may activate or deactivate each SCell of the cell group, make each SCell dormant, or activate a dormant BWP, via the indicator (e.g., bitmap) of a PDCCH, the MAC control information, or the RRC message before or after reception of the indicator for suspending the cell group.

Configuration information relating to a transmission resource via which channel measurement is performed in a dormant BWP or in a BWP other than the dormant BWP, and a measurement result is reported (e.g., PUCCH transmission resource information of a PCell, a PUCCH SCell, or a PSCell)

When an indicator for resuming (or activating) a state of a cell group is included, first DRX configuration information (e.g., monitoring time, active time (on duration) length, cycle, offset, etc.) which enables PDCCH monitoring to be performed again in a PSCell of the cell group may be configured. Alternatively, the first DRX configuration information stored for the cell group may be restored and applied. For example, when the terminal receives an indicator for resuming the cell group, the terminal may perform PDCCH monitoring by applying the stored first DRX configuration information or the first DRX configuration information received via the RRC message, thereby resuming data transmission or reception. As another method, when the terminal receives an indicator for resuming the cell group, the terminal may activate or switch a DL BWP of the PSCell of the group to a BWP (e.g., BWP configured via an RRC message) other than a dormant BWP, by applying BWP configuration information for the PSCell of the cell group, and the terminal may perform UE operations in a cell having which an activated normal BWP (BWP other than a dormant BWP), which are proposed in various embodiments. Alternatively, when the terminal receives an indicator for resuming the cell group, the terminal may a trigger random access procedure in the PSCell of the cell group by applying stored random access configuration information or random access configuration information received via the RRC message, wherein the random access configuration information includes random access transmission resource information (time or frequency transmission resource), dedicated preamble information for transmission of a preamble, or the like. As another method, when the terminal receives an indicator for resuming the cell group, if the RRC message includes the random access configuration information (random access transmission resource information (time or frequency transmission resource), dedicated preamble information for transmission of a preamble, or the like), the terminal may trigger a random access procedure (e.g., CFRA procedure) in the PSCell of the cell group by applying the random access configuration information, and if the RRC message for indicating resumption or activation of the cell group does not include the random access configuration information (random access transmission resource information (time or frequency transmission resource), dedicated preamble information for transmission of a preamble, or the like), the terminal may a trigger random access procedure (e.g., CBRA procedure) in the PSCell of the cell group, or may trigger a random access procedure (CBRA or 2-step random access), based on system information. In the above description, if there is random access configuration information (random access transmission resource information (time or frequency transmission resource), dedicated preamble information for transmission of a preamble, or the like) stored in the terminal before reception of the indicator for resuming the cell group, the stored random access configuration information may be released or discarded. As another method, the terminal may perform PDCCH monitoring in the indicated or configured cell group or cell, and may trigger and perform a random access procedure as indicated in PDCCH.

If the indicator for resuming (or activating) a state of the cell group is included, or if the terminal receives an indicator for resuming the cell group, all SCells configured in the cell group may be activated. As another method, when the terminal receives an indicator for resuming the cell group, the terminal may activate or switch a DL BWP to a BWP (e.g., first active BWP or BWP configured via an RRC message) other than a dormant BWP with respect to an SCell having a dormant BWP configured therein, among SCells configured in the cell group, and may perform terminal operations in a cell having an activated BWP other than a dormant BWP, which are proposed in various embodiments, or may perform activation for an SCell having no dormant BWP configured therein. As another method, when the terminal receives, via the RRC message, an indicator for resuming the cell group, the terminal may, according to the indicator or configuration information on each SCell of the cell group, which is included in the RRC message, activate or deactivate each SCell, make each SCell dormant, or activate a dormant BWP, or the terminal may activate or deactivate each SCell of the cell group, make the each SCell dormant, or activate a dormant BWP, via the indicator (e.g., bitmap) of a PDCCH, the MAC control information, or the RRC message before or after reception of the indicator for resuming the cell group.

Indicator for adding cell group configuration.

Indicator for releasing cell group configuration.

Security configuration information (security key information, security key information for a cell group, or additional information (e.g., sk-counter)).

Indicator indicating handover, cell group addition, or cell group change (e.g., ReconfigurationWithSync indicator or mobilitycontrolInfo indicator).

First channel measurement configuration information for each cell or each BWP.

Second channel measurement configuration information for each cell or each BWP.

Indicator for adding cell group configuration, indicator indicating cell group change (ReconfigurationWithSync), or indicator indicating random access procedure (ReconfigurationWithSync or newly defined indicator).

Indicator indicating whether to activate a cell group by performing random access procedure, or to activate a cell group without random access procedure, when cell group is activated (ReconfigurationWithSync or newly defined indicator).

RRM configuration information, frequency measurement configuration information, or separate RRM configuration information or frequency measurement configuration information to be applied or performed when cell group is deactivated (e.g., frequency measurement information (reduced or relaxed RRM configuration information) simplified for battery saving).

Configuration information for RLM, or configuration information for RLM, which is to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA value (or offset value) for synchronization of a DL signal of the base station or a UL signal of the base station, or a timer (i.e., a time alignment timer (TAT or a TAT value) indicating validity of the TA value, or may include configuration information of an SSB to be measured, CSI-RS configuration information, RS configuration information, or transmission resource information which can report a result (e.g., PUCCH configuration information (e.g., an SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which an RLM procedure is to be performed. As another method, when the cell group state is a deactivated state, the terminal may cause the RLM procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the RLM procedure to be performed in a BWP which has been lastly (previously) activated before the cell group enters into the deactivated state, to continuously maintain a connection state with the cell group (e.g., when BWP configuration information indicating a BWP in which the RLM procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the RLM procedure is to be performed is not configured when activating the cell group, the terminal may cause the RLM procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the RLM procedure is to be performed. As another method, when the cell group state is a deactivated state, the terminal may cause the RLM procedure to be performed in a beam (e.g., TCI state or QCL configuration information) configured via the RRC message, or activate the beam, perform the RLM procedure, and early monitor the beam to be activated when activating the cell group, to minimize cell group activation latency. As another method, when the cell group state is configured as a deactivated state (or activated state), the terminal may cause the RLM procedure to be performed in a beam which has been lastly (or previously) activated before the cell group enters into the deactivated state, to continuously maintain a connection state with the cell group (e.g., when the beam-related configuration information indicating a beam in which the RLM procedure is to be performed is not configured), or cause the activation procedure to be performed in a beam configured via the RRC message when activating the cell group. If the beam-related configuration information indicating a beam in which the RLM procedure is to be performed is not configured when activating the cell group, the terminal may cause the RLM procedure to be performed in a beam which has been lastly (or previously) activated.

Configuration information for a BFD procedure, or configuration information for BFD to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA)value (or offset value) for synchronization of a DL signal of the base station or a UL signal of the base station, or a timer (i.e., a TAT or a TAT value) indicating validity of the TA value, or may include configuration information of an SSB to be measured, CSI-RS configuration information, RS configuration information, or transmission resource information which can report a result (e.g., PUCCH configuration information (e.g., an SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which a beam failure detection procedure is to be performed. As another method, when the cell group state is a deactivated state, the terminal may cause the beam failure detection procedure to be performed in the first active BWP (or first active DL BWP or firstActiveDown-linkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the beam failure detection procedure to be performed in a BWP which has been lastly (previously) activated before the cell group enters into the deactivated state, to continuously maintain a connection state with the cell group (e.g., when BWP configuration information indicating a BWP in which the beam failure detection procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the beam failure detection procedure is to be performed is not configured when activating the cell group, the terminal may cause the beam failure detection procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the beam failure detection procedure is to be performed. As another method, when the cell group state is a deactivated state, the terminal may cause the beam failure detection procedure to be performed in a beam (e.g., TCI state or QCL configuration information) configured via the RRC message, to early monitor the beam to be activated when activating the cell group, thereby minimizing cell group activation latency. As another method, when the cell group state is configured as a deactivated state (or activated state), the terminal may cause the beam failure detection procedure to be performed in a beam which has been lastly (or previously) activated before the cell group enters into the deactivated state, to continuously maintain a connection state with the cell group (e.g., when the beam-related configuration information indicating a beam in which the beam failure detection procedure is to be performed is not configured), or cause the activation procedure to be performed in a beam configured via the RRC message when activating the cell group. If the beam-related configuration information indicating a beam in which the beam failure detection procedure is to be performed is not configured when activating the cell group, the terminal may cause the beam failure detection procedure to be performed in a beam which has been lastly (or previously) activated.

In order to efficiently perform a DC technology configuration procedure (or SCG configuration procure) or handover procedure, a first timer (e.g., T304), a second timer (e.g., T310), a third timer (e.g., T312), or a fourth timer (e.g., a timer for fallback) may be introduced into the message, and may be configured in the message. Accordingly, driving and applying the timer in the DC technology configuration procedure or the handover procedure is disclosed. The first timer (e.g., T304) is a timer for determining whether the DC technology configuration procedure or the handover procedure has been successfully performed, the second timer (e.g., T310) is a timer for determining whether a radio connection is valid, and the third timer (e.g., T312) is an auxiliary timer for determining whether a radio connection is valid, and a timer for trigger a frequency measurement procedure, and reporting a result of a frequency measurement result. In addition, the fourth timer (e.g., the timer for fallback) is a timer introduced to perform a fallback procedure, as a random access procedure 6-100 (normal random access procedure (4-step random access procedure or 2-step random access procedure), and attempt to active the cell group when cell group (or SCG or PSCell) activation has failed (that is, the timer has expired) without the random access procedure proposed in the discourse. The fourth timer may be the first timer, and the first timer may be used as a timer for fallback.

It is proposed to include no indicator (e.g., ReconfigurationWithSync indicator or mobilitycontrolInfo indicator) indicating handover, cell group addition, or cell group change if the RRC message (e.g., RRCReconfiguration message) includes an indicator for suspending (or deactivating) a cell group, and it is proposed to include an indicator (e.g., ReconfigurationWithSync indicator or mobilitycontrolInfo indicator) indicating handover, cell group addition, or cell group change if the RRC message includes an indicator for resuming a cell group or configuration information for configuring a cell group. This is because, when a cell group is resumed, a connection with the cell group should be performed again, and therefore synchronization should be performed, system information should be received, or a random access procedure should be performed if necessary. For example, when the base station configures the state of a cell group of the terminal as a deactivated state via the RRC message, it is restructured so that the cell group addition indicator, the cell group change indicator, the indicating the random access procedure, or the ReconfigurationWithSync indicator cannot be configured together, whereby an unnecessary synchronization procedure, connection procedure, or random access procedure by the terminal can be prevented.

Hereinafter, a dormant BWP is newly proposed in the next-generation mobile communication system, and terminal operations in each BWP when each BWP is transitioned or switched is specifically proposed.

Figure 7:
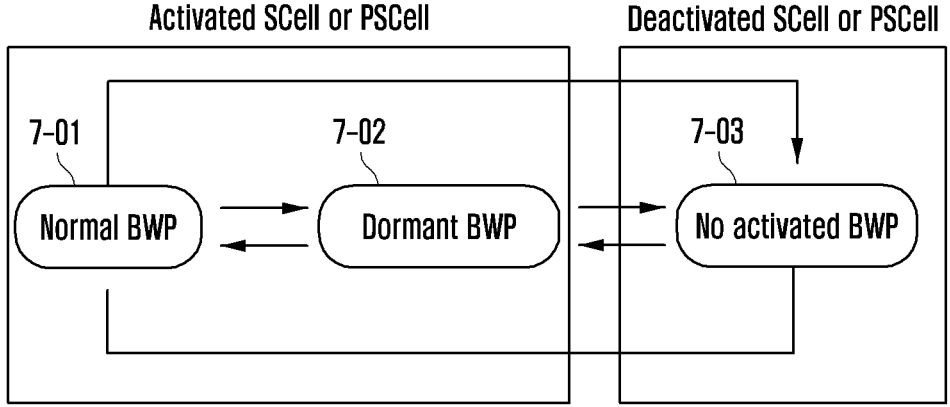
FIG. 7 illustrates a procedure of transitioning a state for each BWP or switching a BWP according to an embodiment.

FIG. 7 illustrates a procedure of transitioning a state for each BWP or switching a BWP according to various embodiments.

Referring to FIG. 7, a BWP of each cell (e.g., SCell or PSCell) of each cell group of the terminal may be activated as a normal BWP 7-01, activated as a dormant BWP 7-02, or deactivated 7-03, and the normal BWP or the dormant BWP may be activated or deactivated through an indication by configuration information of the RRC message, MAC control information, or DCI of a PDCCH.

The state transition operation for each BWP of the cell (activation, deactivation, or hibernation) or the operation of activating the normal BWP, activating the dormant BWP, activating the first active BWP activated from dormancy, or deactivating the normal BWP or the dormant BWP, proposed, may be performed by one indication or configuration among the following cases.

In a case in which the state of the BWP of the cell is configured via the RRC message, the BWP of each cell is configured via the RRC message, the dormant BWP is configured in the cell, or the first active BWP is configured as the dormant BWP, the terminal may start the cell through switching to or activation as the dormant BWP and perform the operation in the dormant BWP.

A case in which cell an activation, deactivation, or dormant MAC CE is received.

A case in which a MAC CE indicating activation or deactivation of the normal BWP, the first active BWP from dormancy, or the dormant BWP is received A case in which DCI OF PDCCH indicating activation, deactivation, or switching of the normal BWP, the first active BWP from dormancy, or the dormant BWP is received A case in which a cell hibernation timer is not configured in an activated cell and a configured cell inactivity timer expires A case in which a BWP hibernation timer is not configured in the active BWP and a configured BWP inactivity timer (e.g., a bwpDeactivatedTimer) expires In addition, the state transition operation or the dormant BWP operation method proposed herein may have the following characteristics.

No dormant BWP may be configured in the SPCell (PCell or PSCell) (or DL BWP or UL BWP of the cell), and only a normal BWP is configured and is always activated. The SPCell performs synchronization and transmits or receives a primary control signal, and thus if the BWP of the SPCell is dormant or deactivated, or is operated as the dormant BWP, the connection with the base station is released, so that the activated state should be always maintained.

If a PUCCH is configured even in the case of the SCell or the BWP of the SCell, a dormant state or a dormant BWP cannot be configured. There may be another cell which should transmit feedback such as HARQ ACK/NACK through a PUCCH, the active or normal BWP should be activated and used.

Due to such characteristics, the cell inactivity timer (ScellDeactivationTimer) or the BWP hibernation timer may not be also applied to the SPCell or the BWP of the SPCell and the SCell or the BWP of the SCell in which the PUCCH is configured, and may run only for the other SCells.

The cell or BWP hibernation timer (ScellHibernationTimer) is prioritized over the cell or BWP inactivity timer (ScellDeactivationTimer). In addition, if one value is configured as a timer value through the RRC message, the same value may be applied to all cells. As another method, the base station may apply different timer values for respective SCells or BWPs in consideration of a characteristic of each SCell or BWP.

If the cell or BWP is not indicated as being active or dormant through the RRC message, the cell or BWP initially operates in the deactivated state.

The UL may indicate a UL BWP and the DL may indicate a DL BWP. This is because only one active or dormant BWP can be operated for each UL or DL.

The activated state, the deactivated state, or the dormant state is operated, and transition or switching of the cell or BWP is performed in units of BWPs. Further, when state transition or switching is performed in units of BWPs, a BWP (DL BWP or UL BWP) for which state transition or switching is indicated performs state transition or switching according to an indication of state transition or switching. For example, if a BWP (DL or UL BWP) is transitioned from an activated state to a dormant state, or switched to (or activated as) a dormant bandwidth, the BWP may be transitioned to the dormant state or switched to (or activated as) the dormant BWP.

BWP switching means switching of a DL BWP to a BWP indicated by a BWP ID when BWP switching is indicated via DCI OF PDCCH and indicated with the BWP ID while DL assignment is performed, and switching of a UL BWP to a BWP indicated by a BWP ID when BWP switching is indicated via DCI OF PDCCH and indicated with the BWP ID while a UL grant is assigned. In addition, the terminal operation follows a DCI format although description for the UL and the DL is not separated since DCI OF PDCCH formats are different for the DL assignment (format1) and the UL grant (format0).

The method of operating the state transition in units of BWP levels and the operation of the BWP according to each state, which are proposed, may be extended and applied to various embodiments. Hereinafter, the disclosure describes detailed embodiments for extending and applying the content proposed.

Figure 8:
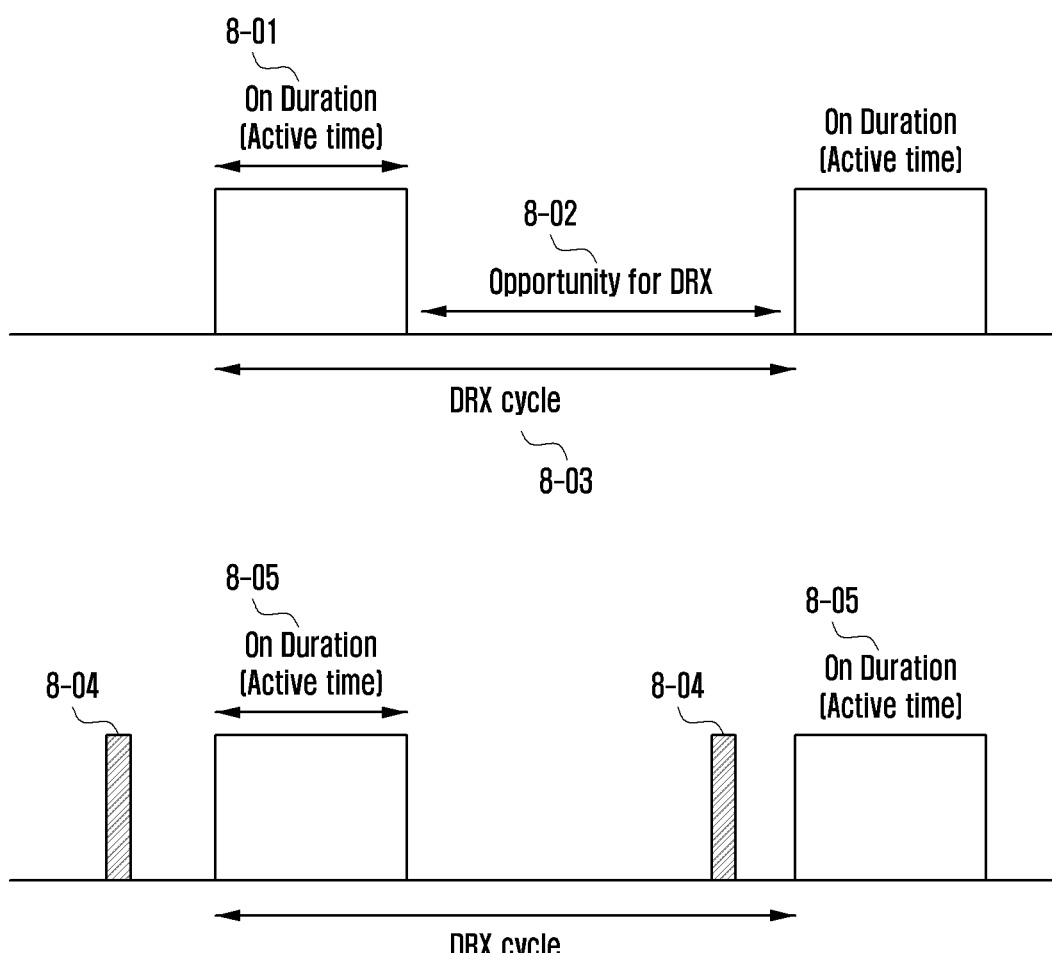
FIG. 8 illustrates a method of configuring or operating discontinuous reception (DRX) according to an embodiment.
Figure 8:
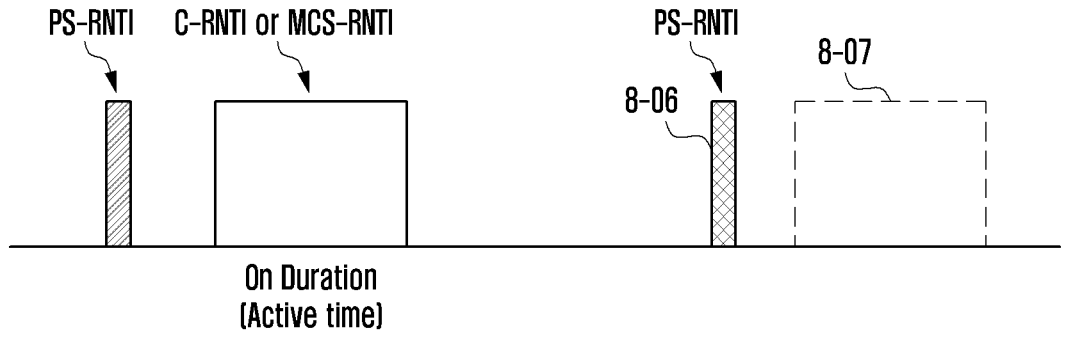

FIG. 8 illustrates a method of configuring or operating DRX to extend the life of a battery of the terminal according to an embodiment.

In FIG. 8, a base station may configure a DRX function such as a DRX cycle, start point, offset, or on-duration (active time) in a PCell, SCell, or PSCell for the terminal through an RRC message, as illustrated in FIG. 6. As disclosed herein, a configuration of the DRX function in the PCell, SPCell, or PSCell is considered.

As described above, when the DRX function is configured in the PCell (SPCell or PSCell), the terminal may apply the DRX function in consideration of a DRX cycle 8-03, a DRX start time, or an offset. When the DRX function is applied, the terminal may monitor a PDCCH or DCI OF PDCCH which can be received from the base station in the PCell only within the active time interval (on-duration or active time) 8-01 of the DRX. In addition, the terminal does not need to monitor the PDCCH or the DCI OF PDCCH outside the active time 8-02 of the DRX function, thereby reducing terminal battery consumption.

Further to the above disclosure regarding FIG. 6, the base station may configure a power saving function (power saving mode) for the terminal through the RRC message in order to further reduce battery consumption of the terminal. When the power saving function is configured together with the DRX function, the terminal may monitor, outside the active time, the PDCCH during a short time interval 8-04 configured through RRC before the active time 8-01 in which the terminal should monitor the PDCCH in the DRX function, and may monitor and receive a WUS outside the active time. The base station may indicate whether the terminal should monitor the PDCCH in the next active time 8-05 or 8-07, or does not need to monitor the PDCCH, through a bit of the DCI OF PDCCH of the WUS.

That is, the terminal for which the power saving function or the DRX function is configured may monitor the WUS during the short time interval 8-04 configured in the RRC message before every active time 8-05, and if a bit value of the DCI OF PDCCH for the next active time 8-05 or 8-07 is 0 (or 1) in the received WUS, this may indicate that the terminal does not monitor the PDCCH during the next active time 8-07 or indicate that the terminal does not monitor the PDCCH by not running a timer corresponding to the next active time in the MAC layer device. If the bit value of the DCI OF PDCCH for the next active time 8-05 or 8-07 is 1 (or 0) in the received WUS, this may indicate that the terminal monitors the PDCCH within the next active time

8-05 or indicate that the terminal monitors the PDCCH by running a timer corresponding to the next active time in the MAC layer device.

In addition, the terminal may not monitor the WUS or the PDCCH for searching for the WUS within the active time.

When monitoring the WUS during the short time interval 8-04 and 8-06 configured in the RRC message before every active time 8-05 and 8-07, respectively, the terminal for which the power saving function or the DRX function is configured may search for a signal by identifying the PDCCH through a first RNTI (e.g., a PS-RNTI). The first RNTI (e.g., the PS-RNTI) may be configured for multiple terminals, and the base station may indicate simultaneously, to the multiple terminals, whether to monitor the PDCCH within the next active time by using the first RNTI (e.g., PS-RNTI).

In addition, when monitoring and searching for the PDCCH in the active time 8-05, the terminal for which the power saving function or the DRX function is configured may search for a signal, based on a second RNTI (e.g., a C-RNTI), a third RNTI (e.g., an MCS-C-RNTI), or a fourth RNTI (SPS-C-RNTI or CS-RNTI) uniquely configured for the terminal through the RRC message. The second RNTI (e.g., C-RNTI) may be used to indicate general terminal scheduling, the third RNTI (e.g., MCS-C-RNTI) may be used to indicate a modulation and coding scheme of the terminal, and the fourth RNTI (SPS-C-RNTI or CS-RNTI) may be used to indicate periodic transmission resources of the terminal.

Based on the method described in FIG. 8 above, the base station may also indicate, via DCI of the PDCCH, to make the state of a cell or cell group of the terminal be activated, deactivated, or dormant during the short time interval 8-04 or the active time 8-05 configured through the RRC message. In addition, the terminal may perform a PDCCH monitoring procedure to receive an indication for the state of the cell or cell group during the short time interval 8-04 or the active time 8-05 configured through the RRC message. In the above description, if the DC technology is configured for the terminal, the terminal may monitor the PDCCH during the short time interval 8-04 or the active time 5-05 configured through the RRC message in the PCell of the MCG, DCI of the PDCCH may receive an indication of the activated, deactivated, or dormant state for the cell (SCell) of the MCG or the PSCell (or SCell) of the SCG, and the terminal may perform an activation procedure, deactivation procedure, a dormancy procedure, or a BWP switching procedure of a cell (or BWP) according to the indication. That is, the base station may indicate, to the terminal, the activation, deactivation, or dormant state of the cell (SCell) of the MCG or the PSCell (or the SCell) of the SCG through the DCI of the PDCCH during the short time interval 8-04 or the active time 8-05 configured through the RRC message in the PCell of the MCG.

Figure 9:
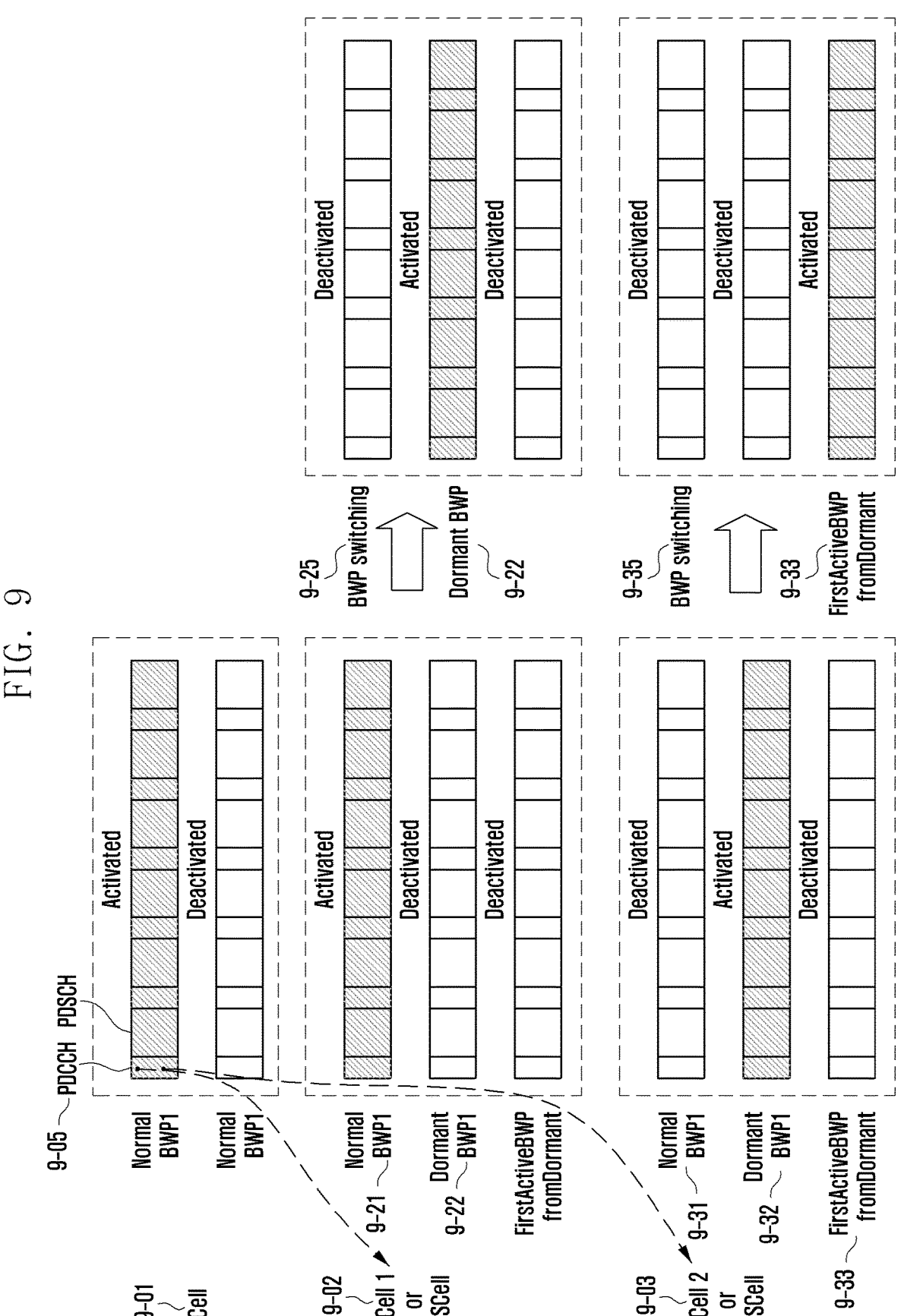
FIG. 9 illustrates a method of operating a dormant BWP in an activated secondary cell (SCell) or primary SCell (PSCell) according to an embodiment.

FIG. 9 illustrates the concept of a method of operating a dormant BWP in an activated SCell or PSCell according to various embodiments; The base station may configure multiple SCells for the terminal through an RRC message for CA technology, allocate each SCell ID, and configure a dormant BWP for each SCell as illustrated in FIG. 6. Alternatively, the base station may configure multiple cell groups for CA technology, allocate a cell group ID, configure or indicate a cell group suspension indicator for each cell group or a PSCell of each cell group, or configure a dormant BWP. In addition, the multiple SCells may be included in each SCell and configured, and one SCell group may include multiple SCells. In the above description, an SCell group ID may be allocated to each SCell group, and multiple SCell IDs may be configured to be included in or mapped to each SCell group ID. An SCell ID value or an SCell group ID value may be allocated as a predetermined bit value and have an integer value (or a natural number value). Alternatively, the PSCell of each cell group may be indicated by a cell group ID.

In FIG. 9, the base station may define a new bitmap for DCI OF PDCCH transmitted in the PCell, perform mapping such that each bit value of the bitmap indicates each SCell ID value, each SCell group ID value, a cell group (or SCG) ID, or a PSCell (or SCell) of a cell group (or SCG), and define each bit value to indicate whether to switch the SCell corresponding to the bit, SCells belonging to the SCell group, the cell group (or SCG), or the PSCell (or SCell) of the cell group (or SCG) to a dormant BWP or activate the same as the dormant BWP, or to indicate whether to suspend or resume the cell group. In addition, the base station may indicate whether to switch the SCell corresponding to the bit, SCells belonging to the SCell group, the cell group (or SCG) ID, or the PSCell (or SCell) of the cell group (or SCG) from a dormant BWP to a normal BWP (e.g., a first active BWP activated from dormancy) or activate the same as the normal BWP (e.g., first active BWP activated from dormancy).

In FIG. 9, after receiving DCI OF PDCCH 9-05 in a PCell 9-01, the terminal may decode the DCI to identify whether there is a bitmap including an indication for BWPs of SCells or SCell groups (e.g., indication for switching to or activation as the dormant BWP or switching to or activation as the normal BWP, or indication for suspending or resuming the cell group (or SCG) or the PSCell (or SCell) of the cell group (SCG)) and, if there is the bitmap, may switch or activate the BWP or suspend or resume the cell group according to the bit value for the SCell indicated by each bit of the bitmap, SCells 9-02 and 9-03 belonging to the SCell group, the cell group (or SCG), or the PSCell (or SCell) of the cell group (or SCG). For example, if the bit of the bitmap indicates a first SCell 9-02 (or a first SCell ID), the cell group (or SCG), or the PSCell (or SCell) of the cell group (or SCG), or indicates an SCell group including the first SCell (or an SCell group ID) and the bit value is 0 (or 1), the terminal may activate a BWP 9-21 as a dormant BWP 9-22 for the first SCell 9-02, the cell group (or SCG), or the PSCell (or SCell) of the cell group (or SCG), switch the current BWP to the dormant BWP 9-22, if the current BWP is not a dormant BWP, switch or activate (9-25) the currently activated BWP 9-21 to or as the dormant BWP 9-22, or suspend or deactivate the cell group. As another method, the terminal may maintain the BWP of the cell group (or SCG) or the PSCell (or SCell) of the cell group (or SCG) without change, apply second DRX configuration information or second SRS configuration information proposed, and perform PDCCH monitoring in a long cycle or perform SRS transmission in a long cycle, thereby reducing power consumption of the terminal.

In FIG. 9, after receiving DCI OF PDCCH in the PCell 9-01, the terminal may decide the DCI to identify whether there is a bitmap including an indication for BWPs of the SCells or SCell groups (e.g., indication for switching to or activation as a dormant BWP or switching to or activation as a normal BWP 9-31), an indication for the BWP of the cell group (or SCG) or the PSCell (or SCell) of the cell group (or SCG), or an indication for suspension or resumption of the cell group. If there is the bitmap, the terminal may switch or activate the BWP or suspend or resume the cell group according to the bit value for the SCell indicated by each bit of the bitmap, SCells 9-02 and 9-03 belonging to the SCell group, the cell group (or SCG), or the PSCell (or SCell) of the cell group (or SCG). For example, when the bit of the bitmap indicates a second SCell 9-03 (or a second SCell ID) or indicates an SCell group (or an SCell group ID) including the second SCell, the cell group (or SCG), or the PSCell (or SCell) of the cell group (or SCG), and the bit value is 1 (or 0), the terminal may switch or activate (9-35) a BWP of the second SCell 9-03 to a BWP configured through an RRC message (e.g., a first active BWP 9-33 activated from dormancy), or resume or activate the cell group if the current activated BWP for the second SCell 9-03 is a dormant BWP 9-32, the current activated BWP is not a normal BWP, or the current BWP (or cell) is activated and is activated as the dormant BWP 9-32 (or activated as a BWP other than the normal BWP). When the bit value is 1 (or 0) and thus an SCell or SCells belonging to an SCell group indicated by the bit, the cell group (or SCG), or the PSCell (or SCell) of the cell group (or SCG) should be switched to or activated as a BWP other than the dormant BWP or the cell group should be resumed, the SCell or SCells belonging to the SCell group may not apply the bit value, may ignore the bit value, or may not decode the bit value if the state of the SCell is a deactivated state or the state of the SCell is an activated state and an activated BWP is not a dormant BWP (or is a normal BWP). Alternatively, the bit value may not be applied, may be ignored, and may not be decoded if the cell group (or SCG) or the PSCell (or SCell) of the cell group (or SCG) is already in the activated state or resumed state. In addition, When the bit value is 1 (or 0) and thus an SCell or SCells belonging to an SCell group indicated by the bit, the cell group (or SCG), or the PSCell (or SCell) of the cell group (or SCG) should be switched to or activated as a dormant BWP or the cell group should be suspended, the SCell or SCells belonging to the SCell group may not apply the bit value, may ignore the bit value, or may not decode the bit value if the state of the SCell is an activated state and an activated BWP is a dormant BWP. Alternatively, the bit value may not be applied, may be ignored, and may not be decoded if the cell group (or SCG) or the PSCell (or SCell) of the cell group (or SCG) is already in the suspended state or deactivated state.

Hereinafter, methods for prompt activation when a cell (PCell, PSCell, or SCell) is activated are proposed.

Specifically, the base station may configure, via an RRC message (RRCReconfiguration or RRCResume), first channel measurement configuration information which enables the terminal to promptly perform channel measurement and report the same when activating the cell. With respect to the first channel measurement configuration information, for prompt activation of the cell or cell group, cell (e.g., PCell, PSCell, or SCell) configuration information of the cell group may include, to allow the base station to temporally transmit many channel measurement signals or frequently transmit a channel measurement signal to enable prompt channel measurement in the cell, configuration information such as a period for a frequent channel measurement signal (e.g., a radio resource, a TRS, an SSB, an CSI-RS, or an RS), transmitted transmission resource information (a frequency or time transmission resource via which the frequent channel measurement signal is transmitted), an interval or frequency (the number of times the frequent channel measurement signal is transmitted), a timer value (a time period in which the frequent channel measurement signal is transmitted), a time interval (an interval in which the frequent channel measurement signal is transmitted (e.g., an offset of a time unit (slot, subframe, symbol, or the like))), or a transmission resource, cycle, interval, timing, an offset, or the like via which the terminal should report a measurement result. The first channel measurement configuration information may allow a configuration of a short reporting cycle (or transmission resource) in which the terminal may report a channel measurement result, or a configuration of a transmission resource for channel measurement so that the base station can transmit many channel measurement signals (or transmission resources (e.g., radio resources or TRSs) or frequently transmit a channel measurement signal so as to support the terminal to perform prompt channel measurement or more signal measurements. The first channel measurement configuration information may include information on a configuration by the base station for a channel measurement signal for a specific terminal (or terminals) in the cell or the BWP. In addition, for multiple cells or BWPs configured via the RRC message, the first channel measurement configuration information may be configured differently for each cell or each BWP, and to support for the terminal to easily measure a transmission resource for channel measurement, beam-related configuration information (TCI state or QCL) such as a beam direction, a beam number, or a beam position may be configured together. In addition, a timing advance value (an offset value) for synchronization of a DL signal of the base station or a UL signal of the base station, or a timer (i.e., a TAT or a TAT value) indicating validity of the TA value may be configured for the first channel measurement configuration information, so that channel measurement or channel measurement reporting can be accurately performed. For example, the first channel measurement configuration information may include the period of the channel measurement signal, the number of times of transmission of the signal, signal transmission duration, an offset for a signal transmission time, the length of time between transmitted signals, a list of multiple transmittable channel measurement signals, a time transmission resource (or a frequency transmission resource) indicating the position of a transmitted signal, a transmission resource (a time transmission resource or a frequency transmission resource) for reporting a measurement result, a measurement result reporting period, beam-related configuration information for measuring the channel measurement signals (TCI state or QCL), or the like. In addition, the first channel measurement configuration information configured via the RRC message may include information on multiple channel measurement signals, and measurement signal information or beam configuration information of one channel, among the above-configured information on the multiple channel measurement signals, is indicated via the RRC message, MAC CE, or DCI so that the terminal can perform channel measurement or channel measurement reporting by applying and using the indicated channel measurement signal information and beam configuration information. The indicating method may include defining mapping between a bitmap, an index, or an ID to each configured channel measurement signal information configured above, and indicating based on the definition. As another method, channel measurement signal information may be configured or indicated via the RRC message or MAC CE so that the terminal can perform channel measurement or channel measurement reporting by applying or using the configured (indicated) channel measurement signal information.

As another method, when the first channel measurement configuration information is included in the RRC message and configured for the terminal, when the state of the cell is configured as an activated state via the RRC message and the cell activation is indicated via the RRC message, channel measurement or channel measurement reporting can be promptly performed by applying or using the first channel measurement configuration information, whereby the cell can be promptly activated. For example, the first channel measurement configuration information, the channel measurement signal information, or beam-related configuration information which can be applied when the state of the cell is configured as an activated state via the RRC message and the cell activation is indicated via the RRC message may be configured as separate configuration information in the RRC message (when channel measurement signal information (or beam-related configuration information) corresponding to default configuration or ID 0 or only one channel measurement signal information (or beam-related configuration information) piece is configured, the corresponding channel measurement signal information (or beam-related configuration information) is applied).

The first channel measurement configuration information according to various embodiments may be configured only for DL BWP configuration information of each cell. That is, the first channel measurement configuration information according to various embodiments may not be configured for UL BWP configuration information of each cell. This is because the terminal needs to measure a channel for DL first to report a measurement result of the channel or cell, and then accurately receive the PDCCH and follow the indication of the base station.

The first channel measurement configuration information according to various embodiments is initially deactivated at the time of configuration via the RRC message or after handover, and may be later activated via the MAC control information, DCI of the PDCCH, or the RRC message, proposed in various embodiments. As in the above case where the configuration is made via the RRC message, an initial state needs to be a deactivated state so that the base station can easily manage a cell state or channel measurement procedure of the terminal and also accurately manage a timing indicating when and how the terminal performs channel measurement, without an RRC message processing delay problem.

In addition, second channel measurement configuration information may be included and configured in the RRC message (RRCReconfiguration or RRCResume). The second channel measurement configuration information may include general channel measurement configuration information such as a transmission resource, cycle, time interval, or frequency of the channel measurement signal, or a transmission resource, cycle, or time interval for channel measurement reporting.

Hereinafter, a MAC CE structure or an indication method which can, when first channel measurement configuration information or second channel measurement configuration information is configured for the terminal via the RRC message as proposed above, promptly perform channel measurement based on the first channel measurement configuration information or report a measurement result while activating a cell, and promptly activate the cell is proposed.

For example, MAC control information (or RRC message) proposed in various embodiments may indicate a cell to be activated or deactivated, among multiple cells (SCells) configured via RRC, and if a cell to be activated is indicated, the MAC control information (or RRC message) may indicate measurement signal information to be applied among first channel measurement configuration information configured via the RRC message, a signal measurement method (e.g., the number of times of signal transmission resource measurement, the number of signals to be transmitted, a time interval in which measurement is to be performed, an offset by which a measurement time interval is determined, a signal measurement cycle, a transmission resource via which signal measurement is to be performed, etc.), and a reporting method (e.g., the number of times of measurement result reporting, a time interval in which measurement result reporting is to be performed, an offset by which a measurement result report transmission resource is to be determined, a measurement result reporting cycle, a transmission resource via which measurement result reporting is to be performed, etc.), so as to promptly activate the cell, based on the first channel measurement configuration information configured via the RRC message.

Figure 10:
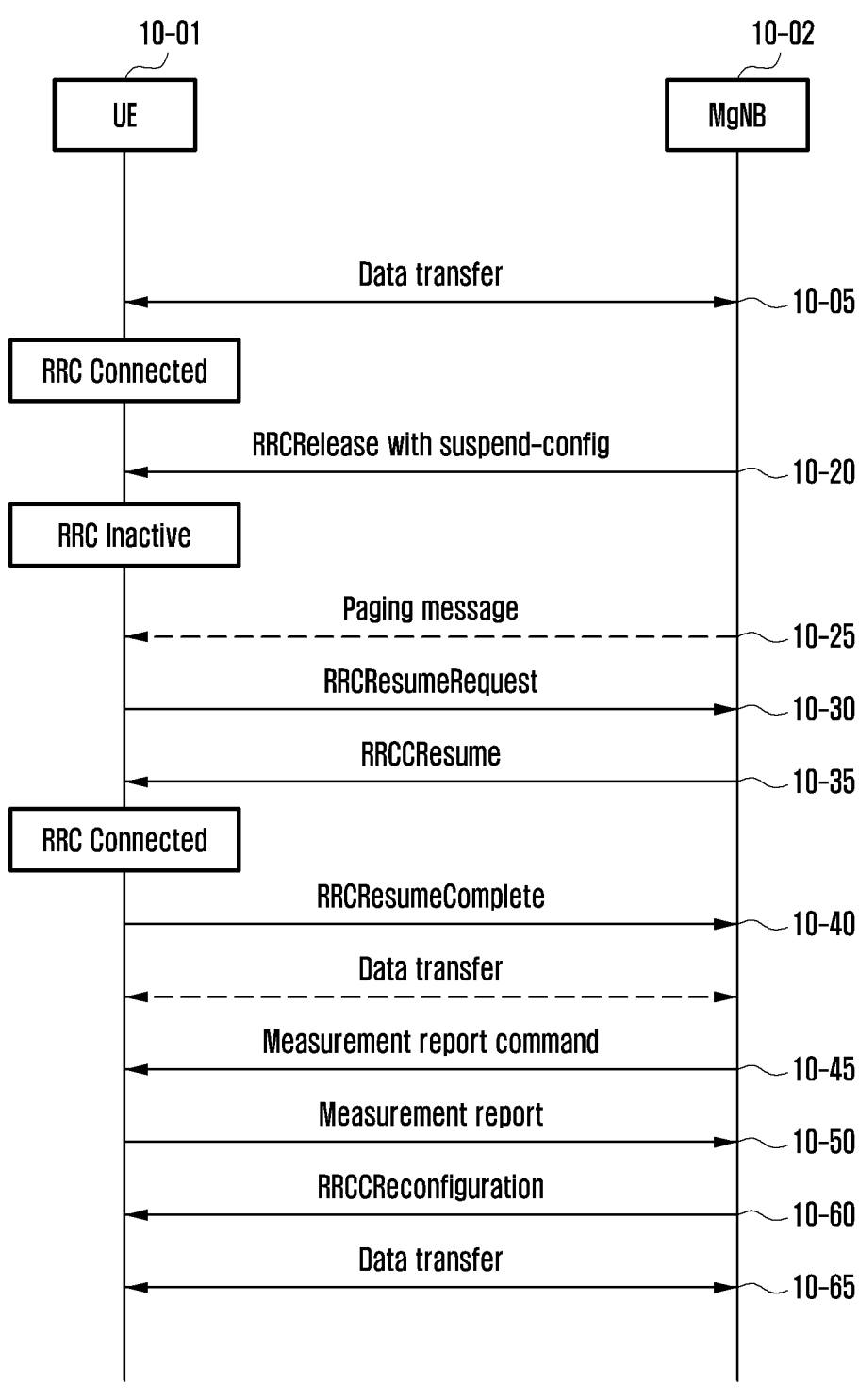
FIG. 10 illustrates an operation of an RRC inactive mode terminal according to an embodiment.

FIG. 10 illustrates an embodiment extended and applied to an RRC inactive mode terminal according to various embodiments.

In the disclosure, a cell group or a cell may indicate a PCell of an MCG, an SCell of the MCG, a PSCell of an SCG), or an SCell of the SCG.

As disclosed herein, even when a terminal is transitioned to an RRC inactive mode, the terminal does not release or discard. Rather, the terminal continuously stores SCell configuration information (e.g., configuration information described in FIG. 6) PSCell (or SCell) configuration information of a cell group (e.g., SCG) configured or stored for the embodiments proposed above as in FIG. 6 in an RRC-connected mode. In addition, when an RRC connection resume procedure is performed, an RRC inactive mode terminal determines, through an indicator of an RRCResume message or an RRCReconfiguration message transmitted by a base station or through a reconfiguration procedure, whether to discard or release, to maintain and apply, or to reconfigure the stored SCell configuration information (e.g., configuration information described in FIG. 6) or the PSCell (or SCell) configuration information of the cell group (e.g., SCG). In addition, when the base station transmits, to the terminal, an RRCRelease message including a configuration or an indicator for transitioning the terminal to an RRC inactive mode, the base station may transmit, to the terminal, the RRCRelease message including an indicator or configuration information indicating whether to discard or release, to maintain and apply, or to reconfigure the stored SCell configuration information (e.g., configuration information described or in FIG. 6) or the PSCell (or SCell) configuration information of the cell group (e.g., SCG). In addition, the terminal may move in the RRC inactive mode and, when RAN notification area (RNA) updating is performed, the terminal may receive and apply, via the RRCRelease message transmitted by the base station to the terminal, the indicator or the configuration information indicating whether to discard or release, to maintain and apply, or to reconfigure the stored SCell configuration information (e.g., configuration information described in FIG. 6) or the PSCell (or SCell) configuration information of the cell group (e.g., SCG).

In the SCell configuration information (e.g., configuration information described in FIG. 6) and the PSCell (or SCell) configuration information of the cell group (e.g., SCG) of the RRC message, the base station may allow a first active BWP of DL or UL BWP configuration information of each cell to be configured as a dormant BWP, and when the terminal activates each SCell, each cell group, or the PSCell of each cell group, the base station may allow the terminal to directly operate a DL BWP or a UL BWP of each SCell, or each cell group, or the PSCell of each cell group as the dormant BWP, or to suspend or resume the cell group, thereby reducing battery consumption of the terminal.

As another method, in the SCell configuration information (e.g., configuration information described in FIG. 6) or the PSCell (or SCell) configuration information of the cell group (e.g., SCG) of the RRC message, the base station may not configure the first active BWP of the DL or UL BWP configuration information of each cell as the dormant BWP, and when the terminal activates or resumes each SCell, each cell group, or the PSCell of each cell group, the base station may allow the terminal to always activate the DL BWP or the UL BWP of each SCell, or each cell group, or the PSCell of each cell group as the first active BWP, and to switch or activate the same to or as the dormant BWP according to the embodiments proposed, or to suspend or resume the cell group, thereby reducing battery consumption of the terminal.

In addition, the above-proposed embodiment may be also extended and applied to each SCell configuration information or PSCell configuration information of an MCG or SCG of the terminal for which DC technology is configured. That is, the SCell configuration information or the PSCell configuration information of the SCG may be also stored when the terminal is transitioned to the RRC inactive mode, and the base station may transmit, to the terminal, the RRC message (e.g., RRCResume, RRCReconfiguration, or RRCRelease) including the indicator or the configuration information indicating whether to discard or release, to maintain and apply, or to reconfigure the stored SCell configuration information (e.g., configuration information described in FIG. 6) of the MCG or SCG or the PSCell configuration information when the RRC connection resume procedure is performed or the terminal is transitioned to the RRC inactive mode.

In FIG. 10, a terminal 10-01 may perform a network connection with a base station 10-02, and transmit or receive data in step 10-05). When the base station 10-02 needs to transition the terminal 10-01 to an RRC inactive mode for a certain reason, the base station 10-02 may transmit an RRCRelease message in step 10-20 and transition the terminal 10-01 to the RRC inactive mode. The base station may transmit, to the terminal, the RRC message (e.g., RRCRelease) including an indicator or configuration information indicating whether to discard or release, to maintain and apply, or to reconfigure stored SCell configuration information of the MCG or SCG (e.g., configuration information described in FIG. 6) or PSCell (or SCell) configuration information of the cell group (e.g., SCG). In the above description, in a case of the terminal 10-01 employing the DC technology, the base station 10-02 may determine whether to suspend and resume an MCG bearer configuration or RRC configuration information or SCell configuration information of the MCG or SCG, and may determine whether to suspend and resume an SCG bearer configuration and RRC configuration by asking a secondary cell base station whether to suspend and resume the same and receiving a response from the secondary cell base station. In addition, in the RRCRelease message, the base station 10-02 may configure a frequency list to be measured by the terminal 10-01 in an RRC idle mode or an RRC inactive mode, frequency measurement configuration information, a frequency measurement period, etc.

When the terminal 10-01 in the RRC inactive mode receives a paging message in step 10-25, needs to transmit UL data, or needs to update an RAN notification area while moving, the terminal may perform an RRC connection resume procedure.

When the terminal 10-01 needs to configure a connection, thus performs a random access procedure, and transmits in step 10-30 an RRCResumeRequest message to the base station 10-02, a terminal operation proposed in relation to transmission of the message is as follows:

1. A terminal identifies system information, and when the system information indicates to transmit a complete terminal connection resume ID (I-RNTI or full resume ID), the terminal prepares to transmit the message including a stored complete terminal connection resume ID (I-RNTI). When the system information indicates to transmit a truncated terminal connection resume ID (truncated I-RNTI or truncated resume ID), the terminal configures a truncated terminal connection resume ID (truncated resume ID) from the stored complete terminal connection resume ID (I-RNTI) by using a predetermined method and prepares to transmit the message including the truncated terminal connection resume ID.

2. The terminal recovers RRC connection configuration information and security context information from stored terminal context.

3. The terminal updates a new KgNB security key corresponding to an MCG, based on a current KgNB security key, a NextHop (NH) value, and a next hop chaining counter (NCC) value received and stored in the RRCRelease message.

4. When the terminal receives an SCG-counter value (or sk-counter) in the RRCRelease message, the terminal updates a new SKgNB security key corresponding to an SCG, based on the KgNB security key and the SCG-counter value (or sk-counter).

5. The terminal derives new security keys (K_RRCenc, K_RRC_int, K_UPint, and K_UPenc) to be used in an integrity protection and verification procedure and a ciphering and deciphering procedure, by using the newly updated KgNB security key.

6. When the terminal receives the SCG-counter value (or sk-counter) in the RRCRelease message, the terminal derives new security keys (SK_RRCenc, SK_RRC_int, SK_UPint, and SK_UPenc) to be used in an integrity protection and verification procedure and a ciphering and deciphering procedure, by using the newly updated SKgNB security key corresponding to the SCG.

7. The terminal calculates a MAC-I and prepares to transmit the message including the MAC-I.

8. The terminal resumes signaling radio bearer 1 (SRB1) (the terminal needs to resume SRB1 in advance because the terminal will receive the RRCResume message via the SRB1, as a response to the RRCResumeRequest message to be transmitted).

9. The terminal configures the RRCResumeRequest message and transmits the same to a lower layer.

10. For all bearers except for SRB0 corresponding to the MCG terminated RBs, an integrity protection and verification procedure is resumed by applying the updated security keys and a previously configured algorithm, and integrity verification and protection is applied to data to be subsequently transmitted and received (in order to improve the reliability and security of data subsequently transmitted or received to or from SRB1 or DRBs).

11. For all the bearers except for SRB0 corresponding to the MCG terminated RBs, a ciphering and deciphering procedure is resumed by applying the updated security keys and the previously configured algorithm, and ciphering and deciphering is applied to data to be subsequently transmitted and received (in order to improve the reliability and security of data subsequently transmitted or received to or from SRB1 or DRBs).

12. When the terminal receives the SCG-counter value (or sk-counter) in the RRCRelease message, the terminal resumes an integrity protection and verification procedure by applying the updated security keys and the previously configured algorithm for all bearers corresponding to the SCG (SCG terminated RBs), and applies integrity verification and protection to be subsequently transmitted and received (in order to improve the reliability and security of data subsequently transmitted or received to or from the DRBs).

13. When the terminal receives the SCG-counter value (or sk-counter) in the RRCRelease message, the terminal resumes a ciphering and deciphering procedure by applying the updated security keys and the previously configured algorithm for all the bearers corresponding to the SCG (SCG terminated RBs), and applies ciphering and deciphering to data to be subsequently transmitted and received (in order to improve the reliability and security of data subsequently transmitted or received to or from the DRBs).

In the above description, a terminal operation proposed when the terminal 10-01 needs to configure a connection, thus performs a random access procedure, transmits the RRCResumeRequest message to the base station 10-02, and then receives in step 10-35 the RRCResume message as a response thereto is as follows:

When the RRCResume message includes an indicator indicating the terminal 10-01 to report if there is a valid frequency measurement result obtained in the RRC inactive mode, the terminal 10-01 may configure a frequency measurement result in an RRCResumeComplete message and in step 10-40 report the same. In addition, the base station 10-02 may transmit, to the terminal 10-01, the RRC message (RRCResume) including the indicator or the configuration information indicating whether to discard or release, to maintain and apply, or to reconfigure the SCell configuration information of the MCG or the SCG (e.g., configuration information described in FIG. 6) stored in the terminal 10-01:

1. When receiving the message, the terminal restores a PDCP state corresponding to an MCG, resets a COUNT value, and re-establishes PDCP layer devices of SRB2 and all DRBs (MCG terminated RBs) corresponding to the MCG.

2. When receiving the SCG-counter value (or sk-counter) in the message, the terminal updates a new SKgNB security key corresponding to a second cell group, based on a KgNB security key and the SCG-counter value (sk-counter). The terminal derives new security keys (SK_RRCenc, SK_RRC_int, SK_UPint, and SK_UPenc) to be used in an integrity protection and verification procedure and a ciphering and deciphering procedure, by using the newly updated SKgNB security keys corresponding to the SCG.

3. When the message includes MCG (masterCellgroup) configuration information,

A. the MCG configuration information included in the message is performed and applied. The MCG information may include configuration information of RLC layer devices belonging to the MCG, a logical channel ID, a bearer ID, etc.

4. When the message includes bearer configuration information (radioBearerConfig), A. the bearer configuration information (radioBearerConfig) included in the message is performed and applied. The bearer configuration information (radioBearerConfig) may include configuration information of PDCP layer devices for each bearer, configuration information of SDAP layer devices, a logical channel ID, a bearer ID, etc.

5. When the message includes SCG (masterCellgroup) configuration information,

A. the SCG configuration information included in the message is performed and applied. The SCG information may include configuration information of RLC layer devices belonging to the SCG, a logical channel ID, a bearer ID, etc.

6. When the message includes secondary bearer configuration information (radioBearerConfig), A. the secondary bearer configuration information (radioBearerConfig) included in the message is performed and applied. The secondary bearer configuration information (radioBearerConfig) may include configuration information of PDCP layer devices for each secondary bearer, configuration information of SDAP layer devices, a logical channel ID, a bearer ID, etc.

7. The terminal resumes SRB2 and all DRBs (MCG terminated RBs) corresponding to the MCG.

8. When the message includes frequency measurement configuration information (measConfig), A. the frequency measurement configuration information included in the message is performed and applied. That is, frequency measurement may be performed according to the configuration.

9. The terminal is transitioned to the RRC-connected mode.

10. The terminal indicates an upper layer device that a suspended RRC connection has been resumed.

11. The terminal configures an RRCResumeComplete message for transmission and transfer the same to a lower layer device (10-40).

When the terminal 10-01 has bearer configuration information and terminal context information for a suspended SCG, the terminal 10-01 may perform frequency measurement based on the system information or the frequency configuration information configured in the RRCRelease message or the RRCResume message, and when there is a valid result, in order to indicate that there is the valid result, the terminal 10-01 may transmit the RRCResumeComplete message including the indicator. When the base station 10-02 receives the indicator, if CA or DC technology needs to be resumed, the base station 10-02 may in step 10-45 indicate the terminal 10-01 to report the frequency measurement result and in step 10-50 may receive the frequency measurement result, or may receive a report of the frequency measurement result in the RRCResumeComplete message. When the receiving the frequency measurement result, the base station 10-02 may ask the secondary cell base station whether to resume bearer information for the suspended SCG, may perform determination by receiving a response thereto, and the base station 10-02 in step 10-60 may transmit an RRCReconfiguration message to the terminal 10-01 to indicate whether to resume or release bearers for the SCG. In addition, the base station 10-02 may transmit, to the terminal 10-01, the RRC message (e.g., RRCReconfiguration) including the indicator or the configuration information indicating whether to discard or release, to maintain and apply, or to reconfigure the SCell configuration information (e.g., configuration information described in FIG. 6) of the MCG or the SCG stored in the terminal 10-01. In step 10-65, the terminal 10-01 and the base station 10-02 may transmit and/or receive data to or from each other. In the embodiment of FIG. 10, a single base station is illustrated, but a base station performing RRC releasing in operation 10-20 and a base station performing a paging and resume procedure after operation 10-25 may be identical or different.

In FIG. 10, in the SCell configuration information (e.g., configuration information described in FIG. 6) or the PSCell (or SCell) configuration information of the cell group (e.g., SCG) of the RRC message (e.g., RRCRelease, RRCResume, or RRCReconfiguration), the base station 10-02 may allow a first active BWP of DL or UL BWP configuration information of each cell to be configured as a dormant BWP, and when the terminal activates each SCell or the PSCell of each cell group (e.g., SCG), the base station may allow the terminal 10-01 to directly operate a DL BWP or a UL BWP of each SCell or the PSCell as the dormant BWP, or to suspend or resume the cell group, thereby reducing battery consumption of the terminal. For example, for each SCell or PSCell, when a SCell state is configured as the active state, a cell group state is configured as the active state, the suspended state, or the deactivated state, an indication to suspend or resume the cell group is configured in the SCell configuration information or the cell group configuration information of the RRC message (e.g., RRCRelease or RRCResume or RRCReconfiguration), or when an indication to activate the SCell is received in MAC control information proposed, the SCell or the PSCell may be activated, resumed, or suspended, and the DL BWP or the UL BWP of the SCell or PSCell may be directly activated as the dormant BWP when the SCell or the PSCell is activated, whereby battery consumption of the terminal can be reduced.

In addition, as described above, when the terminal 10-01 in the RRC inactive mode is transitioned to the RRC-connected mode and recovers, applies, or reconfigures the SCell configuration information or the PSCell (or SCell) configuration information of the cell group (e.g., SCG), switching or activation between BWPs or activation or application of a dormant BWP may be performed for each activated SCell or PSCell (or SCell) of the cell group. In addition, the embodiments of the disclosure may be extended and applied even when handover is performed.

When the terminal receives a suspension, resumption, activation, or deactivation indicator for a cell, a cell group, or a PSCell of the cell group, a PHY layer device or a MAC layer device having received the indication may transmit the indication to an upper layer device (e.g., a MAC layer device, an RLC layer device, a PDCP layer device, or an RRC layer device). When the upper layer device receives the indication (e.g., the cell group suspension, resumption, activation, or deactivation indication) from the lower layer device, the upper layer device may perform a corresponding procedure of a protocol layer device for the cell group suspension, resumption, activation, or deactivation. Alternatively, as in the embodiments, when the terminal receives a suspension, resumption, activation, or deactivation indicator for a cell group or a PSCell of the cell group via an RRC message, an RRC layer device having receive the indication may transmit the indication to a lower layer device (e.g., a PHY layer device, a MAC layer device, an RLC layer device, or a PDCP layer device). When the lower layer receives the indication (e.g., the cell group suspension, resumption, activation, or deactivation indication) from the upper layer device (e.g., an RRC layer device), the lower layer device may perform a corresponding procedure of a protocol layer device for the cell group suspension, resumption, activation, or deactivation.

Figure 11A:
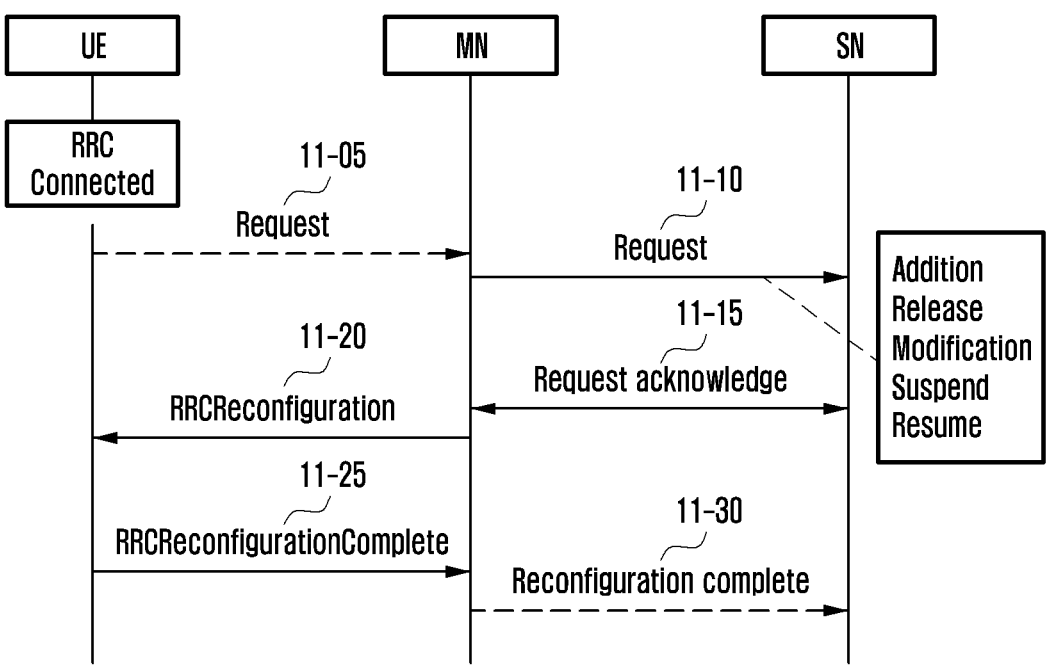
FIG. 11A illustrates a signaling procedure of configuring or releasing DC technology, or activating, resuming, suspending, or deactivating an SCG configured with the DC technology, in a next-generation mobile communication system according to an embodiment.

FIG. 11A illustrates a signaling procedure of configuring or releasing DC technology, or activating, resuming, suspending, or deactivating an SCG configured with the DC technology, in a next-generation mobile communication system according to an embodiment.

Figure 11B:
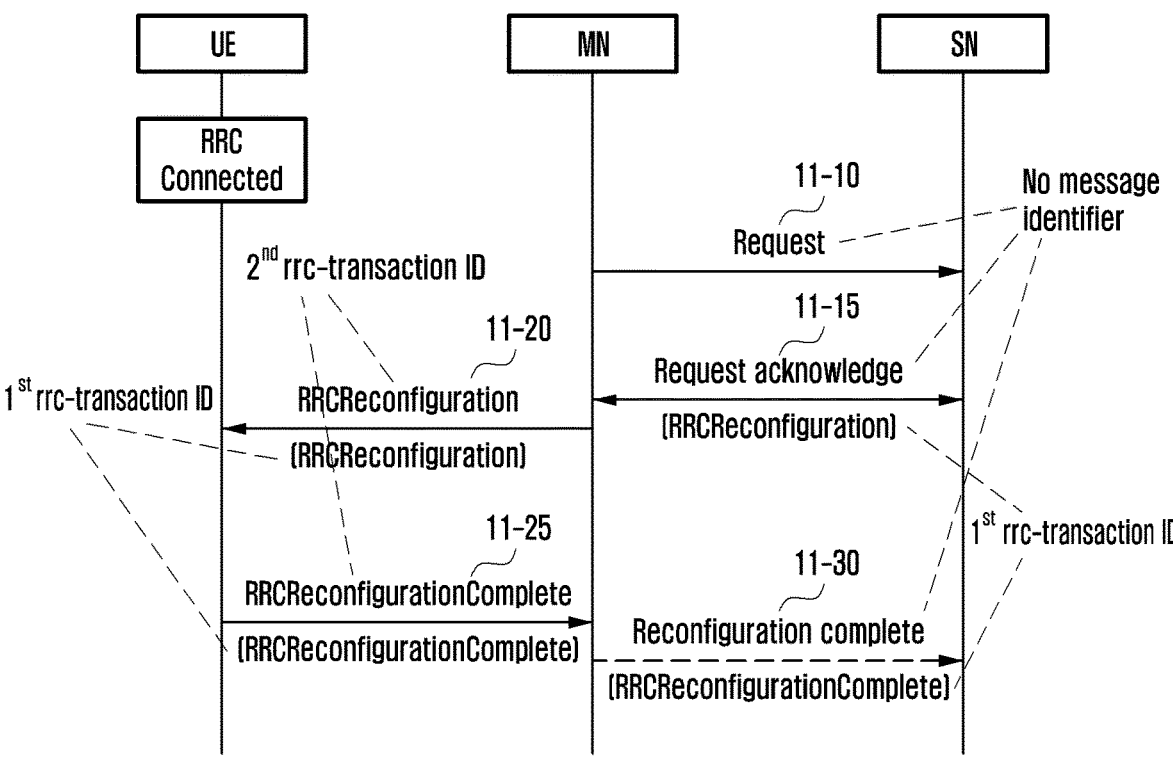
FIG. 11B illustrates a signaling procedure of configuring or releasing DC technology, or activating, resuming, suspending, or deactivating an SCG configured with the DC technology, in a next-generation mobile communication system according to an embodiment.

FIG. 11B illustrates a signaling procedure of configuring or releasing DC technology, or activating, resuming, suspending, or deactivating an SCG configured with the DC technology, in a next-generation mobile communication system according to an embodiment. FIG. 11B illustrates the procedure of FIG. 11A in more detail.

As illustrated in FIGS. 11A and 11B, a first signaling procedure of configuring or releasing DC technology, or activating, resuming, suspending, or deactivating an SCG configured with DC technology is as follows.

A terminal may configure an RRC connection with a network or a base station, as described in FIG. 6, and may perform data transmission or reception with the base station (e.g., MCG, master node (MN), MCG, or cells (PCells or SCells) of the MCG).

The base station may configure DC technology for the terminal for a predetermined reason (e.g., when a high data rate is required, upon a request 11-05 of the terminal, when a high QoS requirement should be satisfied, etc.). For example, the terminal may transmit, to the base station, a request to configure, release, clear, activate, deactivate, resume, or suspend DC technology, a cell group (e.g., SCG), or a cell, and a message of the request may include a frequency (or channel) measurement result report, a cell group ID, cell IDs, or measurement results. As another method, the base station may determine whether to configure, release, add, deactivate, activate, resume, modify, reconfigure, or suspend DC technology, a cell group (e.g., SCG), or a cell, by considering the amount of DL (or UL) data or the amount of buffer.

A master base station (MN or MCG) may receive a frequency or channel measurement report for a frequency or a channel, received from the terminal, and may determine a secondary base station (secondary node (SN) or SCG) for configuring DC technology, based on the measurement report. Alternatively, the master base station may determine whether to configure, release, add, deactivate, activate, resume, modify, reconfigure, or suspend DC technology, a cell group (e.g., SCG), or a cell, by considering the amount of DL (or UL) data or the amount of buffer. In the above description, in order to configure, release, add, deactivate, activate, resume, modify, reconfigure, or suspend DC technology, a cell group (e.g., SCG), or a cell for the determined secondary base station, the master base station may transmit, to the secondary base station, a message for requesting 11-10 whether configuring or adding to the SCG of the terminal is possible, through an Xn interface (e.g., interface between base stations) or an Sn interface (interface between a base station and an AMF or a UMF, or interface between base stations). In order to configure, release, add, deactivate, activate, resume, modify, reconfigure, or suspend DC technology, a cell group (e.g., SCG), or a cell for the secondary base station, each separate new request message may be defined and used, as the request message, and as another method, a new indicator may be defined in an existing message (e.g., SN addition request message, SN modification request message, SN release request message, etc.) to indicate (or request) to configure, release, add, deactivate, activate, resume, modify, reconfigure, or suspend a cell group (e.g., SCG) or a cell. The request message may include information such as cell group configuration information (e.g., MCG configuration information) currently configured in the terminal, bearer configuration information, capability information of the terminal, frequency (or channel) measurement result information of the terminal, etc., and by referring to the above information, the secondary base station may configure SCG configuration information or bearer configuration information to correspond to terminal capability, not to exceed terminal capability, or to match bearer configuration information of the MCG when the MCG is configured for the terminal.

In the above case, when the SCG having received the request message 11-10 rejects the request message, the secondary base station may configure a rejection message and transmit the same to the master base station through the Xn interface (e.g., interface between base stations) or the Sn interface (interface between a base station and an AMF or a UMF, or interface between base stations). When the secondary base station accepts the request message, the secondary base station may transmit a request acceptance message 11-15 including configuration information or an indicator for configuring, releasing, adding, deactivating, activating, resuming, modifying, reconfiguring, or suspending DC technology, a cell group (e.g., SCG), or a cell, through the Xn interface (e.g., interface between base stations) or the Sn interface (interface between a base station and an AMF or a UMF, or interface between base stations) to the master base station. The request acceptance message may include a part of the following information.

ID identical to a message ID included in the request message, or an indicator indicating that a request in the request message is accepted.

Configuration information or an indicator (e.g., configuration information or an indicator for the MCG) for configuring, releasing, adding, deactivating, activating, resuming, modifying, reconfiguring, or suspending DC technology, a cell group (e.g., SCG), or a cell.

First RRC message (e.g., RRCReconfiguration message) including configuration information or an indicator for configuring, releasing, adding, deactivating, activating, resuming, modifying, reconfiguring, or suspending DC technology, a cell group (e.g., SCG), or a cell.

The first RRC message may include a part of the following information.

■ First RRC message ID (e.g., rrc-Transaction ID) for distinguishing the first RRC message. Since the terminal and the base station (e.g., secondary base station) transmit or receive multiple RRC messages therebetween, an ID for distinguishing each RRC message may be included in the RRC message. For example, the same first RRC ID may be included in an RRC message (e.g., RRCReconfiguration) transmitted by a transmitting end, an RRC message (e.g., RRCReconfigurationComplete) corresponding to the RRC message (e.g., RRCReconfiguration) transmitted by a receiving end, or an RRC message corresponding to the RRC message transmitted by the transmitting end.

■ Configuration information or an indicator (e.g., configuration information or an indicator for the terminal) for configuring, releasing, adding, deactivating, activating, resuming, modifying, reconfiguring, or suspending DC technology, a cell group (e.g., SCG), or a cell.

■ Indicator indicating the state of a cell group (e.g., activated, deactivated, suspended, or resumed).

■ Cell group ID for distinguishing cell groups. The cell group ID may be allocated by the master base station, or one ID among already appointed IDs may be allocated by the secondary base station.

■ Cell group or cell configuration information.

■ Bearer configuration information, e.g., indicator information indicating an operation of a protocol layer device (e.g., SDAP layer device, PDCP layer device, RLC layer device, or MAC layer device) of each bearer (e.g., PDCP suspension indicator, PDCP reestablishment indicator, PDCP data recovery indicator, RLC reestablishment indicator, MAC partial reset indicator, MAC reset indicator, or indicator for triggering a new operation).

■ When configuration information or an indicator for configuring, adding, activating, resuming, modifying, or reconfiguring DC technology, a cell group (e.g., SCG), or a cell is included, a first indicator (e.g., mobilityControlInfo or ReconfigurationWithSync) may be also included. However, when configuration information or an indicator for releasing, deactivating, reconfiguring, or suspending DC technology, a cell group (e.g., SCG), or a cell is included, the first indicator (e.g., mobilityControlInfo or ReconfigurationWithSync) may not be included. The first indicator may be an indicator for triggering a random access procedure to the cell group or the cell, an indicator for signal synchronization with a new cell, an indicator indicating frequency shifting of the terminal, or an indicator indicating modification of the cell group (or cell).

■ When configuration information or an indicator for configuring, adding, activating, resuming, modifying, or reconfiguring DC technology, a cell group (e.g., SCG), or a cell is included, random access configuration information may be also included. However, when configuration information or an indicator for releasing, deactivating, reconfiguring, or suspending DC technology, a cell group (e.g., SCG), or a cell is included, the random access configuration information may not be included. The random access configuration information may include random access transport resource information (a time or frequency transport resource), designated preamble information, or the like for preamble transmission for the cell group or cell.

■ Time information indicating when to activate, resume, deactivate, or suspend DC technology, a cell group (e.g., SCG), or a cell (PSCell or SCG SCell) (e.g., information indicating a timing (e.g., X), a time unit, a subframe, a time slot, or a symbol unit, e.g., when the message is received in an $n^{th}$ time unit, time information indicating whether to activate, resume, deactivate, or suspend a cell in an $n+X^{th}$ time unit).

■ First channel measurement configuration information for each cell or each BWP.

■ Second channel measurement configuration information for each cell or each BWP.

■ Indicator for adding cell group configuration, indicator indicating cell group change (ReconfigurationWithSync), or indicator indicating random access procedure (ReconfigurationWithSync or newly defined indicator).

■ Indicator indicating whether to activate a cell group by performing random access procedure, or to activate a cell group without random access procedure, when cell group is activated (ReconfigurationWithSync or newly defined indicator).

■ RRM configuration information, frequency measurement configuration information, or separate RRM configuration information or frequency measurement configuration information to be applied or performed when cell group is deactivated (e.g., frequency measurement information (reduced or relaxed RRM configuration information) simplified for battery saving).

■ Configuration information for RLM, or configuration information for RLM, which is to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA)value (or offset value) for synchronization of a DL signal of the base station or a UL signal of the base station, or a timer (i.e., a TAT or a TAT value) indicating validity of the TA value, or may include configuration information of an SSB to be measured, CSI-RS configuration information, RS configuration information, or transmission resource information which can report a result (e.g., PUCCH configuration information (e.g., an SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which an RLM procedure is to be performed. As another method, when the cell group state is a deactivated state, the terminal may cause the RLM procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the RLM procedure to be performed in a BWP which has been lastly (previously) activated before the cell group enters into the deactivated state, to continuously maintain a connection state with the cell group (e.g., when BWP configuration information indicating a BWP in which the RLM procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the RLM procedure is to be performed is not configured when activating the cell group, the terminal may cause the RLM procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the RLM procedure is to be performed. As another method, when the cell group state is a deactivated state, the terminal may cause the RLM procedure to be performed in a beam (e.g., TCI state or QCL configuration information) configured via the RRC message, or activate the beam, perform the RLM procedure, and early monitor the beam to be activated when activating the cell group, to minimize cell group activation latency. As another method, when the cell group state is configured as a deactivated state (or activated state), the terminal may cause the RLM procedure to be performed in a beam which has been lastly (or previously) activated before the cell group enters into the deactivated state, to continuously maintain a connection state with the cell group (e.g., when the beam-related configuration information indicating a beam in which the RLM procedure is to be performed is not configured), or cause the activation procedure to be performed in a beam configured via the RRC message when activating the cell group. If the beam-related configuration information indicating a beam in which the RLM procedure is to be performed is not configured when activating the cell group, the terminal may cause the RLM procedure to be performed in a beam which has been lastly (or previously) activated.

■ Configuration information for a BFD procedure, or configuration information for BFD to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA)value (or offset value) for synchronization of a DL signal of the base station or a UL signal of the base station, or a timer (i.e., a TAT or a TAT value) indicating validity of the TA value, or may include configuration information of an SSB to be measured, CSI-RS configuration information, RS configuration information, or transmission resource information which can report a result (e.g., PUCCH configuration information (e.g., an SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which a beam failure detection procedure is to be performed. As another method, when the cell group state is a deactivated state, the terminal may cause the beam failure detection procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the beam failure detection procedure to be performed in a BWP which has been lastly (previously) activated before the cell group enters into the deactivated state, to continuously maintain a connection state with the cell group (e.g., when BWP configuration information indicating a BWP in which the beam failure detection procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the beam failure detection procedure is to be performed is not configured when activating the cell group, the terminal may cause the beam failure detection procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the beam failure detection procedure is to be performed. As another method, when the cell group state is a deactivated state, the terminal may cause the beam failure detection procedure to be performed in a beam (e.g., TCI state or QCL configuration information) configured via the RRC message, to early monitor the beam to be activated when activating the cell group, thereby minimizing cell group activation latency. As another method, when the cell group state is configured as a deactivated state (or activated state), the terminal may cause the beam failure detection procedure to be performed in a beam which has been lastly (or previously) activated before the cell group enters into the deactivated state, to continuously maintain a connection state with the cell group (e.g., when the beam-related configuration information indicating a beam in which the beam failure detection procedure is to be performed is not configured), or cause the activation procedure to be performed in a beam configured via the RRC message when activating the cell group. If the beam-related configuration information indicating a beam in which the beam failure detection procedure is to be performed is not configured when activating the cell group, the terminal may cause the beam failure detection procedure to be performed in a beam which has been lastly (or previously) activated.

When the master base station receives the request acceptance message 11-15, the master base station may identify the request acceptance message, and transmit, to the terminal, a second RRC message (e.g., RRCReconfiguration 11-20) including information included in the request acceptance message (e.g., first RRC message included in the request acceptance message 11-15). The second RRC message may include a part of the following information:

Second RRC message ID (e.g., rrc-Transaction ID) for distinguishing the second RRC message. Since the terminal and the base station (e.g., master base station) transmit or receive multiple RRC messages therebetween, the RRC message may include an ID for distinguishing each RRC message. For example, the same second RRC ID may be included in an RRC message (e.g., RRCReconfiguration) transmitted by a transmitting end, an RRC message (e.g., RRCReconfigurationComplete) corresponding to the RRC message (e.g., RRCReconfiguration) transmitted by a receiving end, or an RRC message corresponding to the RRC message transmitted by the transmitting end.

First RRC message included in the request acknowledge message 11-15.

Configuration information or an indicator (e.g., configuration information or an indicator for the terminal) for configuring, releasing, adding, deactivating, activating, resuming, modifying, reconfiguring, or suspending DC technology, a cell group (e.g., SCG), or a cell.

Indicator indicating the state of a cell group (e.g., activated, deactivated, suspended, or resumed).

Cell group ID for distinguishing cell groups. The cell group ID may be allocated by the master base station, or one ID among already appointed IDs may be allocated by the secondary base station.

Cell group or cell configuration information.

Bearer configuration information, e.g., indicator information indicating an operation of a protocol layer device (e.g., SDAP layer device, PDCP layer device, RLC layer device, or MAC layer device) of each bearer (e.g., PDCP suspension indicator, PDCP reestablishment indicator, PDCP data recovery indicator, RLC reestablishment indicator, MAC partial reset indicator, MAC reset indicator, or indicator for triggering a new operation).

When configuration information or an indicator for configuring, adding, activating, resuming, modifying, or reconfiguring DC technology, a cell group (e.g., SCG), or a cell is included, a first indicator (e.g., mobilityControlInfo or ReconfigurationWithSync) may be also included. However, when configuration information or an indicator for releasing, deactivating, reconfiguring, or suspending DC technology, a cell group (e.g., SCG), or a cell is included, the first indicator (e.g., mobilityControlInfo or ReconfigurationWithSync) may not be included. The first indicator may be an indicator for triggering a random access procedure to the cell group or the cell, an indicator for signal synchronization with a new cell, an indicator indicating frequency shifting of the terminal, or an indicator indicating modification of the cell group (or cell). As another method, the terminal may perform PDCCH monitoring in the above-indicated or configured cell group or cell, and also trigger and perform a random access procedure as indicated in the PDCCH. For example, the upper layer device (e.g., RRC layer device) may transmit an indicator for triggering the random access procedure to the lower layer device (e.g., MAC layer device).

When configuration information or an indicator for configuring, adding, activating, resuming, modifying, or reconfiguring DC technology, a cell group (e.g., SCG), or a cell is included, random access configuration information may be also included. However, when configuration information or an indicator for releasing, deactivating, reconfiguring, or suspending DC technology, a cell group (e.g., SCG), or a cell is included, the random access configuration information may not be included. The random access configuration information may include random access transport resource information (a time or frequency transport resource), designated preamble information, or the like for preamble transmission for the cell group or cell.

Time information indicating when to activate, resume, deactivate, or suspend DC technology, a cell group (e.g., SCG), or a cell (PSCell or SCG SCell) (e.g., information indicating a timing (e.g., X), a time unit, a subframe, a time slot, or a symbol unit, e.g., when the message is received in an $n^{th}$ time unit, time information indicating whether to activate, resume, deactivate, or suspend a cell in an $n+X^{th}$ time unit).

First channel measurement configuration information for each cell or each BWP.

Second channel measurement configuration information for each cell or each BWP.

Indicator for adding cell group configuration, indicator indicating cell group change (ReconfigurationWithSync), or indicator indicating random access procedure (ReconfigurationWithSync or newly defined indicator).

Indicator indicating whether to activate a cell group by performing random access procedure, or to activate a cell group without random access procedure, when cell group is activated (ReconfigurationWithSync or newly defined indicator).

RRM configuration information, frequency measurement configuration information, or separate RRM configuration information or frequency measurement configuration information to be applied or performed when cell group is deactivated (e.g., frequency measurement information (reduced or relaxed RRM configuration information) simplified for battery saving).

Configuration information for RLM, or configuration information for RLM, which is to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA value (or offset value) for synchronization of a DL signal of the base station or a UL signal of the base station, or a timer (i.e., a TAT or a TAT value) indicating validity of the TA value, or may include configuration information of an SSB to be measured, CSI-RS configuration information, RS configuration information, or transmission resource information which can report a result (e.g., PUCCH configuration information (e.g., scheduling request (SR) information or specific transmission resource), frequency transmission resource, or time transmission resource) when beam failure occurs. In addition, the configuration information may include BWP configuration information (e.g., the BWP configuration information may be indicated by a BWP ID) indicating a BWP in which an RLM procedure is to be performed. As another method, when the cell group state is a deactivated state, the terminal may cause the RLM procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the RLM procedure to be performed in a BWP which has been lastly (previously) activated before the cell group enters into the deactivated state, to continuously maintain a connection state with the cell group (e.g., when BWP configuration information indicating a BWP in which the RLM procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the RLM procedure is to be performed is not configured when activating the cell group, the terminal may cause the RLM procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the RLM procedure is to be performed. As another method, when the cell group state is a deactivated state, the terminal may cause the RLM procedure to be performed in a beam (e.g., TCI state or QCL configuration information) configured via the RRC message, or activate the beam, perform the RLM procedure, and early monitor the beam to be activated when activating the cell group, to minimize cell group activation latency. As another method, when the cell group state is configured as a deactivated state (or activated state), the terminal may cause the RLM procedure to be performed in a beam which has been lastly (or previously) activated before the cell group enters into the deactivated state, to continuously maintain a connection state with the cell group (e.g., when the beam-related configuration information indicating a beam in which the RLM procedure is to be performed is not configured), or cause the activation procedure to be performed in a beam configured via the RRC message when activating the cell group. If the beam-related configuration information indicating a beam in which the RLM procedure is to be performed is not configured when activating the cell group, the terminal may cause the RLM procedure to be performed in a beam which has been lastly (or previously) activated.

Configuration information for a BFD procedure, or configuration information for BFD to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA value (or offset value) for synchronization of a DL signal of the base station or a UL signal of the base station, or a timer (i.e., a TAT or a TAT value) indicating validity of the TA value, or may include configuration information of an SSB to be measured, CSI-RS configuration information, RS configuration information, or transmission resource information which can report a result (e.g., PUCCH configuration information (e.g., SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which a beam failure detection procedure is to be performed. As another method, when the cell group state is a deactivated state, the terminal may cause the beam failure detection procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the beam failure detection procedure to be performed in a BWP which has been lastly (previously) activated before the cell group enters into the deactivated state, to continuously maintain a connection state with the cell group (e.g., when BWP configuration information indicating a BWP in which the beam failure detection procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the beam failure detection procedure is to be performed is not configured when activating the cell group, the terminal may cause the beam failure detection procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the beam failure detection procedure is to be performed. As another method, when the cell group state is a deactivated state, the terminal may cause the beam failure detection procedure to be performed in a beam (e.g., TCI state or QCL configuration information) configured via the RRC message, to early monitor the beam to be activated when activating the cell group, thereby minimizing cell group activation latency. As another method, when the cell group state is configured as a deactivated state (or activated state), the terminal may cause the beam failure detection procedure to be performed in a beam which has been lastly (or previously) activated before the cell group enters into the deactivated state, to continuously maintain a connection state with the cell group (e.g., when the beam-related configuration information indicating a beam in which the beam failure detection procedure is to be performed is not configured), or cause the activation procedure to be performed in a beam configured via the RRC message when activating the cell group. If the beam-related configuration information indicating a beam in which the beam failure detection procedure is to be performed is not configured when activating the cell group, the terminal may cause the beam failure detection procedure to be performed in a beam which has been lastly (or previously) activated.

When the terminal receives the second RRC message 11-20, the terminal may identify (acquire) the second RRC message, or may identify information included in the second RRC message (e.g., first RRC message included in the second RRC message) and may configure, add, modify, resume, suspend, or deactivate DC technology or a cell group (e.g., SCG). In addition, when a first indicator for triggering a random access procedure is included in the second RRC message or the first RRC message, a random access procedure for the configured or indicated cell group or cell may be triggered. When a random access procedure is performed, if there is random access information in the RRC message, or if there is stored random access information, the terminal may perform a random access procedure (e.g., CFRA procedure (e.g., 4-step random access or 2-step random access)), based on the stored random access information, the random access information received in the RRC message, or system information. If there is no random access information in the RRC message, the terminal may perform a random access procedure (e.g., CBRA procedure (e.g., 4-step random access or 2-step random access)). As another method, the terminal may perform PDCCH monitoring in the above-indicated or configured cell group or cell, and also trigger and perform a random access procedure as indicated in the PDCCH. For example, the upper layer device (e.g., RRC layer device) may transmit an indicator for triggering the random access procedure to the lower layer device (e.g., MAC layer device).

Hereinafter, a first embodiment of a terminal operation in consideration of DC configuration information when the RRC message (e.g., RRCReconfiguration message) is received as described above is proposed. In the embodiment, a procedure which enables, when the terminal activates, adds, or modify a cell group, the cell group to be activated without a random access procedure (RACH-less activation) is proposed.

When the terminal has received the RRCReconfiguration message, the terminal may perform the following procedure.

1> If the terminal has an MCG (or MN) configured as LTE (E-UTRA) and an SCG (or secondary node) configured as NR (that is, if E-UTRA nr-SecondaryCellGroupConfig is configured), or if the terminal is configured as next generation E-UTRA NR-DC ((NG)EN-DC) connected to 5GC, ■ 2> if the RRCReconfiguration message is received through an E-UTRA RRC message in a Mobility-FromNRCommand message (message indicating handover from NR to (NG)EN-DC)), ◆ 3> if reconfigurationWithSync configuration information is included in spCellConfig of the SCG in the message, or if the cell group state of the SCG is not configured as a deactivated state, ● 4> the terminal may perform (or trigger or start) a random access procedure for an SPCell (or SCG or PSCell).

● 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TimeAlignmentTimer (i.e., a TAT) connected to the cell group (or PSCell) has expired, and the procedure of activating the cell group without the random access procedure, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

◆ 3> otherwise (if the cell group state of the SCG is not configured as the deactivated state, if a new indicator (e.g., RACH-less indication) is included in the message and indicates not to perform the random access procedure, or if reconfiguration-WithSync configuration information is not included in spCellConfig of the SCG in the message).

● 4> the terminal may not perform (or trigger or start) the random access procedure for an SPCell (or SCG or PSCell).

● 4> the terminal may activate the SPCell without the random access procedure, start PDCCH monitoring for the SPCell, or start PDSCH reception. Alternatively, if an SR transmission resource is configured for the cell (or if a PUCCH is configured), the terminal may transmit an SR for the configured transmission resource.

◆ 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or primary timing advance group (PTAG) (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

◆ 3> otherwise,

● 4> the terminal terminates performing the procedure.

1> If the terminal has an MCG (or MN) configured as NR and an SCG (or secondary node) configured as NR (that is, if E-UTRA nr-SecondaryCellGroupConfig is configured), if the terminal is configured as NR-DC (NR-DC) connected to 5GC, if the terminal has received an RRCReconfiguration message in an nr-SCG of mrdc-SecondaryCellGroup configuration information through SRB1, or if the terminal has received the mrdc-SecondaryCellGroup configuration information in an RRCReconfiguration or RRCResume message through SRB1, ■ 2> if the reconfigurationWithSync configuration information is included in spCellConfig of the nr-SCG in the message, or if the cell group state of the SCG is not configured as a deactivated state, ◆ 3> the terminal may perform (or trigger or start) a random access procedure for an SPCell (or SCG or PSCell).

■ 3> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first in a case where the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

■ 2> otherwise (if the cell group state of the SCG is not configured as the deactivated state, if a new indicator (e.g., RACH-less indication) is included in the message and indicates not to perform the random access procedure, or if reconfigurationWithSync configuration information is not included in spCellConfig of the SCG in the message), ◆ 3> the terminal may not perform (or trigger or start) the random access procedure for an SPCell (or SCG or PSCell).

◆ 3> the terminal may activate the SPCell without the random access procedure, start PDCCH monitoring for the SPCell, or start PDSCH reception. Alternatively, if an SR transmission resource is configured for the cell (or if a PUCCH is configured), the terminal may transmit an SR for the configured transmission resource.

■ 3> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first in a case where the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

■ 2> otherwise,

◆ 3> the terminal terminates performing the procedure.

1> If the reconfigurationWithSync configuration information is included in the spCellConfig of the MCG or SCG in the message, or if the MAC layer device of the NR cell group has successfully completed the above-triggered random access procedure, ■ 2> a first timer T304 for the cell group may be stopped (or if the timer is running).

■ 2> a second timer T310 for the cell group or source SPCell may be stopped (or when the timer is running).

The reconfigurationWithSync is included in the message, and the terminal may perform the following procedure when a reconfiguration procedure is performed for synchronization.

1> If a DAPS bearer is not configured, if the cell group (or SCG) state is not configured as the deactivated state, if RLM-related configuration or beam failure detection-related configuration information for the deactivated cell group is not configured (if the cell group state is configured as the deactivated state, the second timer is to continuously run, and the RLM procedure is to be performed so that prompt cell group activation is supported), or if this procedure is not performed for the deactivated cell group (or SCG), ■ 2> the second timer T310 for the cell group or SPCell may be stopped (or when the timer is running).

1> A third timer T312 for the cell group or SPCell may be stopped (or if the timer is running).

1> If the cell group (or SCG) state is not configured as the deactivated state, or if this procedure is not performed for the deactivated cell group (or SCG), ■ 2> the first timer T304 value included in the reconfigurationWithSync configuration information in the message is configured, and the first timer T304 for the SPCell (PCell of MCG or PSCell of SCG) may be started.

1> As disclosed above, if the RLM-related configuration information and the beam failure detection-related configuration information for the deactivated cell group (or SCG) is configured in the RRC message (e.g., RRCReconfiguration message), the terminal may perform an RLF detection procedure as follows.

■ 1> If the cell group state is configured as the deactivated state (or if a beam failure detection procedure or an RLM procedure is configured for the deactivated cell group), or if an indication indicating failure in synchronization for the SPCell has been received from a lower layer device by a predetermined number of times (e.g., N310 value), ◆ a second timer T310 for the SPCell may be started (if the second timer is running when the cell group state is activated (or is configured to be activated, or is not configured to be deactivated), or when the random access procedure is started or performed for the SPCell, the second timer may be stopped if the second timer is running. In addition, if the second timer has expired, the terminal may declare that RLF has occurred for the cell group).

■ 1> If a DAPS bearer is configured, if an indication indicating failure in synchronization for the source SPCell has been received from a lower layer device by a predetermined number of times (e.g., N310 value), or if the first timer is running, ◆ the second timer T310 for the source SPCell may be started.

■ 1> If an indication indicating failure in synchronization for the SPCell has been received from a lower layer device by a predetermined number of times (e.g., N310 value), or if the first timer T304 or the fourth timer is not running, ◆ the second timer T310 for the source SPCell may be started.

Hereinafter, a second embodiment of a terminal operation in consideration of DC configuration information when the RRC message (e.g., RRCReconfiguration message) is received as described above is proposed. In the embodiment, a procedure which enables, when the terminal activates, adds, or modify a cell group, the cell group to be activated without a random access procedure (RACH-less activation) is proposed.

When the terminal has received the RRCReconfiguration message, the terminal may perform the following procedure.

1> If the terminal has an MCG (or MN) configured as LTE (E-UTRA) and an SCG (or secondary node) configured as NR (that is, if E-UTRA nr-SecondaryCellGroupConfig is configured), or if the terminal is configured as next generation E-UTRA NR-DC ((NG)EN-DC) connected to 5GC, ■ 2> if the RRCReconfiguration message is received through an E-UTRA RRC message in a MobilityFromNRCommand message (message indicating handover from NR to (NG)EN-DC)), ◆ 3> if reconfigurationWithSync configuration information is included in spCellConfig of the SCG in the message, if the cell group state of the SCG is not configured as a deactivated state, if a TAT timer running in a MAC layer device (a timer for determining the validity of a TA value for synchronization between the terminal and the base station) is not running (or if the timer has expired or if an indication indicating the expiration has been received from a lower layer device), if an indication indicating beam failure detection has been received from the lower layer device (or if beam failure has occurred), if a beam failure detection procedure or an RLM procedure for the deactivated cell group is not configured, if a new beam (TCI state) is not configured in the RRC message, or if an RLF procedure is detected in the RLM procedure (or if a second timer T310 has expired or a radio link with the SCG is not valid), ● 4> the terminal may perform (or trigger or start) a random access procedure for an SPCell (or SCG or PSCell).

● 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

● 3> otherwise (if the cell group state of the SCG is not configured as the deactivated state, if a new indicator (e.g., RACH-less indication) is included in the message and indicates not to perform the random access procedure, if a TAT timer running in a MAC layer device (a timer for determining the validity of a TA value for synchronization between the terminal and the base station) is running (or if the timer has not expired or if an indication indicating the expiration has not been received from a lower layer device), if an indication indicating beam failure detection has not been received from the lower layer device (or if beam failure has not occurred), if a beam failure detection procedure or an RLM procedure for the deactivated cell group is configured, if an RLF procedure is not detected in the RLM procedure (or if a second timer T310 has not expired or a radio link with the SCG is valid), or if reconfigurationWith-Sync configuration information is not included in spCellConfig of the SCG in the message), ● 4> the terminal may not perform (or trigger or start) a random access procedure for an SPCell (or SCG or PSCell).

● 4> the terminal may activate the SPCell without the random access procedure, start PDCCH monitoring for the SPCell, or start PDSCH reception. Alternatively, if an SR transmission resource is configured for the cell (or if a PUCCH is configured), the terminal may transmit an SR for the configured transmission resource.

● 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

♦ 3> otherwise (if the cell group state of the SCG is not configured as the deactivated state, if a new indicator (e.g., RACH-less indication) is included in the message and indicates not to perform the random access procedure, if a TAT timer running in a MAC layer device (a timer for determining the validity of a TA value for synchronization between the terminal and the base station) is not running (or if the timer has expired or if an indication indicating the expiration has been received from a lower layer device), if an indication indicating beam failure detection has been received from the lower layer device (or if beam failure has occurred), if a beam failure detection procedure or an RLM procedure for the deactivated cell group is not configured, if a new beam (TCI state) is not configured via the RRC message, if an RLF procedure is detected in the RLM procedure (or if a second timer T310 has expired or a radio link with the SCG is not valid), or if reconfigurationWithSync configuration information is not included in spCellConfig of the SCG in the message), ● 4> the terminal may perform (or trigger or start) a random access procedure for an SPCell (or SCG or PSCell).

● 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

♦ 3> otherwise,
● 4> the terminal terminates performing the procedure.

1> If the terminal has an MCG (or MN) configured as NR and an SCG (or secondary node) configured as NR (that is, when E-UTRA nr-SecondaryCellGroupConfig is configured), if the terminal is configured as DCNR-DC connected to 5GC, if the terminal has received an RRCReconfiguration message in an nr-SCG of mrdc-SecondaryCellGroup configuration information through SRB1, or if the terminal has received the mrdc-SecondaryCellGroup configuration information in an RRCReconfiguration or RRCResume message through SRB1,
■ 2> if the reconfigurationWithSync configuration information is included in spCellConfig of the nr-SCG in the message, if the cell group state of the SCG is not configured as a deactivated state, if a TAT timer running in a MAC layer device (a timer for determining the validity of a TA value for synchronization between the terminal and the base station) is not running (or if the timer has expired or if an indication indicating the expiration has been received from a lower layer device), if an indication indicating beam failure detection has been received from the lower layer device (or if beam failure has occurred), if a beam failure detection procedure or an RLM procedure for the deactivated cell group is not configured, if a new beam (TCI state) is not configured in the RRC message, or if an RLF procedure is detected in the RLM procedure (or if a second timer T310 has expired or a radio link with the SCG is not valid):

⌊ 3> the terminal may perform (or trigger or start) a random access procedure for an SPCell (or SCG or PSCell).
♦ 3> If activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

■ 2> otherwise (if the cell group state of the SCG is not configured as the deactivated state, if a new indicator (e.g., RACH-less indication) is included in the message and indicates not to perform the random access procedure, if a TAT timer running in a MAC layer device (a timer for determining the validity of a TA value for synchronization between the terminal and the base station) is running (or if the timer has not expired or if an indication indicating the expiration has not been received from a lower layer device), if an indication indicating beam failure detection has not been received from the lower layer device (or if beam failure has not occurred), if a beam failure detection procedure or an RLM procedure for the deactivated cell group is configured, if reconfigurationWithSync configuration information is not included in spCellConfig of the SCG in the message, or if an RLF procedure is not detected in the RLM procedure (or if a second timer T310 has not expired or a radio link with the SCG is valid)):
♦ 3> the terminal may not perform (or trigger or start) the random access procedure for an SPCell (or SCG or PSCell).
♦ 3> the terminal may activate the SPCell without the random access procedure, start PDCCH monitoring for the SPCell, or start PDSCH reception. Alternatively, if an SR transmission resource is configured for the cell (or if a PUCCH is configured), the terminal may transmit an SR for the configured transmission resource.
♦ 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

■ 2> otherwise (if the cell group state of the SCG is not configured as the deactivated state, if a new indicator (e.g., RACH-less indication) is included in the message and indicates not to perform the random access procedure, if a TAT timer running in a MAC layer device (a timer for determining the validity of a TA value for synchronization between the terminal and the base station) is not running (or if the timer has expired or if an indication indicating the expiration has been received from a lower layer device), if an indication indicating beam failure detection has been received from the lower layer device (or if beam failure has occurred), if a beam failure detection procedure or an RLM procedure for the deactivated cell group is not configured, if a new beam (TCI state) is not configured via the RRC message, if an RLF procedure is detected in the RLM procedure (or if a second timer T310 has expired or a radio link with the SCG is not valid), or if reconfiguration-WithSync configuration information is not included in spCellConfig of the SCG in the message), ♦ 3> the terminal may perform (or trigger or start) the random access procedure for an SPCell (or SCG or PSCell).

♦ 3> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

■ 2> otherwise,

♦ 3> the terminal terminates performing the procedure.

1> If the reconfigurationWithSync configuration information is included in the spCellConfig of the MCG or SCG in the message, or if the MAC layer device of the NR cell group has successfully completed the above-triggered random access procedure, ■ 2> a first timer T304 for the cell group may be stopped (or if the timer is running).

■ 2> a second timer T310 for the cell group or source SPCell may be stopped (or when the timer is running).

The reconfigurationWithSync is included in the message, and the terminal may perform the following procedure when a reconfiguration procedure is performed for synchronization.

1> If a DAPS bearer is not configured, if the cell group (or SCG) state is not configured as the deactivated state, if RLM-related configuration or beam failure detection-related configuration information for the deactivated cell group is not configured (if the cell group state is configured as the deactivated state, the second timer is to continuously run, and the RLM procedure is to be performed so that prompt cell group activation is supported), or if this procedure is not performed for the deactivated cell group (or SCG), ■ 2> the second timer T310 for the cell group or SPCell may be stopped (or when the timer is running).

1> A third timer T312 for the cell group or SPCell may be stopped (or if the timer is running).

1> If the cell group (or SCG) state is not configured as the deactivated state, or if this procedure not performed for the deactivated cell group (or SCG), ■ 2> the first timer T304 value included in the reconfigurationWithSync configuration information in the message is configured, and the first timer T304 for the SPCell (PCell of MCG or PSCell of SCG) may be started.

1> As disclosed herein, if the RLM-related configuration information or the beam failure detection-related configuration information for the deactivated cell group (or SCG) is configured in the RRC message (e.g., RRCReconfiguration message), the terminal may perform an RLF detection procedure as follows:

■ 1> If the cell group state is configured as the deactivated state (or if a beam failure detection procedure or an RLM procedure is configured for the deactivated cell group), or if an indication indicating failure in synchronization for the SPCell has been received from a lower layer device by a predetermined number of times (e.g., N310 value), ♦ a second timer T310 for the SPCell may be started (if the second timer is running when the cell group state is activated (or is configured to be activated, or is not configured to be deactivated), when the random access procedure is started or performed for the SPCell, or when the random access procedure has been successfully performed, the second timer may be stopped. In addition, if the second timer has expired, the terminal may declare that RLF has occurred for the cell group.).

■ 1> If a DAPS bearer is configured, if an indication indicating failure in synchronization for the source SPCell has been received from a lower layer device by a predetermined number of times (e.g., N310 value), or if the first timer is running, ♦ the second timer T310 for the source SPCell may be started.

■ 1> If an indication indicating failure in synchronization for the SPCell has been received from a lower layer device by a predetermined number of times (e.g., N310 value), or if the first timer T304 or the fourth timer is not running, ♦ the second timer T310 for the source SPCell may be started.

Hereinafter, a third embodiment of a terminal operation in consideration of DC configuration information when the RRC message (e.g., RRCReconfiguration message) is received as described above is proposed. In the embodiment, a procedure which enables, when the terminal activates, adds, or modify a cell group, the cell group to be activated without a random access procedure (RACH-less activation) is proposed.

When the terminal has received the RRCReconfiguration message, the terminal may perform the following procedure.

1> If the terminal has an MCG (or MN) configured as LTE (E-UTRA) and an SCG (or secondary node) configured as NR (that is, if E-UTRA nr-SecondaryCellGroupConfig is configured), or if the terminal is configured as next generation E-UTRA NR-DC ((NG)EN-DC) connected to 5GC, ■ 2> if the RRCReconfiguration message is received through an E-UTRA RRC message in a MobilityFromNRCommand message (message indicating handover from NR to (NG)EN-DC)), ♦ 3> if reconfigurationWithSync configuration information is included in spCellConfig of the SCG in the message, if the cell group state of the SCG is not configured as a deactivated state, if a TAT timer running in a MAC layer device (a timer for determining the validity of a TA value for synchronization between the terminal and the base station) is not running (or if the timer has expired or if an indication indicating the expiration has been received from a lower layer device), if an indication indicating beam failure detection has been received from the lower layer device (or if beam failure has occurred), if a beam failure detection procedure or an RLM procedure for the deactivated cell group is not configured, if a new beam (TCI state) is not configured in the RRC message, or if an RLF procedure is detected in the RLM procedure (or if a second timer T310 has expired or a radio link with the SCG is not valid), ● 4> the terminal may perform (or trigger or start) a random access procedure for an SPCell (or SCG or PSCell).

● 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

● 3> otherwise (if the cell group state of the SCG is not configured as the deactivated state, if a new indicator (e.g., RACH-less indication or second reconfigurationWithSync) is included in the message and indicates not to perform the random access procedure, if a TAT timer running in a MAC layer device (a timer for determining the validity of a TA value for synchronization between the terminal and the base station) is running (or if the timer has not expired or if an indication indicating the expiration has not been received from a lower layer device), if an indication indicating beam failure detection has not been received from the lower layer device (or if beam failure has not occurred), if a beam failure detection procedure or an RLM procedure for the deactivated cell group is configured, if an RLF procedure is not detected in the RLM procedure (or if a second timer T310 has not expired or a radio link with the SCG is valid), or if reconfigurationWithSync configuration information is not included in spCellConfig of the SCG in the message), ● 4> the terminal may not perform (or trigger or start) a random access procedure for an SPCell (or SCG or PSCell).

● 4> the terminal may activate the SPCell without the random access procedure, start PDCCH monitoring for the SPCell, or start PDSCH reception. Alternatively, if an SR transmission resource is configured for the cell (or if a PUCCH is configured), the terminal may transmit an SR for the configured transmission resource.

● 4> To identify whether the SPCell has been successfully activated without a random access procedure, the terminal may introduce a new fourth timer. For example, the terminal may start the fourth timer when the condition above is satisfied. The fourth timer may be stopped when a PDCCH or a PDSCH is successfully received from the SPCell. If the fourth timer expires, the terminal may trigger an SCG failure report procedure and report the same through the MCG. As another method, when the fourth timer has expired, the terminal may perform a random access procedure (i.e., CBRA or CFRA) or a two-step random access (two-step RACH) procedure (that is, may fall back to a random access procedure), based on separate configuration information for the random access procedure, configured via the RRC message or broadcasted in system information (e.g., the configuration information may be configured as second reconfigurationWithSync, preamble information, smtc information, or a new terminal ID (RNTI value) may be configured, or a Need code may be configured as S to be stored and used). As another method, when the procedure of activating a cell group without a random access procedure has failed (e.g., when a PDCCH or a PDSCH has failed to be received for a predetermined time interval), the terminal may perform a random access procedure (CBRA or CFRA) or a two-step random access (two-step RACH) procedure (that is, may fall back to a random access procedure), based on separate configuration information for the random access procedure, configured via the RRC message or broadcasted in system information. The separate configuration information for the random access procedure may be also configured when an indication for deactivation of the cell group is transmitted to the terminal via the RRC message, or may be also configured when an indication (or reconfigurationWithSync) for activation of the cell group is transmitted to the cell group is transmitted via the RRC message. Whether the cell group has been successfully activated without the random access procedure may be determined based on, e.g., when the terminal successfully receives a PDCCH from the base station, when the terminal receives a transmission resource (UL grant or DL assignment), or when the terminal receives an RRC message from the base station.

● 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

♦ 3> otherwise (if the cell group state of the SCG is not configured as the deactivated state, if a new indicator (e.g., RACH-less indication) is included in the message and indicates not to perform the random access procedure, if a TAT timer running in a MAC layer device (a timer for determining the validity of a TA value for synchronization between the terminal and the base station) is not running (or if the timer has expired or if an indication indicating the expiration has been received from a lower layer device), if an indication indicating beam failure detection has been received from the lower layer device (or if beam failure has occurred), if a beam failure detection procedure or an RLM procedure for the deactivated cell group is not configured, if a new beam (TCI state) is not configured in the RRC message, if an RLF procedure is detected in the RLM procedure (or if a second timer T310 has expired or a radio link with the SCG is not valid), or if reconfigurationWithSync configuration information is not included in spCellConfig of the SCG in the message), ● 4> the terminal may perform (or trigger or start) a random access procedure for an SPCell (or SCG or PSCell).

● 4> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

◆ 3> otherwise,

● 4> the terminal terminates performing the procedure.

1> If the terminal has an MCG (or MN) configured as NR and an SCG (or secondary node) configured as NR (that is, when E-UTRA nr-SecondaryCellGroupConfig is configured), if the terminal is configured as DCNR-DC connected to 5GC, if the terminal has received an RRCReconfiguration message in an nr-SCG of mrdc-SecondaryCellGroup configuration information through SRB1, or if the terminal has received the mrdc-SecondaryCellGroup configuration information in an RRCReconfiguration or RRCResume message through SRB1, ■ 2> if the reconfigurationWithSync configuration information is included in spCellConfig of the nr-SCG in the message, if the cell group state of the SCG is not configured as a deactivated state, if a TAT timer running in a MAC layer device (a timer for determining the validity of a TA value for synchronization between the terminal and the base station) is not running (or if the timer has expired or if an indication indicating the expiration has been received from a lower layer device), if an indication indicating beam failure detection has been received from the lower layer device (or if beam failure has occurred), if a beam failure detection procedure or an RLM procedure for the deactivated cell group is not configured, if a new beam (TCI state) is not configured in the RRC message, or if an RLF procedure is detected in the RLM procedure (or if a second timer T310 has expired or a radio link with the SCG is not valid), ◆ 3> the terminal may perform (or trigger or start) a random access procedure for an SPCell (or SCG or PSCell).

◆ 3> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

■ 2> otherwise (if the cell group state of the SCG is not configured as the deactivated state, if a new indicator (e.g., RACH-less indication or second reconfigurationWithSync) is included in the message and indicates not to perform the random access procedure, if a TAT timer running in a MAC layer device (a timer for determining the validity of a TA value for synchronization between the terminal and the base station) is running (or if the timer has not expired or if an indication indicating the expiration has not been received from a lower layer device), if an indication indicating beam failure detection has not been received from the lower layer device (or if beam failure has not occurred), if a beam failure detection procedure or an RLM procedure for the deactivated cell group is configured, if an RLF procedure is not detected in the RLM procedure (or if a second timer T310 has not expired or a radio link with the SCG is valid), or if reconfigurationWithSync configuration information is not included in spCellConfig of the SCG in the message), ◆ 3> the terminal may not perform (or trigger or start) the random access procedure for an SPCell (or SCG or PSCell).

◆ 3> the terminal may activate the SPCell without the random access procedure, start PDCCH monitoring for the SPCell, or start PDSCH reception. Alternatively, if an SR transmission resource is configured for the cell (or if a PUCCH is configured), the terminal may transmit an SR for the configured transmission resource.

◆ 3> To identify whether the SPCell has been successfully activated without a random access procedure, the terminal may introduce a new fourth timer. For example, the terminal may start the fourth timer when the condition above is satisfied. The fourth timer may be stopped when a PDCCH or a PDSCH is successfully received from the SPCell. If the fourth timer expires, the terminal may trigger an SCG failure report procedure and report the same through the MCG. As another method, when the fourth timer has expired, the terminal may perform a random access procedure (CBRA or CFRA) or a two-step random access (two-step RACH) procedure (that is, may fall back to a random access procedure), based on separate configuration information for the random access procedure, configured via the RRC message or broadcasted in system information (e.g., the configuration information may be configured as second reconfigurationWithSync, preamble information, smtc information, or a new terminal ID (RNTI value) may be configured, or a Need code may be configured as S to be stored and used). As another method, when the procedure of activating a cell group without a random access procedure has failed (e.g., when a PDCCH or a PDSCH has failed to be received for a predetermined time interval), the terminal may perform a random access procedure (CBRA or CFRA) or a two-step random access (two-step RACH) procedure (that is, may fall back to a random access procedure), based on separate configuration information for the random access procedure, configured via the RRC message or broadcasted in system information. The separate configuration information for the random access procedure may be also configured when an indication for deactivation of the cell group is transmitted to the terminal via the RRC message, or may be also configured when an indication (or reconfigurationWithSync) for activation of the cell group is transmitted to the cell group is transmitted via the RRC message.

♦ 3> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

■ 2> otherwise (if the cell group state of the SCG is not configured as the deactivated state, if a new indicator (e.g., RACH-less indication) is included in the message and indicates not to perform the random access procedure, if a TAT timer running in a MAC layer device (a timer for determining the validity of a TA value for synchronization between the terminal and the base station) is not running (or if the timer has expired or if an indication indicating the expiration has been received from a lower layer device), if an indication indicating beam failure detection has been received from the lower layer device (or if beam failure has occurred), if a beam failure detection procedure or an RLM procedure for the deactivated cell group is not configured, if a new beam (TCI state) is not configured in the RRC message, or if an RLF procedure is detected in the RLM procedure (or if a second timer T310 has expired or a radio link with the SCG is not valid), or if reconfigurationWithSync configuration information is not included in spCellConfig of the SCG in the message), ♦ 3> the terminal may perform (or trigger or start) the random access procedure for an SPCell (or SCG or PSCell).

♦ 3> in the above description, if activation of the cell group (e.g., SCG) is configured (or indicated) (or if the state of the cell group is not configured as the deactivated state above), if the previous state of the cell group is the deactivated state, or if the terminal is in a connected mode, the terminal may reset a MAC layer device (perform MAC reset). The MAC reset procedure may be also performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, as proposed herein, cannot be performed (that is, the cell group can be activated without the random access procedure only when the TAT timer is running). As another method, a partial MAC reset procedure (partial MAC reset) may be performed instead of the MAC layer device reset procedure. A specific description of the MAC layer device reset procedure or the partial MAC layer device reset procedure is set forth herein.

■ 2> otherwise,

♦ 3> the terminal terminates performing the procedure.

1> If the reconfigurationWithSync configuration information is included in the spCellConfig of the MCG or SCG in the message, or if the MAC layer device of the NR cell group has successfully completed the above-triggered random access procedure, ■ 2> a first timer T304 for the cell group may be stopped (or if the timer is running).

■ 2> a second timer T310 for the cell group or source SPCell may be stopped (or when the timer is running).

The reconfigurationWithSync is included in the message, and the terminal may perform the following procedure when a reconfiguration procedure is performed for synchronization:

1> If a DAPS bearer is not configured, if the cell group (or SCG) state is not configured as the deactivated state, if RLM-related configuration or beam failure detection-related configuration information for the deactivated cell group is not configured (if the cell group state is configured as the deactivated state, the second timer is to continuously run, and the RLM procedure is to be performed so that prompt cell group activation is supported), or if this procedure is not performed for the deactivated cell group (or SCG), ■ 2> the second timer T310 for the cell group or SPCell may be stopped (or when the timer is running).

1> A third timer T312 for the cell group or SPCell may be stopped (or if the timer is running).

1> If the cell group (or SCG) state is not configured as the deactivated state, or if this procedure not performed for the deactivated cell group (or SCG), ■ 2> the first timer T304 value included in the reconfigurationWithSync configuration information in the message is configured, and the first timer T304 for the SPCell (PCell of MCG or PSCell of SCG) may be started.

1> As disclosed herein, if the RLM-related configuration information and the beam failure detection-related configuration information for the deactivated cell group (or SCG) is configured in the RRC message (e.g., RRCReconfiguration message), the terminal may perform an RLF detection procedure as follows:

■ 1> If the cell group state is configured as the deactivated state (or if a beam failure detection procedure or an RLM procedure is configured for the deactivated cell group), or if an indication indicating failure in synchronization for the SPCell has been received from a lower layer device by a predetermined number of times (e.g., N310 value), ◆ a second timer T310 for the SPCell may be started (if the second timer is running when the cell group state is activated (or is configured to be activated, or is not configured to be deactivated)), when the random access procedure is started or performed for the SPCell, or when the random access procedure has been successfully performed, the second timer may be stopped. In addition, if the second timer has expired, the terminal may declare that RLF has occurred for the cell group).

■ 1> If a DAPS bearer is configured, if an indication indicating failure in synchronization for the source SPCell has been received from a lower layer device by a predetermined number of times (e.g., N310 value), or if the first timer is running, ◆ the second timer T310 for the source SPCell may be started.

■ 1> If an indication indicating failure in synchronization for the SPCell has been received from a lower layer device by a predetermined number of times (e.g., N310 value), or if the first timer T304 or the fourth timer is not running, ◆ the second timer T310 for the source SPCell may be started.

In the above description of the disclosure, when the terminal receives an RRC message (e.g., RRCReconfiguration message or RRCResume message) which includes an indicator for activating a cell group (or in which the cell group state is configured as an activated state), performs a random access procedure according to the condition proposed herein, and performs the CFRA random access procedure, the terminal may start (or restart) a configured (or connected) TAT timer, or newly apply a TA value (timing advance command (TAC)).

However, when the terminal receives an RRC message (e.g., RRCReconfiguration message or RRCResume message) which includes an indicator for activating a cell group (or in which the cell group state is configured as an activated state), performs a random access procedure according to the condition proposed herein, and performs the CBRA random access procedure, the base station cannot identify a cell ID of the terminal (a CBRA procedure does not include a cell ID of the terminal), and thus the terminal may not start (or restart) a TAT timer configured in (or connected to) the cell group (or PSCell), or cannot newly apply a TA value (TAC). Accordingly, to solve the problem above, when an RRC message (e.g., RRCReconfiguration message or RRCResume message) which includes an indicator for activating a cell group (or in which the cell group state is configured as an activated state), or when the RRC message includes an indicator indicating to perform a random access procedure, the base station may always configure, for the terminal, a CFRA transmission resource (e.g., dedicated preamble transmission resource (dedicated preamble)) for the random access procedure in the RRC message, so as to enable the terminal to perform the CFRA random access procedure when the terminal performs the random access procedure according to the condition proposed. As another method, to solve the above problem, when the terminal receives an RRC message (e.g., RRCReconfiguration message or RRCResume message) which includes an indicator for activating a cell group (or in which the cell group state is configured as an activated state), the terminal may consider that a TAT timer has stopped or expired when the TAT timer configured in (or connected to) the cell group (or PSCell) is running. As described above, the TAT timer stops, the terminal may start (or restart) the TAT timer or newly apply a TA value (TAC) even though the CBRA random access procedure is performed, and thus the problem can be solved.

The terminal may receive the second RRC message 11-20 or apply received configuration information, and may generate a third RRC message 11-25 or a fourth RRC message and transmit the same to the base station. The third RRC message may include a part of the following information.

Second RRC message ID having the same value as a second RRC message ID included in the second RRC message.

Indicator or ID indicating that the second RRC message is successfully received.

Fourth RRC message including a response that the first RRC message generated and transmitted by the secondary base station is successfully received. The fourth RRC message may include a part of the following information:

■ First RRC message ID having the same value as a first RRC message ID included in the first RRC message.

■ Indicator or ID indicating that the first RRC message is successfully received.

■ Response indicator indicating that the indication message is successfully applied.

When receiving a third RRC message, the base station (e.g., master base station) may identify whether the third RRC message is a response message to the second RRC message, through a second ID. In addition, the base station may identify a fourth RRC message included in the third RRC message and transmit, to the secondary base station through an Xn interface (e.g., interface between base stations) or an Sn interface (interface between a base station and an AMF or a UMF, or interface between base stations), the fourth RRC message by including the same in a configuration completion message 11-30 for an indication that configuration for the SCG base station has been completed. The configuration completion message may include a part of the following information:

Fourth RRC message included in the third RRC message.

Indicator or ID indicating that configuration (cell group addition, modification, or releasing) or indication (cell group activation, deactivation, suspension, or resumption) indicated via the request acceptance message or the first RRC message has been completed.

When receiving the configuration completion message, the base station (e.g., secondary base station) may decode or identify the fourth RRC message included in the configuration completion message, and identify whether the fourth RRC message is a response message to the first RRC message, through a first ID. In addition, the base station may identify whether the configuration or indication indicated by the base station has been successfully completed.

When receiving the configuration completion message or the fourth RRC message, the secondary base station may transmit, to the master base station, a response message that the configuration completion message or the fourth RRC message has been successfully received, as a response to the configuration completion message or the fourth RRC message.

Figure 12:
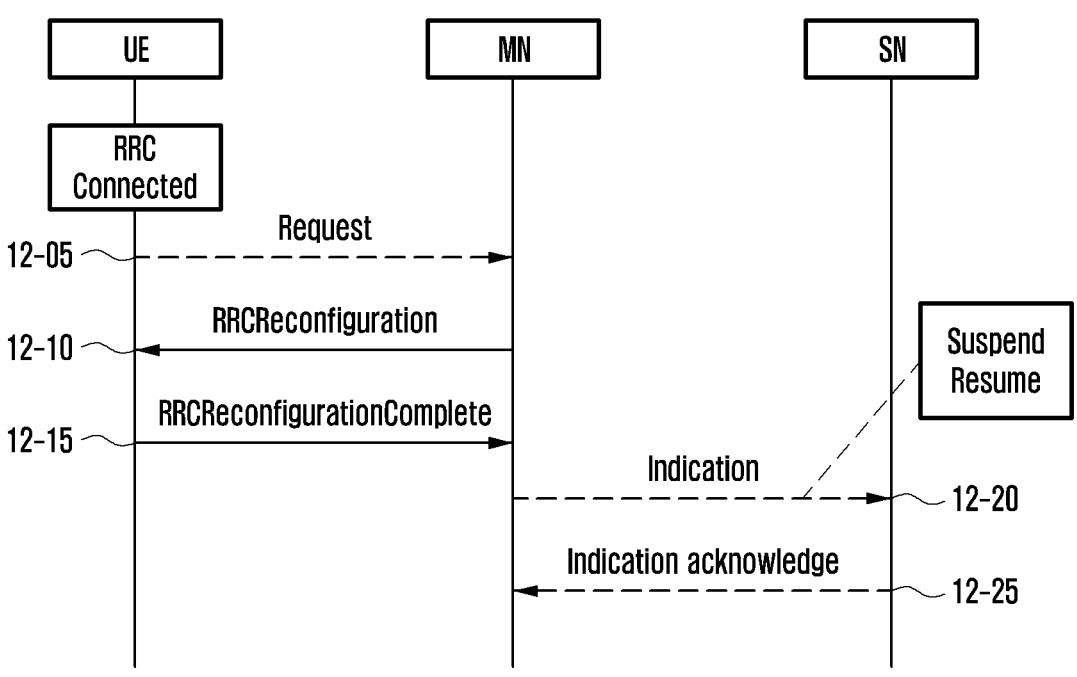
FIG. 12 illustrates a signaling procedure of configuring or releasing DC technology, or configuring, releasing, activating, resuming, suspending, or deactivating an SCG configured with the DC technology, according to an embodiment.

FIG. 12 illustrates a second signaling procedure of configuring or releasing DC technology, or configuring, releasing, activating, resuming, suspending, or deactivating an SCG configured with the DC technology, according to an embodiment.

In FIG. 12, a terminal may configure an RRC connection with a network or a base station as shown in FIG. 6 of the disclosure, and may perform data transmission or reception with the base station (e.g., MCG, MN, MCG, or cells (PCells or SCells) of the MCG).

The base station may configure DC technology for the terminal for a predetermined reason (e.g., when a high data rate is required, upon a request 12-05 of the terminal, when a high QoS requirement should be satisfied, etc.). For example, the terminal may transmit, to the base station, a request to configure, release, clear, activate, deactivate, resume, or suspend DC technology, a cell group (e.g., SCG), or a cell, and a message of the request may include a frequency (or channel) measurement result report, a cell group ID, cell IDs, or measurement results (12-05). As another method, the base station may determine whether to configure, release, add, deactivate, activate, resume, modify, reconfigure, or suspend DC technology, a cell group (e.g., SCG), or a cell, by considering the amount of DL (or UL) data or the amount of buffer.

In the above description, a master base station (MN or MCG) may receive a frequency or channel measurement report for a frequency or a channel, received from the terminal, and may determine a secondary base station (secondary node or SCG) for configuring DC technology, based on the measurement report. Alternatively, the master base station may determine whether to configure, release, add, deactivate, activate, resume, modify, reconfigure, or suspend DC technology, a cell group (e.g., SCG), or a cell, by considering the amount of DL (or UL) data or the amount of buffer. In the above description, in order to configure, release, add, deactivate, activate, resume, modify, reconfigure, or suspend DC technology, a cell group (e.g., SCG), or a cell for the determined secondary base station, the master base station may transmit a first RRC message 12-10 to the terminal. In order to indicate to the terminal to configure, release, add, deactivate, activate, resume, modify, reconfigure, or suspend DC technology, a cell group (e.g., SCG), or a cell, each separate new request message may be defined and indicated in the first RRC message, and as another method, a new indicator may be defined in an existing message (e.g., RRCReconfiguration message or RRCResume message) to indicate (or request) to configure, release, add, deactivate, activate, resume, modify, reconfigure, or suspend a cell group (e.g., SCG) or a cell. The first RRC message may include a part of the following information.

First RRC message ID (e.g., rrc-Transaction ID) for distinguishing the first RRC message. Since the terminal and the base station (e.g., master base station) transmit or receive multiple RRC messages therebetween, an ID for distinguishing each RRC message may be included in the RRC message. For example, the same first RRC ID may be included in an RRC message (e.g., RRCReconfiguration) transmitted by a transmitting end, an RRC message (e.g., RRCReconfigurationComplete) corresponding to the RRC message (e.g., RRCReconfiguration) transmitted by a receiving end, or an RRC message corresponding to the RRC message transmitted by the transmitting end.

Configuration information or an indicator (e.g., configuration information or an indicator for the terminal) for configuring, releasing, adding, deactivating, activating, resuming, modifying, reconfiguring, or suspending DC technology, a cell group (e.g., SCG), or a cell.

Indicator indicating the state of a cell group (e.g., activated, deactivated, suspended, or resumed).

Cell group ID for distinguishing cell groups. The cell group ID may be allocated by the master base station, or one ID among already appointed IDs may be allocated by the secondary base station.

Cell group or cell configuration information.

Bearer configuration information, e.g., indicator information indicating an operation of a protocol layer device (e.g., SDAP layer device, PDCP layer device, RLC layer device, or MAC layer device) of each bearer (e.g., PDCP suspension indicator, PDCP reestablishment indicator, PDCP data recovery indicator, RLC reestablishment indicator, MAC partial reset indicator, MAC reset indicator, or indicator for triggering a new operation).

When configuration information or an indicator for configuring, adding, activating, resuming, modifying, or reconfiguring DC technology, a cell group (e.g., SCG), or a cell is included, a first indicator (e.g., mobilityControlInfo or ReconfigurationWithSync) may be also included. However, When configuration information or an indicator for releasing, deactivating, reconfiguring, or suspending DC technology, a cell group (e.g., SCG), or a cell is included, the first indicator (e.g., mobilityControlInfo or ReconfigurationWithSync) may not be included. The first indicator may be an indicator for triggering a random access procedure to the cell group or the cell, an indicator for signal synchronization with a new cell, an indicator indicating frequency shifting of the terminal, or an indicator indicating modification of the cell group (or cell). As another method, the terminal may perform PDCCH monitoring in the above-indicated or configured cell group or cell, and also trigger and perform a random access procedure as indicated in the PDCCH. For example, the upper layer device (e.g., RRC layer device) may transmit an indicator for triggering the random access procedure to the lower layer device (e.g., MAC layer device).

When configuration information or an indicator for configuring, adding, activating, resuming, modifying, or reconfiguring DC technology, a cell group (e.g., SCG), or a cell is included, random access configuration information may be also included. However, when configuration information or an indicator for releasing, deactivating, reconfiguring, or suspending DC technology, a cell group (e.g., SCG), or a cell is included, the random access configuration information may not be included. The random access configuration information may include random access transport resource information (a time or frequency transport resource), designated preamble information, or the like for preamble transmission for the cell group or cell.

Time information indicating when to activate, resume, deactivate, or suspend DC technology, a cell group (e.g., SCG), or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate, resume, deactivate, or suspend a cell in an $n+X^{th}$ time unit).

First channel measurement configuration information for each cell or each BWP.

Second channel measurement configuration information for each cell or each BWP.

Indicator for adding cell group configuration, indicator indicating cell group change (ReconfigurationWithSync), or indicator indicating random access procedure (ReconfigurationWithSync or newly defined indicator).

Indicator indicating whether to activate a cell group by performing random access procedure, or to activate a cell group without random access procedure, when cell group is activated (ReconfigurationWithSync or newly defined indicator).

RRM configuration information, frequency measurement configuration information, or separate RRM configuration information or frequency measurement configuration information to be applied or performed when cell group is deactivated (e.g., frequency measurement information (reduced or relaxed RRM configuration information) simplified for battery saving).

Configuration information for RLM, or configuration information for RLM, which is to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA value (or offset value) for synchronization of a DL signal of the base station or a UL signal of the base station, or a timer (a TAT or a TAT value) indicating validity of the TA value, or may include configuration information of an SSB to be measured, CSI-RS configuration information, RS configuration information, or transmission resource information which can report a result (e.g., PUCCH configuration information (e.g., SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which an RLM procedure is to be performed. As another method, when the cell group state is a deactivated state, the terminal may cause the RLM procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the RLM procedure to be performed in a BWP which has been lastly (previously) activated before the cell group enters into the deactivated state, to continuously maintain a connection state with the cell group (e.g., when BWP configuration information indicating a BWP in which the RLM procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the RLM procedure is to be performed is not configured when activating the cell group, the terminal may cause the RLM procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the RLM procedure is to be performed. As another method, when the cell group state is a deactivated state, the terminal may cause the RLM procedure to be performed in a beam (e.g., TCI state or QCL configuration information) configured via the RRC message, or activate the beam, perform the RLM procedure, and early monitor the beam to be activated when activating the cell group, to minimize cell group activation latency. As another method, when the cell group state is configured as a deactivated state (or activated state), the terminal may cause the RLM procedure to be performed in a beam which has been lastly (or previously) activated before the cell group enters into the deactivated state, to continuously maintain a connection state with the cell group (e.g., when the beam-related configuration information indicating a beam in which the RLM procedure is to be performed is not configured), or cause the activation procedure to be performed in a beam configured via the RRC message when activating the cell group. If the beam-related configuration information indicating a beam in which the RLM procedure is to be performed is not configured when activating the cell group, the terminal may cause the RLM procedure to be performed in a beam which has been lastly (or previously) activated.

Configuration information for a BFD procedure, or configuration information for BFD to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA value (or offset value) for synchronization of a DL signal of the base station or a UL signal of the base station, or a timer (i.e., a TAT or a TAT value) indicating validity of the TA value, or may include configuration information of an SSB to be measured, CSI-RS configuration information, RS configuration information, or transmission resource information which can report a result (e.g., PUCCH configuration information (e.g., SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which a beam failure detection procedure is to be performed. As another method, when the cell group state is a deactivated state, the terminal may cause the beam failure detection procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the beam failure detection procedure to be performed in a BWP which has been lastly (previously) activated before the cell group enters into the deactivated state, to continuously maintain a connection state with the cell group (e.g., when BWP configuration information indicating a BWP in which the beam failure detection procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the beam failure detection procedure is to be performed is not configured when activating the cell group, the terminal may cause the beam failure detection procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the beam failure detection procedure is to be performed. As another method, when the cell group state is a deactivated state, the terminal may cause the beam failure detection procedure to be performed in a beam (e.g., TCI state or QCL configuration information) configured via the RRC message, to early monitor the beam to be activated when activating the cell group, thereby minimizing cell group activation latency. As another method, when the cell group state is configured as a deactivated state (or activated state), the terminal may cause the beam failure detection procedure to be performed in a beam which has been lastly (or previously) activated before the cell group enters into the deactivated state, to continuously maintain a connection state with the cell group (e.g., when the beam-related configuration information indicating a beam in which the beam failure detection procedure is to be performed is not configured), or cause the activation procedure to be performed in a beam configured via the RRC message when activating the cell group. If the beam-related configuration information indicating a beam in which the beam failure detection procedure is to be performed is not configured when activating the cell group, the terminal may cause the beam failure detection procedure to be performed in a beam which has been lastly (or previously) activated.

When the terminal receives the first RRC message 12-10, the terminal may decode or identify the first RRC message, and may configure, add, modify, resume, suspend, or deactivate DC technology or a cell group (e.g., SCG). In addition, when a first indicator for triggering a random access procedure is included in the first RRC message, a random access procedure for the configured or indicated cell group or cell may be triggered. When a random access procedure is performed, if there is random access information in the RRC message, or if there is stored random access information, the terminal may perform a random access procedure (e.g., CFRA procedure (e.g., 4-step random access or 2-step random access)), based on the stored random access information, the random access information received in the RRC message, or system information. If there is no random access information in the RRC message, the terminal may perform a random access procedure (e.g., CBRA procedure (e.g., 4-step random access or 2-step random access)). As another method, the terminal may perform PDCCH monitoring in the above-indicated or configured cell group or cell, and also trigger and perform a random access procedure as indicated in the PDCCH. For example, the upper layer device (e.g., RRC layer device) may transmit an indicator for triggering the random access procedure to the lower layer device (e.g., MAC layer device).

The terminal may receive the first RRC message 12-10 or apply received configuration information, and may generate a second RRC message 12-15 and transmit the same to the base station. The second RRC message may include a part of the following information.

First RRC message ID having the same value as a first RRC message ID included in the first RRC message Indicator or an ID indicating that the first RRC message is successfully received When the base station (e.g., master base station) receives the second RRC message, the base station may determine whether the second RRC message is a response message to the first RRC message, via a first ID. The base station may identify the first RRC message, and transmit, to the secondary base station, an indication message 12-20 including an indication that a cell group has been configured, added, released, activated, resumed, suspended, or deactivated, through an Xn interface (e.g., interface between base stations) or an Sn interface (interface between a base station and an AMF or a UMF, or interface between base stations). The indication message 12-20 may include a part of the following information:

ID for distinguishing the indication message.

Configuration information or an indicator (e.g., configuration information or an indicator for the SCG) indicating that DC technology, a cell group (SCG), or a cell has been configured, released, added, deactivated, activated, resumed, modified, reconfigured or suspended.

When the base station (e.g., secondary base station) receives the indication message, the base station may decode or identify configuration information or a message included in the indication message, may generate an indication ACK message 12-25 as a response message to the indication message, and may transmit the indication ACK message to the master base station:

ID having the same value as an ID included in the indication message.

Indicator or an ID indicating that the indication message is successfully received.

Response indicator indicating that the indication message is successfully applied.

The above proposed signaling procedures may be combined and modified, and thus may be extended to new signaling procedures. For example, when the master base station receives a message (12-05) from the terminal, after making an inquiry or request to the secondary base station as shown in 12-20 or 11-10 in FIG. 11, the master base station may receive a response message as a response to the request, as shown in 12-25 of FIG. 12 or 11-15 in FIGS. 11A and 11B, and then configure an RRC message corresponding to 12-10 according the response message to transmit the same to the terminal, and the terminal may configure a cell group upon the indication of the RRC message, and transmit a message 12-15 to the master base station, as a response to the RRC message.

Figure 13:
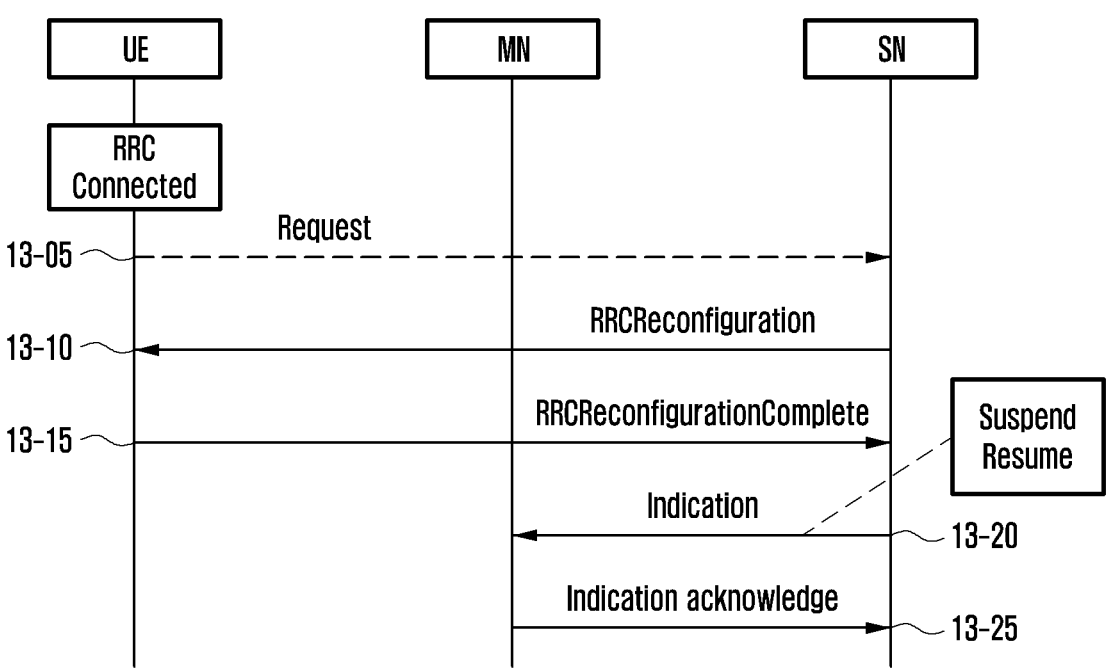
FIG. 13 illustrates a signaling procedure of configuring or releasing DC technology, or configuring, releasing, activating, resuming, suspending, or deactivating an SCG configured with the DC technology, according to an embodiment.

FIG. 13 illustrates a third signaling procedure of configuring or releasing DC technology, or configuring, releasing, activating, resuming, suspending, or deactivating an SCG configured with the DC technology, according to an embodiment.

In FIG. 13, a terminal may configure an RRC connection with a network or a base station as shown in FIG. 6 of the disclosure, and may perform data transmission or reception with the base station (e.g., MCG, MN, MCG, or cells (PCells or SCells) of the MCG).

In FIG. 13, according to a configuration procedure as described in FIG. 6, the base station may configure, for the terminal, an SRB (e.g., SRB3) which can directly transmit or receive a control message or an RRC message between the terminal and a secondary base station.

The base station (e.g., secondary base station or master base station) may configure DC technology for the terminal for a predetermined reason (e.g., when a high data rate is required, upon a request 13-05 of the terminal, when a high QoS requirement should be satisfied, etc.). For example, the terminal may transmit, to the base station, a request to configure, release, clear, activate, deactivate, resume, or suspend DC technology, a cell group (e.g., SCG), or a cell, or transmit the request to the secondary base station through SRB3, and a message of the request may include a frequency (or channel) measurement result report, a cell group ID, cell IDs, or measurement results. As another method, the secondary base station may determine whether the base station is to configure, release, add, deactivate, activate, resume, modify, reconfigure, or suspend DC technology, a cell group (e.g., SCG), or a cell, by considering the amount of DL (or UL) data or the amount of buffer.

A secondary base station (MN or MCG) may receive a frequency or channel measurement report for a frequency or a channel, received from the terminal, and may determine whether to configure, release, add, deactivate, activate, resume, modify, reconfigure, or suspend DC technology, a cell group (e.g., SCG), or a cell, based on the measurement report. Alternatively, the secondary base station may determine whether to configure, release, add, deactivate, activate, resume, modify, reconfigure, or suspend DC technology, a cell group (e.g., SCG), or a cell, by considering the amount of DL (or UL) data or the amount of buffer.

In order to configure, release, add, deactivate, activate, resume, modify, reconfigure, or suspend DC technology, a cell group (e.g., SCG), or a cell for the determined secondary base station, the secondary base station may transmit a first RRC message 13-10 to the terminal through SRB3. In order to indicate to the terminal to configure, release, add, deactivate, activate, resume, modify, reconfigure, or suspend DC technology, a cell group (e.g., SCG), or a cell, each separate new request message may be defined and indicated in the first RRC message, and as another method, a new indicator may be defined in an existing message (e.g., RRCReconfiguration message or RRCResume message) to indicate (or request) to configure, release, add, deactivate, activate, resume, modify, reconfigure, or suspend a cell group (e.g., SCG) or a cell. The first RRC message may include a part of the following information:

First RRC message ID (e.g., rrc-Transaction ID) for distinguishing the first RRC message. Since the terminal and the base station (e.g., secondary base station) transmit or receive multiple RRC messages therebetween, an ID for distinguishing each RRC message may be included in the RRC message. For example, the same first RRC message ID may be included in an RRC message (e.g., RRCReconfiguration) transmitted by a transmitting end, an RRC message (e.g., RRCReconfigurationComplete) corresponding to the RRC message (e.g., RRCReconfiguration) transmitted by a receiving end, or an RRC message corresponding to the RRC message transmitted by the transmitting end.

Configuration information or an indicator (e.g., configuration information or an indicator for the terminal) for configuring, releasing, adding, deactivating, activating, resuming, modifying, reconfiguring, or suspending DC technology, a cell group (e.g., SCG), or a cell Indicator indicating the state of a cell group (e.g., activated, deactivated, suspended, or resumed)

Cell group ID for distinguishing cell groups. The cell group ID may be allocated by the master base station, or one ID among already appointed IDs may be allocated by the secondary base station.

Cell group or cell configuration information

Bearer configuration information, e.g., indicator information indicating an operation of a protocol layer device (e.g., SDAP layer device, PDCP layer device, RLC layer device, or MAC layer device) of each bearer (e.g., PDCP suspension indicator, PDCP reestablishment indicator, PDCP data recovery indicator, RLC reestablishment indicator, MAC partial reset indicator, MAC reset indicator, or indicator for triggering a new operation)

When configuration information or an indicator for configuring, adding, activating, resuming, modifying, or reconfiguring DC technology, a cell group (e.g., SCG), or a cell is included, a first indicator (e.g., mobilityControlInfo or ReconfigurationWithSync) may be also included. However, when configuration information or an indicator for releasing, deactivating, reconfiguring, or suspending DC technology, a cell group (e.g., SCG), or a cell is included, the first indicator (e.g., mobilityControlInfo or ReconfigurationWithSync) may not be included. The first indicator may be an indicator for triggering a random access procedure to the cell group or the cell, an indicator for signal synchronization with a new cell, an indicator indicating frequency shifting of the terminal, or an indicator indicating modification of the cell group (or cell). As another method, the terminal may perform PDCCH monitoring in the above-indicated or configured cell group or cell, and also trigger and perform a random access procedure as indicated in the PDCCH. For example, the upper layer device (e.g., RRC layer device) may transmit an indicator for triggering the random access procedure to the lower layer device (e.g., MAC layer device).

When configuration information or an indicator for configuring, adding, activating, resuming, modifying, or reconfiguring DC technology, a cell group (e.g., SCG), or a cell is included, random access configuration information may be also included. However, when configuration information or an indicator for releasing, deactivating, reconfiguring, or suspending DC technology, a cell group (e.g., SCG), or a cell is included, the random access configuration information may not be included. The random access configuration information may include random access transport resource information (a time or frequency transport resource), designated preamble information, or the like for preamble transmission for the cell group or cell.

Time information indicating when to activate, resume, deactivate, or suspend DC technology, a cell group (e.g., SCG), or a cell (PSCell or SCG SCell) (e.g., information indicating a timing (e.g., X), a time unit, a subframe, a time slot, or a symbol unit, e.g., when the message is received in an $n^{th}$ time unit, time information indicating whether to activate, resume, deactivate, or suspend a cell in an $n+X^{th}$ time unit).

First channel measurement configuration information for each cell or each BWP.

Second channel measurement configuration information for each cell or each BWP.

Indicator for adding cell group configuration, indicator indicating cell group change (ReconfigurationWithSync), or indicator indicating random access procedure (ReconfigurationWithSync or newly defined indicator).

Indicator indicating whether to activate a cell group by performing random access procedure, or to activate a cell group without random access procedure, when cell group is activated (ReconfigurationWithSync or newly defined indicator).

RRM configuration information, frequency measurement configuration information, or separate RRM configuration information or frequency measurement configuration information to be applied or performed when cell group is deactivated (e.g., frequency measurement information (reduced or relaxed RRM configuration information) simplified for battery saving).

Configuration information for RLM, or configuration information for RLM, which is to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA value (or offset value) for synchronization of a DL signal of the base station or a UL signal of the base station, or a timer (i.e., a TAT or a TAT value) indicating validity of the TA value, or may include configuration information of an SSB to be measured, CSI-RS configuration information, RS configuration information, or transmission resource information which can report a result (e.g., PUCCH configuration information (e.g., SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which an RLM procedure is to be performed. As another method, when the cell group state is a deactivated state, the terminal may cause the RLM procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the RLM procedure to be performed in a BWP which has been lastly (previously) activated before the cell group enters into the deactivated state, to continuously maintain a connection state with the cell group (e.g., when BWP configuration information indicating a BWP in which the RLM procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the RLM procedure is to be performed is not configured when activating the cell group, the terminal may cause the RLM procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the RLM procedure is to be performed. As another method, when the cell group state is a deactivated state, the terminal may cause the RLM procedure to be performed in a beam (e.g., TCI state or QCL configuration information) configured via the RRC message, or activate the beam, perform the RLM procedure, and early monitor the beam to be activated when activating the cell group, to minimize cell group activation latency. As another method, when the cell group state is configured as a deactivated state (or activated state), the terminal may cause the RLM procedure to be performed in a beam which has been lastly (or previously) activated before the cell group enters into the deactivated state, to continuously maintain a connection state with the cell group (e.g., when the beam-related configuration information indicating a beam in which the RLM procedure is to be performed is not configured), or cause the activation procedure to be performed in a beam configured via the RRC message when activating the cell group. If the beam-related configuration information indicating a beam in which the RLM procedure is to be performed is not configured when activating the cell group, the terminal may cause the RLM procedure to be performed in a beam which has been lastly (or previously) activated.

Configuration information for a BFD procedure, or configuration information for BFD to be applied or performed when cell group is deactivated. For example, the configuration information may be configuration information of a cell unit beam or configuration information for each BWP, which is to be measured by the terminal when the cell group is deactivated, may include beam-related configuration information (TCI state or QCL), may include a TA value (or offset value) for synchronization of a DL signal of the base station or a UL signal of the base station, or a timer (i.e., a TAT or a TAT value) indicating validity of the TA value, or may include configuration information of an SSB to be measured, CSI-RS configuration information, RS configuration information, or transmission resource information which can report a result (e.g., PUCCH configuration information (e.g., SR information or specific transmission resource), frequency transmission resource, or time transmission resource) when beam failure occurs. In addition, the configuration information may include BWP configuration information (e.g., the BWP configuration information may be indicated by a BWP ID) indicating a BWP in which a beam failure detection procedure is to be performed. As another method, when the cell group state is a deactivated state, the terminal may cause the beam failure detection procedure to be performed in the first active BWP (or first active DL BWP or firstActiveDownlinkBWP-ID) configured via the RRC message, to early monitor the first active BWP to be activated during activation of the cell group, thereby minimizing cell group activation latency. As another method, when the cell group state is configured as a deactivated state (or configured as activated state), the terminal may cause the beam failure detection procedure to be performed in a BWP which has been lastly (previously) activated before the cell group enters into the deactivated state, to continuously maintain a connection state with the cell group (e.g., when BWP configuration information indicating a BWP in which the beam failure detection procedure is to be performed is not configured), or cause the activation procedure to be performed in the first active BWP (or the first active DL BWP or firstActiveDownlinkBWP-ID) configured via the RRC message when activating the cell group. If the BWP-related configuration information indicating a BWP in which the beam failure detection procedure is to be performed is not configured when activating the cell group, the terminal may cause the beam failure detection procedure to be performed in a BWP which has been lastly (or previously) activated. In addition, the configuration information may include beam-related configuration information (e.g., the beam-related configuration information may be indicated by a BWP ID, a TCI state, or QCL configuration information) indicating a beam in which the beam failure detection procedure is to be performed. As another method, when the cell group state is a deactivated state, the terminal may cause the beam failure detection procedure to be performed in a beam (e.g., TCI state or QCL configuration information) configured via the RRC message, to early monitor the beam to be activated when activating the cell group, thereby minimizing cell group activation latency. As another method, when the cell group state is configured as a deactivated state (or activated state), the terminal may cause the beam failure detection procedure to be performed in a beam which has been lastly (or previously) activated before the cell group enters into the deactivated state, to continuously maintain a connection state with the cell group (e.g., when the beam-related configuration information indicating a beam in which the beam failure detection procedure is to be performed is not configured), or cause the activation procedure to be performed in a beam configured via the RRC message when activating the cell group. If the beam-related configuration information indicating a beam in which the beam failure detection procedure is to be performed is not configured when activating the cell group, the terminal may cause the beam failure detection procedure to be performed in a beam which has been lastly (or previously) activated.

When the terminal receives the first RRC message 13-10 through SRB3, the terminal may decode or identify the first RRC message, and may configure, add, modify, resume, suspend, or deactivate DC technology or a cell group (e.g., SCG). In addition, when a first indicator for triggering a random access procedure is included in the first RRC message, a random access procedure for the configured or indicated cell group or cell may be triggered. When a random access procedure is performed, if there is random access information in the RRC message, or if there is stored random access information, the terminal may perform a random access procedure (e.g., CFRA procedure (e.g., 4-step random access or 2-step random access)), based on the stored random access information, the random access information received in the RRC message, or system information. If there is no random access information in the RRC message, the terminal may perform a random access procedure (e.g., CBRA procedure (e.g., 4-step random access or 2-step random access)). As another method, the terminal may perform PDCCH monitoring in the above-indicated or configured cell group or cell, and also trigger and perform a random access procedure as indicated in the PDCCH. For example, the upper layer device (e.g., RRC layer device) may transmit an indicator for triggering the random access procedure to the lower layer device (e.g., MAC layer device).

The terminal may receive the first RRC message 13-10 or apply received configuration information, and may generate a second RRC message 13-15 and transmit the same to the base station through SRB3. The second RRC message may include a part of the following information:

First RRC message ID having the same value as a first RRC message ID included in the first RRC message.

Indicator or an ID indicating that the first RRC message is successfully received.

When the base station (e.g., secondary base station) receives the second RRC message, the base station may identify whether the second RRC message is a response message to the first RRC message, via a first ID. The base station may identify the first RRC message, and transmit, to the master base station, an indication message including an indication 13-20 that a cell group has been configured, added, released, activated, resumed, suspended, or deactivated, through an Xn interface (e.g., interface between base stations) or an Sn interface (interface between a base station and an AMF or a UMF, or interface between base stations). The indication message may include a part of the following information.

ID for distinguishing the indication message.

Configuration information or an indicator (e.g., configuration information or an indicator for the SCG) indicating that DC technology, a cell group (e.g., SCG), or a cell has been configured, released, added, deactivated, activated, resumed, modified, reconfigured or suspended.

When the base station (e.g., master base station) receives the indication message, the base station may decode or identify configuration information or a message included in the indication message, may generate an indication ACK message 13-25 as a response message to the indication message, and may transmit the indication ACK message to the secondary base station.

ID having the same value as an ID included in the indication message.

Indicator or an ID indicating that the indication message is successfully received.

Response indicator indicating that the indication message is successfully applied.

When a message is transmitted to the terminal so as to configure or indicate the cell group or cell configuration information that is proposed for the terminal, e.g., when configuration information or an indicator for configuring, adding, activating, resuming, modifying, or reconfiguring DC technology, a cell group (e.g., SCG), or a cell is included in the message, the terminal may include or reconfigure SDAP configuration information, or may include, configure, or reconfigure mapping configuration information between a QoS flow and a bearer of an SDAP layer device. However, when configuration information or an indicator for releasing, deactivating, reconfiguring, or suspending DC technology, a cell group (e.g., SCG), or a cell is included in the message, the terminal may not include or may not reconfigure the SDAP configuration information, or the terminal may not include, may not configure, may not reconfigure, or suspend application of the mapping configuration information between the QoS flow and the bearer of the SDAP layer device.

The signaling procedures proposed may be combined and modified, and thus may be extended to new signaling procedures.

The signaling procedures proposed may be extended to multi-access technology. For example, configuration information of multiple cell groups may be configured for the terminal through an RRC message, and one or multiple cell groups (or cells) among the configured multiple cell groups may be activated or resumed via an indicator of a PDCCH, MAC control information, or an RRC message, or one or multiple cell groups may be suspended or deactivated.

Hereinafter, when DC technology, a cell group (e.g., SCG), or a cell (PSCell or SCG SCell) is activated, resumed, added, deactivated, released, or suspended, terminal operations for each cell (PSCell or SCG SCell) or terminal operations for each protocol layer device (e.g., SDAP layer device, PDCP layer device, RLC layer device, MAC layer device, or PHY layer device) are proposed:

1> When a terminal receives configuration information or an indicator (e.g., via DCI of a PDCCH, MAC control information, or an RRC message) for configuring, adding, activating, resuming, modifying, or reconfiguring DC technology, a cell group (e.g., SCG), or a cell, when the previous state of the cell group is a deactivated state, or the terminal is in a connected mode, the terminal may perform at least some of the following procedures:

■ 2> An upper layer device (e.g., RRC layer device) may indicate the configuration information or the indicator to a lower layer device (e.g., PDCP layer device, RLC layer device, MAC layer device, or PHY layer device).

■ 2> Terminal operation for PSCell: When the terminal receives the configuration information or the indicator, the terminal may maintain a PSCell in an active state, may activate a DL BWP of the PSCell as a normal BWP (e.g., first active BWP or bandwidth other than a dormant BWP) or a last activated BWP configured in the RRC message, and may perform a terminal operation in the activated BWP. As another method, when the terminal receives the configuration information or the indicator, the terminal may maintain a PSCell in an active state, reconfigure or switch a PDCCH monitoring period or a DRX configuration period of the PSCell to a short period, based on first DRX configuration information, perform PDCCH monitoring, and perform a terminal operation of the active cell. By using the same method above, the terminal may perform a terminal operation for the PSCell, thereby promptly receiving a scheduling indication from a cell group or a cell and starting data transmission or reception. In addition, in the above description, in order to further promptly receive a scheduling indication from a cell group or a cell and start data transmission or reception, the terminal may measure many channel signals or frequently measure channel signals, based on first channel measurement configuration information configured in the RRC message, and may promptly report a channel measurement result to the base station. When a predetermined condition is satisfied, the terminal may measure a channel signal again, based on second channel measurement configuration information, and may report a measurement result to the base station.

■ 2> Terminal operation for SCell of SCG: When the terminal receives the configuration information or the indicator, the terminal may activate an SCell of an SCG, activate a DL BWP or a UL BWP as a BWP (e.g., first active BWP) configured in the RRC message, and perform a terminal operation of the activated SCell or BWP. As another method, when the terminal receives the configuration information or the indicator, if a dormant BWP is configured for the SCell of the SCG, the terminal may maintain the SCell in an active state, activate a DL BWP of the SCell as a BWP (e.g., first active BWP) configured in the RRC message, and perform a terminal operation in the activated BWP, or, if a dormant BWP is not configured for the SCell of the SCG, the terminal may switch the SCell to an active state, activate a DL BWP or a UL BWP as a BWP (e.g., first active BWP) configured in the RRC message, and perform a terminal operation of the activated SCell or BWP. As another method, when the terminal receives the configuration information or the indicator, the terminal may determine the state of the SCell, or switching, activation, or deactivation of the BWP according to the SCell configuration information or indicator configured in the message including the configuration information or the indicator, and perform the terminal operation.

■ 2> Terminal operation of MAC layer device for SCG: When the terminal receives the configuration information or the indicator, the terminal may perform a MAC reset procedure on a MAC layer device (e.g., may reset or release configuration information configured in the MAC layer device, and may stop or reset configured timers or may stop or reset an HARQ procedure). For example, a TAT indicating the validity of signal synchronization between the terminal and the base station may be considered as stopped or expired. As another method, the terminal may also perform a MAC partial reset procedure when receiving the configuration information or indicator above (alternatively, when a message including the configuration information and indicator includes an indicator indicating a MAC partial reset procedure, the MAC partial reset procedure may be performed). For example, a TAT indicating the validity of signal synchronization between the terminal and the base station may be continuously maintained, or HARQ retransmission that is being retransmitted may be continuously performed. As another method, the terminal may not perform any procedure on the MAC layer device and may maintain a current configuration. In addition, if an indication to trigger a random access procedure is indicated from an upper layer device (e.g., RRC layer device), or if the TAT timer has stopped or expired, the terminal may trigger the random access procedure. As another method, if the TAT timer has not stopped or expired, the random access procedure may be not triggered or may not be performed. This is because if the TAT timer is running, signal synchronization with the SCG is matched and maintained, and thus an unnecessary random access procedure is performed. As another method, if the base station has triggered the random access procedure upon the indication of the PDCCH, the terminal may trigger the random access procedure, and configure or adjust a TA value, or may start the TA timer. In the above description, after completing the random access procedure, the terminal may resume or activate the SCG and restart data transmission or reception. In the above description, as the random access procedure, a CBRA procedure may be performed. As another method, when the random access procedure is performed, if dedicated random access configuration information (dedicated RACH config or dedicated preamble) is included (or configured) in a message (or previously received message) indicating activation or resumption of the cell group, a CFRA procedure may be performed, or if dedicated random access configuration information (dedicated RACH config or dedicated preamble) is not configured (or included) in a message (or previously received message) indicating activation or resumption of the cell group, a CBRA procedure may be performed, or the random access procedure may not be performed. In the above description, if it is configured (or indicated) to activate a cell group (e.g., SCG) (or if the cell group state is not configured as a deactivated state), the terminal may reset a MAC layer device (MAC reset). The MAC layer device reset (MAC reset) procedure may be performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure, cannot be performed (that is, the cell group can be activated without the random access procedure only when the TAT timer is running). As another method, a partial MAC reset procedure (partial MAC reset) may be performed instead of the MAC layer device reset procedure. As proposed above, when the MAC layer device is not reset or is not partially reset, data stored in the DL buffer of the terminal is not flushed, which may cause an error in soft combining when the data is received later (e.g., when or after the cell group is activated), or data in the UL buffer (e.g., message 3 buffer or message A buffer) is not flushed, which may cause old data to be transmitted and cause an error when the data is transmitted later (e.g., when or after the cell group is activated).

■ 2> Operation for DRB configured in SCG: When the terminal receives the configuration information or the indicator, the terminal may resume DRBs (or SN (SCG) terminated DRBs, DRBs with a PDCP layer device configured for the SCG, bearers using an RLC UM mode, or bearers using an RLC AM mode) included in the SCG. For example, for a split bearer (bearer via which one RLC layer device is configured for the MCG and another RLC layer device is configured for the SCG) with a PDCP layer device configured for the MCG, an indicator (reestablish-RLC) for triggering a procedure of re-establishing the RLC layer device configured for the SCG may also be included in the RRC message including the configuration information or the indicator, or the terminal may perform a re-establishment procedure for the RLC layer device configured for the SCG. For example, for a split bearer (bearer via which one RLC layer device is configured for the MCG and another RLC layer device is configured for the SCG) with a PDCP layer device configured for the SCG, an indicator (reestablishRLC) for triggering a procedure of re-establishing the RLC layer device configured for the MCG may also be included in the RRC message including the configuration information or the indicator, an indicator for triggering a PDCP reestablishment procedure (reestablishPDCP) or a PDCP resumption procedure (PDCP resume) in the PDCP layer device configured for the SCG may also be included, or the terminal may perform a re-establishment procedure on the RLC layer device configured for the MCG, or perform a PDCP re-establishment procedure or a PDCP resume on the PDCP layer device configured for the SCG. For example, for a bearer configured for the SCG, the terminal may resume bearers, the RLC layer device may indicate to trigger the PDCP re-establishment procedure or the PDCP resumption procedure in the PDCP layer device, or the PDCP re-establishment procedure or the PDCP resume may be performed on the PDCP layer device. In the above description, for bearers configured for the SCG (or bearers using an RLC UM mode or bearers using an RLC AM mode), the terminal may trigger a first PDCP resumption procedure, or perform the first PDCP resumption procedure in the PDCP layer device. As another method, to solve a problem of a security issue which may occur when different data pieces are transmitted by using the same security key when the SCG is activated or resumed, the terminal may trigger a second PDCP resumption procedure or perform the second PDCP resumption procedure in the PDCP layer device, for bearers configured for the SCG (or bearers using an RLC UM mode or bearers using an RLC AM mode). As another method, when the upper layer device triggers the PDCP layer device resumption procedure, the terminal may trigger or perform the first PDCP resumption procedure, and when upper layer device triggers the PDCP layer device resumption procedure or indicates an indicator indicating activation or resumption of the cell group (or cell), the terminal may trigger and perform the second PDCP resumption procedure. As another method, as described above, to solve a problem of a security issue which may occur when different data pieces are transmitted by using the same security key, when the base station indicates an indicator indicating activation or resumption of the cell group (or cell), a new security key may be configured by including security key configuration information (e.g., sk-counter) in the RRC message including the indicator indicating activation or resumption of the cell group (or cell), the security key may be changed or updated, a PDCP re-establishment procedure indicator may be included in the RRC message to change or update the security key of the bearers configured for the SCG (or bearers using an RLC UM mode or bearers using an RLC AM mode), or the terminal may perform the PDCP re-establishment procedure for the bearers. As another method, if a message including an indication indicating resumption or activation of the cell group includes security configuration information, if security configuration information change (or update) is indicated, of if an indicator indicating the first PDCP resumption procedure is included, the terminal may trigger the first PDCP resumption procedure or perform the first PDCP resumption procedure in the PDCP layer device, for bearers configured for the SCG (or bearers using an RLC UM mode or bearers using an RLC AM mode). However, if a message including an indication indicating resumption or activation of the cell group does not include security configuration information, if security configuration information change (or update) is not indicated, of if an indicator indicating the second PDCP resumption procedure is included, the terminal may trigger the second PDCP resumption procedure or perform the second PDCP resumption procedure in the PDCP layer device, for bearers configured for the SCG (or bearers using an RLC UM mode or bearers using an RLC AM mode) to solve the problem of a security issue which may occur when different data pieces are transmitted by using the same security key when the SCG is activated or resumed. The above-proposed methods may be also performed when a message including an indication for suspension or deactivation of the cell group is received. In addition, the above-proposed methods may be applied to SCG bearers (bearers having a PDCP layer device in the SCG, or SCG terminated bearers).

■ 2> Operation for an SRB configured for SCG: When the terminal receives the configuration information or the indicator and activates a PSCell, or when an active DL BWP of the PSCell is a normal BWP other than a dormant BWP, or an active PSCell monitors the PDCCH with a long period, based on first DRX configuration information, SRBs (or SN (SCG) terminated SRBs, or SRBs or SRB3s with a PDCP layer configured for the SCG) included in the SCG may be continuously maintained (e.g., the terminal may continuously transmit or receive a control message to or from a secondary base station). Alternatively, in order to discard old data (e.g., PDCP SDU or PDCP PDU) stored in the SRBs configured for the SCG, the terminal may perform a data discard procedure (e.g., a discard indication to a PDCP layer or an RLC layer reestablishment procedure). As another method, when the terminal receives the configuration information or the indicator, the terminal may resume SRBs (or SN (SCG) terminated SRBs, or SRBs or SRB3s with a PDCP layer configured for the SCG) included in the SCG. Alternatively, in order to discard old data (PDCP SDU or PDCP PDU) stored in the SRBs configured for the SCG, the terminal may perform a data discard procedure (e.g., a discard indication to a PDCP layer or an RLC layer reestablishment procedure). For example, for a split bearer (bearer via which one RLC layer device is configured for the MCG and another RLC layer device is configured for the SCG) with a PDCP layer device configured for the MCG, an indicator (reestablish-RLC) for triggering a procedure of re-establishing the RLC layer device configured for the SCG may also be included in the RRC message including the configuration information or the indicator, or the terminal may perform a re-establishment procedure for the RLC layer device configured for the SCG. For example, for a split bearer (bearer via which one RLC layer device is configured for the MCG and another RLC layer device is configured for the SCG) with a PDCP layer device configured for the SCG, an indicator (reestablishRLC) for triggering a procedure of re-establishing the RLC layer device configured for the MCG may also be included in the RRC message including the configuration information or the indicator, an indicator for triggering a PDCP reestablishment procedure (reestablishPDCP) or a PDCP resume in the PDCP layer device configured for the SCG may also be included, or the terminal may perform a re-establishment procedure on the RLC layer device configured for the MCG, or perform a PDCP re-establishment procedure or a PDCP resume on the PDCP layer device configured for the SCG. For example, for a bearer configured for the SCG, the terminal may resume bearers, the RLC layer device may indicate to trigger the PDCP re-establishment procedure or the PDCP resumption procedure in the PDCP layer device, or the PDCP re-establishment procedure or the PDCP resume may be performed on the PDCP layer device. In the above description, for bearers configured for the SCG, the terminal may trigger a first PDCP resumption procedure, or perform the first PDCP resumption procedure in the PDCP layer device. As another method, to solve a problem of a security issue which may occur when different data pieces are transmitted by using the same security key when the SCG is activated or resumed, the terminal may trigger a second PDCP resumption procedure or perform the second PDCP resumption procedure in the PDCP layer device, for bearers configured for the SCG. As another method, when the upper layer device triggers the PDCP layer device resumption procedure, the terminal may trigger or perform the first PDCP resumption procedure, and when upper layer device triggers the PDCP layer device resumption procedure or indicates an indicator indicating activation or resumption of the cell group (or cell), the terminal may trigger and perform the second PDCP resumption procedure. As another method, as described above, to solve a problem of a security issue which may occur when different data pieces are transmitted by using the same security key, when the base station indicates an indicator indicating activation or resumption of the cell group (or cell), a new security key may be configured by including security key configuration information (e.g., sk-counter) in the RRC message including the indicator indicating activation or resumption of the cell group (or cell), the security key may be changed or updated, a PDCP re-establishment procedure indicator may be included in the RRC message to change or update the security key of the bearers configured for the SCG, or the terminal may perform the PDCP re-establishment procedure for the bearers. As another method, if a message including an indication indicating resumption or activation of the cell group includes security configuration information, if security configuration information change (or update) is indicated, of if an indicator indicating the first PDCP resumption procedure is included, the terminal may trigger the first PDCP resumption procedure or perform the first PDCP resumption procedure in the PDCP layer device, for bearers configured for the SCG. However, if a message including an indication indicating resumption or activation of the cell group does not include security configuration information, if security configuration information change (or update) is not indicated, of if an indicator indicating the second PDCP resumption procedure is included, the terminal may trigger the second PDCP resumption procedure or perform the second PDCP resumption procedure in the PDCP layer device, for bearers configured for the SCG to solve the problem of a security issue which may occur when different data pieces are transmitted by using the same security key when the SCG is activated or resumed. The above-proposed methods may be also performed when a message including an indication for suspension or deactivation of the cell group is received. In addition, the above-proposed methods may be applied to SCG bearers (bearers having a PDCP layer device in the SCG, or SCG terminated bearers).

■ 2> Terminal operation for PUCCH SCell of SCG: When the terminal receives the configuration information or the indicator, the terminal may activate a PUCCH SCell of the SCG, activate a DL BWP or a UL BWP as a BWP configured via the RRC message (e.g., the first active BWP), and perform a terminal operation of the activated SCell or BWP. As another method, when the terminal receives the configuration information or the indicator, if a dormant BWP is configured for the PUCCH SCell of the SCG, the terminal may maintain the SCell in an active state, may activate a DL BWP of the SCell as the BWP configured via the RRC message (e.g., the first active BWP), and may perform a terminal operation in the active BWP, or if a dormant BWP is not configured for the SCell of the SCG, the terminal may switch the SCell to an active state, activate the DL BWP or the UL BWP as the BWP configured via the RRC message (e.g., the first active BWP), and perform a terminal operation in the activated SCell or BWP. As another method, when the terminal receives the configuration information or the indicator, the terminal may determine switching, activation, or deactivation of a BWP or the state of the SCell according to SCell configuration information or indicator configured in a message including the configuration information or the indicator, and may perform a terminal operation. As another method, when the terminal receives the configuration information or the indicator, the terminal may apply, to the PUCCH SCell, first DRX configuration information configured in the RRC message (e.g., suspend second DRX configuration information and reconfigure the first DRX configuration information), and perform a terminal operation in the activated SCell when it is possible to perform PDCCH monitoring.

■ 2> The terminal may transmit, to the MCG or the SCG, an indicator indicating that the cell group (e.g., SCG) or the cell has been configured, added, activated, resumed, modified, or reconfigured, and the terminal may transmit, to the SCG (or base station) or the MCG (or base station), the indicator via a physical signal (e.g., HARQ ACK or NACK or new transmission resource), MAC control information, or an RRC message.

■ 2> If the terminal receives an indicator indicating resumption, activation, or addition of the cell group (e.g., SCG) or the cell, if the previous cell group state is a deactivated state, or if the terminal is in a connected mode, the terminal may trigger a PDCP state report in the PDCP layer device and report the same to the base station, for SCG bearers, bearers connected to the SCG RLC layer device, SCG split bearers, MCG bearers, or MCG split bearers. This is because the PDCP state report is transmitted so that lost data or the states of window parameters can be identified between the terminal and the base station, whereby synchronization between transmission windows or reception windows can be matched.

1> When a terminal receives configuration information or an indicator (e.g., via DCI of a PDCCH, MAC control information, or an RRC message) for releasing, deactivating, reconfiguring, or suspending DC technology, a cell group (e.g., SCG), or a cell, when the previous state of the cell group is an activated state, or the terminal is in a connected mode, the terminal may perform at least some of the following procedures:

■ 2> An upper layer device (e.g., RRC layer device) may indicate the configuration information or the indicator to a lower layer device (e.g., PDCP layer device, RLC layer device, MAC layer device, or PHY layer device).

■ 2> Terminal operation for PSCell: When the terminal receives the configuration information or the indicator, the terminal may maintain a PSCell in an active state, may activate a DL BWP of the PSCell as a dormant BWP configured in the RRC message, and may perform a terminal operation in the dormant BWP. As another method, when the terminal receives the configuration information or the indicator, the terminal may maintain a PSCell in an active state, reconfigure or switch a PDCCH monitoring period or a DRX configuration period of the PSCell to a very long period, based on second DRX configuration information, perform PDCCH monitoring, and perform a terminal operation of the active cell. As another method, when the terminal receives the configuration information or the indicator, the terminal may deactivate the PSCell and perform a terminal operation in the deactivated cell. By using the method above, the terminal operation for the PSCell may be performed, whereby power consumption of the terminal can be reduced.

■ 2> Terminal operation for SCell of SCG: When the terminal receives the configuration information or the indicator, the terminal may deactivate an SCell of an SCG, and perform a terminal operation of the deactivated SCell. As another method, when the terminal receives the configuration information or the indicator, if a dormant BWP is configured for the SCell of the SCG, the terminal may maintain the SCell in an active state, activate a DL BWP of the SCell as a dormant BWP, and perform a terminal operation in the dormant BWP, or, if a dormant BWP is not configured for the SCell of the SCG, the terminal may switch the SCell to an deactivated state, and perform a terminal operation in the deactivated cell or BWP. As another method, when the terminal receives the configuration information or the indicator, the terminal may determine the state of the SCell, or switching, activation, or deactivation of the BWP according to the SCell configuration information or indicator configured in the message including the configuration information or the indicator, and perform the terminal operation.

■ Terminal operation of MAC layer device for SCG: When the terminal receives the configuration information or the indicator, the terminal may perform a MAC reset procedure on a MAC layer device (e.g., may reset or release configuration information configured in the MAC layer device, and may stop or reset configured timers or may stop or reset an HARQ procedure). For example, a TAT indicating the validity of signal synchronization between the terminal and the base station may be considered as stopped or expired. As another method, the terminal may also perform a MAC partial reset procedure when receiving the configuration information or indicator above (alternatively, when a message including the configuration information and indicator includes an indicator indicating a MAC partial reset procedure, the MAC partial reset procedure may be performed) to prevent data loss due to the MAC layer device reset procedure. For example, a TAT indicating the validity of signal synchronization between the terminal and the base station may be continuously maintained, or HARQ retransmission that is being retransmitted may be continuously performed. As another method, the terminal may not perform any procedure on the MAC layer device and may maintain a current configuration. In the above description, when the TAT is continuously maintained, if the TAT timer expires, the terminal may re-adjust or re-configure a TA by performing a random access procedure even when the SCG is stopped or deactivated. When performing the random access procedure, the terminal may indicate, to the base station via an indicator, that the random access procedure is a random access procedure for adjusting the TA (e.g., the terminal may transmit the indicator by including a buffer state report (MAC control information), indicate that there is not data to be transmitted, or may introduce a new indicator), or the base station may transmit a message including an indication to suspend or deactivate a cell group again to the terminal after completing the random access procedure, or the terminal may maintain the cell group in the suspended or deactivated state after completing the random access procedure (or as another method, the terminal may maintain the cell group in the suspended or deactivated state by the terminal itself even when there is no indication from the base station). As another method, in a case the TAT is continuously maintained, if the TAT timer expires, since the same TAT timer is running in the base station, the base station may trigger a random access procedure (for TAT adjustment or reconfiguration) for the terminal through the cell (PCell, SCell, or PSCell) of the MCG or the SCG, or may transmit a message including the indicator indicating resumption or activation of the cell group to the terminal. In the above description, if it is configured (or indicated) to activate a cell group (e.g., SCG) (or if the cell group state is not configured as a deactivated state), the terminal may reset a MAC layer device (MAC reset). The MAC layer device reset (MAC reset) procedure may be performed after the terminal determines whether to perform the random access procedure, after the terminal triggers the random access procedure, when (or after) the terminal successfully completes the random access procedure, when the terminal activates the cell group without the random access procedure, or when the terminal successfully activates the cell group without the random access procedure (e.g., successful reception of a PDCCH or reception of a transmission resource). This is because when the MAC layer device is reset first when the cell group is activated, it is considered that a TAT timer connected to the cell group or PTAG (or PSCell) has expired, and the procedure of activating the cell group without the random access procedure cannot be performed (that is, the cell group can be activated without the random access procedure only when the TAT timer is running). As another method, a partial MAC reset procedure (partial MAC reset) may be performed instead of the MAC layer device reset procedure. As proposed above, when the MAC layer device is not reset or is not partially reset, data stored in the DL buffer of the terminal is not flushed, which may cause an error in soft combining when the data is received later (e.g., when or after the cell group is activated), or data in the UL buffer (e.g., message 3 buffer or message A buffer) is not flushed, which may cause old data to be transmitted and cause an error when the data is transmitted later (e.g., when or after the cell group is activated).

■ Operation for DRB configured in SCG (or bearer using RLC UM mode or bearer using RLC AM mode): When the terminal receives the configuration information or the indicator, the terminal may suspend DRBs (or SN (SCG) terminated DRBs, DRBs with a PDCP layer device configured for the SCG, bearers using an RLC UM mode, or bearers using an RLC AM mode) included in the SCG. For example, for a split bearer (bearer via which one RLC layer device is configured for the MCG and another RLC layer device is configured for the SCG) with a PDCP layer device configured for the MCG, an indicator (reestablishRLC) for triggering a procedure of reestablishing the RLC layer device configured for the SCG may also be included in the RRC message including the configuration information or the indicator, an indicator for triggering a PDCP data recovery procedure (PDCP data recovery) in the PDCP layer device configured for the MCG may also be included, or the terminal may perform a re-establishment procedure for the RLC layer device configured for the SCG, or perform a PDCP data recovery in the PDCP layer device configured for the MCG. For example, for a split bearer (bearer via which one RLC layer device is configured for the MCG and another RLC layer device is configured for the SCG) with a PDCP layer device configured for the SCG, an indicator (reestablishRLC) for triggering a procedure of re-establishing the RLC layer device configured for the MCG may also be included in the RRC message including the configuration information or the indicator, an indicator for triggering a PDCP reestablishment procedure (reestablishPDCP) or a PDCP suspension procedure (PDCP suspend) in the PDCP layer device configured for the SCG may also be included, or the terminal may perform a re-establishment procedure for the RLC layer device configured for the MCG, or perform a PDCP re-establishment procedure or a PDCP suspend on the PDCP layer device configured for the SCG. For example, for a bearer configured for the SCG (or bearer using an RLC UM mode or bearer using an RLC AM mode), the terminal may resume bearers, the RLC layer device may indicate to trigger the PDCP re-establishment procedure or the PDCP suspension procedure in the PDCP layer device, or the PDCP re-establishment procedure or the PDCP suspend may be performed on the PDCP layer device. In the above description, for bearers configured for the SCG (or bearers using an RLC UM mode or bearers using an RLC AM mode), the terminal may trigger a first PDCP suspension procedure, or perform the first PDCP suspension procedure in the PDCP layer device. As another method, to solve a problem of a security issue which may occur when different data pieces are transmitted by using the same security key when the SCG is activated or resumed, the terminal may trigger a second PDCP suspension procedure or perform the second PDCP suspension procedure in the PDCP layer device, for bearers configured for the SCG (or bearers using an RLC UM mode or bearers using an RLC AM mode). As another method, when the upper layer device triggers the PDCP layer device suspension procedure, the terminal may trigger or perform the first PDCP suspension procedure, and when upper layer device triggers the PDCP layer device suspension procedure or indicates an indicator indicating deactivation or suspension of the cell group (or cell), the terminal may trigger and perform the second PDCP suspension procedure. As another method, if a message including an indication indicating suspension or deactivation of the cell group includes security configuration information, if security configuration information change (or update) is indicated, of if an indicator indicating the first PDCP suspension procedure is included, the terminal may trigger the first PDCP suspension procedure or perform the first PDCP suspension procedure in the PDCP layer device, for bearers configured for the SCG (or bearers using an RLC UM mode or bearers using an RLC AM mode). However, if a message including an indication indicating suspension or deactivation of the cell group does not include security configuration information, if security configuration information change (or update) is not indicated, of if an indicator indicating the second PDCP suspension procedure is included, the terminal may trigger the second PDCP suspension procedure or perform the second PDCP suspension procedure in the PDCP layer device, for bearers configured for the SCG (or bearers using an RLC UM mode or bearers using an RLC AM mode) to solve the problem of a security issue which may occur when different data pieces are transmitted by using the same security key when the SCG is activated or resumed. The above-proposed methods may be also performed when a message including an indication for resumption or activation of the cell group is received. In addition, the above-proposed methods may be applied to SCG bearers (bearers having a PDCP layer device in the SCG, or SCG terminated bearers).

■ Operation for an SRB configured for SCG: When the terminal receives the configuration information or the indicator and activates a PSCell, or when an active DL BWP of the PSCell is a normal BWP other than a dormant BWP, or an active PSCell monitors the PDCCH with a long period, based on second DRX configuration information, SRBs (or SN (SCG) terminated SRBs, or SRBs or SRB3s with a PDCP layer configured for the SCG) included in the SCG may be continuously maintained (e.g., the terminal may continuously transmit or receive a control message to or from a secondary base station). Alternatively, in order to discard old data (e.g., PDCP SDU or PDCP PDU) stored in the SRBs configured for the SCG, the terminal may perform a data discard procedure (e.g., a discard indication to a PDCP layer or an RLC layer reestablishment procedure). As another method, when the terminal receives the configuration information or the indicator, the terminal may suspend SRBs (or SN (SCG) terminated SRBs, or SRBs or SRB3s with a PDCP layer configured for the SCG) included in the SCG. Alternatively, in order to discard old data (e.g., PDCP SDU or PDCP PDU) stored in the SRBs configured for the SCG, the terminal may perform a data discard procedure (e.g., a discard indication to a PDCP layer or an RLC layer reestablishment procedure). For example, for a split bearer (bearer via which one RLC layer device is configured for the MCG and another RLC layer device is configured for the SCG) with a PDCP layer device configured for the MCG, an indicator (reestablishRLC) for triggering a procedure of re-establishing the RLC layer device configured for the SCG may also be included in the RRC message including the configuration information or the indicator, an indicator for trigger a PDCP data recovery in the PDCP layer device configured for the mater cell group may also be included, or the terminal may perform a re-establishment procedure for the RLC layer device configured for the SCG, or perform the PDCP data recovery in the PDCP layer device configured for the MCG. For example, for a split bearer (bearer via which one RLC layer device is configured for the MCG and another RLC layer device is configured for the SCG) with a PDCP layer device configured for the SCG, an indicator (reestablish- RLC) for triggering a procedure of re-establishing the RLC layer device configured for the MCG may also be included in the RRC message including the configuration information or the indicator, an indicator for triggering a PDCP reestablishment procedure (reestablishPDCP) or a PDCP suspend in the PDCP layer device configured for the SCG may also be included, or the terminal may perform a re-establishment procedure on the RLC layer device configured for the MCG, or perform a PDCP re-establishment procedure or a PDCP suspend on the PDCP layer device configured for the SCG. For example, for a bearer configured for the SCG, the terminal may suspend bearers, indicate to trigger the PDCP re-establishment procedure or the PDCP suspension procedure in the PDCP layer device, or perform the PDCP re-establishment procedure or the PDCP suspend on the PDCP layer device. In the above description, for bearers configured for the SCG, the terminal may trigger a first PDCP suspension procedure, or perform the first PDCP suspension procedure in the PDCP layer device. As another method, to solve a problem of a security issue which may occur when different data pieces are transmitted by using the same security key when the SCG is activated or resumed, the terminal may trigger a second PDCP suspension procedure or perform the second PDCP suspension procedure in the PDCP layer device, for bearers configured for the SCG. As another method, when the upper layer device triggers the PDCP layer device suspension procedure, the terminal may trigger or perform the first PDCP suspension procedure, and when upper layer device triggers the PDCP layer device suspension procedure or indicates an indicator indicating deactivation or suspension of the cell group (or cell), the terminal may trigger and perform the second PDCP suspension procedure. As another method, if a message including an indication indicating suspension or deactivation of the cell group includes security configuration information, if security configuration information change (or update) is indicated, of if an indicator indicating the first PDCP suspension procedure is included, the terminal may trigger the first PDCP suspension procedure or perform the first PDCP suspension procedure in the PDCP layer device, for bearers configured for the SCG. However, if a message including an indication indicating suspension or deactivation of the cell group does not include security configuration information, if security configuration information change (or update) is not indicated, of if an indicator indicating the second PDCP suspension procedure is included, the terminal may trigger the second PDCP suspension procedure or perform the second PDCP suspension procedure in the PDCP layer device, for bearers configured for the SCG to solve the problem of a security issue which may occur when different data pieces are transmitted by using the same security key when the SCG is activated or resumed. The above-proposed methods may be also performed when a message including an indication for resumption or activation of the cell group is received. In addition, the above-proposed methods may be applied to SCG bearers (bearers having a PDCP layer device in the SCG, or SCG terminated bearers).

■ 2> Terminal operation for PUCCH SCell of SCG: When the terminal receives the configuration information or the indicator, the terminal may deactivate a PUCCH SCell of the SCG, and perform a terminal operation of the deactivated SCell. As another method, when the terminal receives the configuration information or the indicator, if a dormant BWP is configured for the PUCCH SCell of the SCG, the terminal may maintain the SCell in an active state, may activate a DL BWP of the SCell as a dormant BWP, and may perform a terminal operation in the dormant BWP, or if a dormant BWP is not configured for the PUCCH SCell of the SCG, the terminal may switch the SCell to an inactive state, and perform a terminal operation in the deactivated cell or BWP. As another method, when the terminal receives the configuration information or the indicator, the terminal may determine switching, activation, or deactivation of a BWP or the state of the SCell according to SCell configuration information or indicator configured in a message including the configuration information or the indicator, and may perform a terminal operation. As another method, when the terminal receives the configuration information or the indicator, the terminal may apply, to the PUCCH SCell, second DRX configuration information configured in the RRC message, and perform a terminal operation in the activated SCell when it is possible to perform PDCCH monitoring, based on a long period.

■ 2> The terminal may transmit, to the MCG or the SCG, an indicator indicating that the cell group (e.g., SCG) or the cell has been suspended, deactivated, released, or modified, and the terminal may transmit, to the SCG (or base station) or the MCG (or base station), the indicator via a physical signal (e.g., HARQ ACK or NACK or new transmission resource), MAC control information, or an RRC message.

■ 2> If the terminal receives an indicator indicating suspension, deactivation, or releasing of the cell group (e.g., SCG) or the cell, the terminal may trigger a PDCP state report in the PDCP layer device and report the same to the base station, for configured SCG bearers, bearers connected to the SCG RLC layer device, SCG split bearers, MCG bearers, or MCG split bearers. This is because the PDCP state report is transmitted so that lost data or the states of window parameters can be identified between the terminal and the base station, whereby synchronization between transmission windows or reception windows can be matched.

The MAC layer device reset procedure (MAC reset) proposed in various embodiments may include the following procedures as terminal operations. For example, when an upper layer device receives an indication to reset a MAC layer device (or receives a request for the indication to reset), the MAC layer device of the terminal may perform the following procedures as terminal operations. However, the MAC layer device partial reset procedure (partial MAC reset) proposed in various embodiments may include one or multiple terminal operations which are some of or changed from the following procedures. For example, when the upper layer device receives an indication to perform partial reset of the MAC layer device (or receives a request for the indication to perform partial reset), the MAC layer device of the terminal may include one or multiple terminal operations which are some of or changed from the following procedures. The MAC layer device reset procedure or the MAC layer device partial reset procedure may be indicated or performed for each cell group (e.g., MCG or SCG). For example, when an RRC message which includes an indicator indicating deactivation of a cell group (or in which the cell group state is configured as a deactivated state) is received, when the previous cell group state is an activated state, or when the terminal is in an RRC-connected mode, some of the following procedures may be performed as the MAC layer device partial reset procedure, or when an RRC message which includes an indicator indication activation of a cell group (or in which the cell group state is configured as an activated state) is received, when the previous cell group state is a deactivated state, or when the terminal is in an RRC-connected mode, the others among the following procedures may be performed as the MAC layer device partial reset procedure.

A Bj value configured for each local channel is reset to 0. The Bj value is a value maintained to be increased by a value obtained by multiplying a prioritized bit rate (PBR) configured via the RRC message by T (time period elapsed after the BJ is lastly increased) for each logical channel whenever before an LCP procedure is performed. The procedure of resetting the Bj value configured for each logical channel to 0 may be performed as one operation of the MAC layer device partial set procedure when the RRC layer device indicates to perform the MAC layer device partial reset procedure when an RRC message which includes an indicator indicating deactivation of a cell group (or in which the cell group state is configured as a deactivated state) is received, the previous state of the cell group is an activated state, or the terminal is in an RRC-connected mode (this is for the Bj value to be increased even when the cell group is in the deactivated state, and thus for the priority of data transmission to be considered). As another method, the procedure of resetting the Bj value configured for each logical channel to 0 may be performed as one operation of the MAC layer device partial reset procedure when the RRC layer device indicates to perform the MAC layer device partial reset procedure when an RRC message which includes an indicator indicating activation of a cell group (or in which the cell group state is configured as an activated state), the previous cell group state is a deactivated state, or the terminal is in an RRC-connected mode (this is for the Bj value to be increased since the cell group is activated, and thus for the priority of data transmission to be more fairly considered).

When there are timers running in the MAC layer device, all the timers may be stopped. The timers may include a data inactivity timer (DataInactivity Timer) which may perform an operation of transition to an RRC idle mode when the timer expires, and may restart whenever data is transmitted or received, a BWP inactivity timer, or a TAT timer related to a cell group (MCG, PCell, SCG, or PSCell), and may be stopped. However, in the above description, when an RRC message which includes an indicator indicating deactivation of a cell group (or in which the cell group state is configured as a deactivated state) is received, the previous cell group state is an activated state, or the terminal is in an RRC-connected mode, when the RRC layer device indicates to perform the MAC layer device partial reset procedure, the procedure (the procedure of stopping all timers if there are the timers running in the MAC layer device) may not be performed, and a procedure of stopping all timers except for the TAT timer related to the cell group (SCG or PSCell) if there are the timers running in the MAC layer device may be performed as one operation of the MAC layer device partial reset procedure. The timer in the MAC layer device partial reset procedure may include a data inactivity timer (DataInactivity Timer) which may perform an operation of transition to an RRC idle mode when the timer expires, and may restart whenever data is transmitted or received, and a BWP inactivity timer, and may be stopped.

It may be considered that all TAT timers have expired. In addition, when the TAT timer expires, a HARQ buffer for all serving cells connected to or configured for the terminal may be flushed, an indication to release a PUCCH resource or SRS resource for the serving cells may be informed to the RRC layer device, or a DL transmission resource (any configured DL assignment) or a UL transmission (any configured UL grants) configured in the MAC layer device may be released. However, in the above description, when an RRC message which includes an indicator indicating deactivation of a cell group (or in which the cell group state is configured as a deactivated state) is received, the previous cell group state is an activated state, or the terminal is in an RRC-connected mode, when the RRC layer device indicates to perform the MAC layer device partial reset procedure, the procedure (considering that all TAT timers have expired) may not be performed, and the procedure of continuously maintaining all TAT timers related to a cell group (SCG or PSCell) may be performed as one operation of the MAC layer device partial reset procedure.

New data indicator (NDI) values for all UL HARQ processing procedures (processes) are set to 0.

If there is a random access procedure in progress, the random access procedure is stopped.

If there is a CFRA transmission resource for a 4-step random access procedure (4-step (RA) type) or 2-step random access procedure (2-step RA type) configured (explicitly signaled) in the RRC message proposed herein, the CFRA transmission resource may be discarded. However, in the above description or previously, when an RRC message which includes an indicator indicating deactivation of a cell group (or in which the cell group state is configured as a deactivated state) is received, the previous cell group state is an activated state, the terminal is in an RRC-connected mode, or a CRFA transmission resource for a 4-step random access procedure (4-step (RA) type) or 2-step random access procedure (2-step RA type) is configured (or included) in the RRC message, when the RRC layer device indicates to perform a MAC layer device partial reset procedure, the procedure (of discarding the CFRA transmission resource) may not be performed, and a procedure of continuously maintaining or storing the CFRA transmission resource may be performed as one operation of the MAC layer device partial reset procedure (or a CRFA random access procedure may be performed, based on the CFRA transmission resource when the cell group is activated). However, in the above description or previously, when an RRC message which includes an indicator indicating deactivation of a cell group (or in which the cell group state is configured as a deactivated state) is received, the previous cell group state is an activated state, the terminal is in an RRC-connected mode, or a CRFA transmission resource for a 4-step random access procedure (4-step (RA) type) or 2-step random access procedure (2-step RA type) is not configured (or included) in the RRC message, when the RRC layer device indicates to perform a MAC layer device partial reset procedure, the procedure (of discarding the CFRA transmission resource) may be performed as one operation of the MAC layer device partial reset procedure. As another method, if there is a CFRA transmission resource for a 4-step random access procedure (4-step (RA) type) or 2-step random access procedure (2-step RA type) configured (explicitly signaled) in the RRC message that is proposed herein, the CFRA transmission resource may be always discarded as one operation of the MAC layer device partial reset procedure.

A message 3 (Msg3) buffer may be flushed.

A message A (MSGA) buffer may be flushed.

If there is a triggered SR procedure, the procedure may be cancelled.

If there is a triggered buffer status report (BSR) procedure, the procedure may be cancelled.

If there is a listen before talk (LBT) procedure, the procedure may be cancelled.

If there is a beam failure recovery (BFR) procedure, the procedure may be cancelled.

If there is a triggered a configured UL transmission resource confirmation (configured UL grant confirmation) procedure, the procedure may be cancelled.

Soft buffers for all DL HARQ processing procedures (processes) may be flushed.

In each HARQ processing procedure (process), for a TB, the next received transmission (or transmission resource) is considered as the first transmission (or transmission resource).

If there is a temporary cell ID (temporary C-RNTI), the temporary cell ID is released.

All beam failure counter parameters (BFI_COUNTER) are reset (e.g., set to a value of 0).

However, in the above description, when an RRC message which includes an indicator indicating deactivation of a cell group (or in which the cell group state is configured to as a deactivated state) is received, the previous cell group state is an activated state, the terminal is in an RRC-connected mode, the RRC message includes configuration information indicating to perform an RLM procedure or a BFD procedure, or the RLM procedure or beam failure detection procedure-related configuration information is configured to continuously perform the RLM procedure or the beam failure detection procedure in a current (or previous) active beam (TCI state) or a current (or previous) active BWP (or the previously used beam or BWP is not configured as (or is not changed to) another new beam or another new BWP), when the RRC layer device indicates to perform a MAC layer device reset procedure, the procedure (of resetting all beam failure counter parameters (BFI_COUNTER)) may not be performed, and a procedure of maintaining or continuously using the beam failure counter parameters (BFI_COUNTER) may be performed as one operation of the MAC layer device partial reset procedure (this is because when the beam or BWP is continuously used, when the reset procedure is performed, beam failure or RLM detection may be delayed due to resetting of a counter parameter value). However, in the above description, when an RRC message which includes an indicator indicating deactivation of a cell group (or in which the cell group state is configured as a deactivated state) is received, the previous cell group state is an activated state, the terminal is in an RRC-connected mode, the RRC message does not include configuration information indicating to perform an RLM procedure or a BFD procedure, or the RRC message includes configuration information indicating to perform an RLM procedure or a BFD procedure, and the RLM procedure or beam failure detection procedure-related configuration information is not configured to continuously perform the RLM procedure or the beam failure detection procedure in a current (or previous) active beam (TCI state) or a current (or previous) active BWP (or the previously used beam or BWP is configured as (or is reconfigured as or is changed to) another new beam or another new BWP), when the RRC layer device indicates to perform a MAC layer device reset procedure, the procedure (of resetting all beam failure counter parameters (BFI_COUNTER)) may be performed as one operation of the MAC layer device partial reset procedure (this is because when the beam or BWP is changed, when the reset procedure is not performed, beam failure or RLM detection may occur too early due to maintaining of a counter parameter value). As another method, all the beam failure counter factors (BFI_COUNTER) may be always reset as one operation of the MAC layer device partial reset procedure.

All LBT counter parameters (LBT_COUNTER) are reset.

The MAC layer device reset procedure (MAC reset) proposed may include one or multiple terminal operations among the following procedures. For example, when an upper layer device receives an indication to perform partial reset of a MAC layer device (or receives a request for the indication of partial reset), the MAC layer device of the terminal may perform the following procedures as terminal operations. A first embodiment of the MAC layer device partial reset is as follows:

The procedure of resetting a Bj value configured for each logical channel to 0 may be performed as one operation of the MAC layer device partial set procedure when the RRC layer device indicates to perform the MAC layer device partial reset procedure when an RRC message which includes an indicator indicating deactivation of a cell group (or PSCell or MAC layer device) (or in which the cell group state is configured as a deactivated state) is received, the previous state of the cell group is an activated state, the cell group (or PSCell or MAC layer device) is deactivated, or the terminal is in an RRC-connected mode (this is for the Bj value to be increased even when the cell group (or PSCell) is in the deactivated state, and thus for the priority of data transmission to be considered). As another method, the procedure of resetting the Bj value configured for each logical channel to 0 may be performed as one operation of the MAC layer device partial reset procedure when the RRC layer device indicates to perform the MAC layer device partial reset procedure when an RRC message which includes an indicator indicating activation of a cell group (or PSCell) (or in which the cell group state is configured as an activated state) is received (or the PSCell is activated), the previous cell group state is a deactivated state, or the terminal is in an RRC-connected mode (this is for the Bj value to be increased since the cell group is activated, and thus for the priority of data transmission to be more fairly considered).

When an RRC message which includes an indicator indicating deactivation of a cell group (or PSCell) (or in which the cell group state is configured as a deactivated state) is received, the previous cell group state is an activated state, the cell group (or PSCell or MAC layer device) is deactivated, or the terminal is in an RRC-connected mode, when the RRC layer device indicates to perform the MAC layer device partial reset procedure and there are timers running in the MAC layer device, not all the timers in operation are stopped, and a procedure of stopping all timers except for the TAT timer related to the cell group (SCG or PSCell) if there are the timers running in the MAC layer device may be performed as one operation of the MAC layer device partial reset procedure. The timer in the MAC layer device partial reset procedure may include a data inactivity timer (DataInactivity Timer) which may perform an operation of transition to an RRC idle mode when the timer expires, and may restart whenever data is transmitted or received, or a BWP inactivity timer, or may be stopped. As another method, when an RRC message which includes an indicator indicating deactivation of a cell (or PSCell) (or in which the cell group state is configured as a deactivated state) is received, the previous cell group state is an activated state, the terminal is in an RRC-connected mode, or the cell group (or PSCell) is deactivated, when the RRC layer device indicates to perform the MAC layer device partial reset procedure, a procedure of stopping all timers except for a TAT timer related to the cell group (SCG or PSCell) or a beam failure detection timer (BeamFailureDetectionTimer) related to the cell group (SCG or PSCell) may be performed as one operation of the MAC layer device partial reset procedure if there are timers running in the MAC layer device. That is, in the above description, if a TAT timer related to the cell group (SCG or PSCell) or a beam failure detection timer (BeamFailureDetectionTimer) related to the cell group (SCG or PSCell) is running, the timer may be continuously operated (or used). That is, the timer stopped in the MAC layer device partial reset procedure may include a data inactivity timer (DataInactivity Timer) which may perform an operation of transition to an RRC idle mode when the timer expires, and may restart whenever data is transmitted or received, or a BWP inactivity timer. The beam failure detection timer (BeamFailureDetectionTimer) related to the cell group (SCG or PSCell) may be stopped when the beam failure detection procedure or the RLM procedure is not configured for the deactivated cell group (SCG or PSCell). That is, when an RRC message which includes an indicator indicating deactivation of the cell group (or PSCell or MAC layer device) (or in which the cell group state is configured as a deactivated state) is received, or the beam failure detection procedure or the RLM procedure is not configured, in the RRC message, to be performed for the deactivated cell group (or PSCell or MAC layer device), the beam failure detection timer (BeamFailureDetectionTimer) related to the cell group (SCG or PSCell) may be stopped. In the above description, stopping the timer is different from resetting the timer. That is, in the present disclosure, the stopped timer may restart according to a procedure of starting or restarting the timer based on a specific condition. However, resetting the timer is resetting a timer value, and resetting the timer in operation may mean restarting since the timer value is reset to 0 and operated. The operation proposed in the discourse above is an operation of stopping the timer.

When an RRC message which includes an indicator indicating deactivation of a cell group (or in which the cell group state is configured as a deactivated state) is received, the previous cell group state is an activated state, or the terminal is in an RRC-connected mode, when the RRC layer device indicates to perform the MAC layer device partial reset procedure, the procedure (of considering that all TAT timers have expired) may not be performed, and the procedure of continuously maintaining all TAT timers related to a cell group (SCG or PSCell) may be performed as one operation of the MAC layer device partial reset procedure.

NDI values for all UL HARQ processing procedures (processes) are set to 0.

If there is a random access procedure in progress, the random access procedure is stopped.

In the above description or previously, when an RRC message which includes an indicator indicating deactivation of a cell group (or in which the cell group state is configured as a deactivated state) is received, the previous cell group state is an activated state, the terminal is in an RRC-connected mode, or a CRFA transmission resource for a 4-step random access procedure (4-step (RA) type) or 2-step random access procedure (2-step RA type) is configured (or included) in the RRC message, when the cell group (or PSCell or MAC layer device) is deactivated, or when the RRC layer device indicates to perform a MAC layer device partial reset procedure, the CFRA transmission resource may not be discarded, and a procedure of continuously maintaining or storing the CFRA transmission resource may be performed as one operation of the MAC layer device partial reset procedure (or a CRFA random access procedure may be performed, based on the CFRA transmission resource when the cell group is activated). However, in the above description or previously, when an RRC message which includes an indicator indicating deactivation of a cell group (or in which the cell group state is configured as a deactivated state) is received, the previous cell group state is an activated state, the terminal is in an RRC-connected mode, or a CRFA transmission resource for a 4-step random access procedure (4-step (RA) type) or 2-step random access procedure (2-step RA type) is not configured (or included) in the RRC message, when the RRC layer device indicates to perform a MAC layer device partial reset procedure, the procedure (of discarding the CFRA transmission resource) may be performed as one operation of the MAC layer device partial reset procedure. As another method, if there is a CFRA transmission resource for a 4-step random access procedure (4-step (RA) type) or 2-step random access procedure (2-step RA type) configured (explicitly signaled) and proposed herein, the CFRA transmission resource may be always discarded as one operation of the MAC layer device partial reset procedure.

A message 3 (Msg3) buffer may be flushed.

A message A (MSGA) buffer may be flushed.

If there is a triggered SR procedure, the procedure may be cancelled.

If there is a triggered BSR procedure, the procedure may be cancelled.

If there is an LBT procedure, the procedure may be cancelled.

If there is a BFR procedure, the procedure may be cancelled.

If there is a triggered a configured UL transmission resource confirmation (configured UL grant confirmation) procedure, the procedure may be cancelled.

Soft buffers for all DL HARQ processing procedures (processes) may be flushed.

In each HARQ processing procedure (process), for a TB, the next received transmission (or transmission resource) is considered as the first transmission (or transmission resource).

If there is a temporary cell ID (temporary C-RNTI), the temporary cell ID is released.

In the above description, when an RRC message which includes an indicator indicating deactivation of a cell group (or in which the cell group state is configured to as a deactivated state) is received, the previous cell group state is an activated state, the terminal is in an RRC-connected mode, the cell group (or PSCell or MAC layer device) is deactivated, the RRC message includes configuration information indicating to perform an RLM procedure or a BFD procedure, or the RLM procedure or beam failure detection procedure-related configuration information is configured to continuously perform the RLM procedure or the beam failure detection procedure in a current (or previous) active beam (TCI state) or a current (or previous) active BWP (or the previously used beam or BWP is not configured as (or is not changed to) another new beam or another new BWP), when the RRC layer device indicates to perform a MAC layer device partial reset procedure, the procedure (of resetting all beam failure counter parameters (BFI_COUNTER)) may not be performed, and a procedure of maintaining or continuously using the beam failure counter parameters (BFI_COUNTER) may be performed as one operation of the MAC layer device partial reset procedure (this is because when the beam or BWP is continuously used, when the reset procedure is performed, beam failure or RLM detection may be delayed due to resetting of a counter parameter value). However, in the above description, when an RRC message which includes an indicator indicating deactivation of a cell group (or in which the cell group state is configured as a deactivated state) is received, the previous cell group state is an activated state, the terminal is in an RRC-connected mode, the RRC message does not include configuration information indicating to perform an RLM procedure or a BFD procedure, or the RRC message includes configuration information indicating to perform an RLM procedure or a BFD procedure, and the RLM procedure or beam failure detection procedure-related configuration information is not configured to continuously perform the RLM procedure or the beam failure detection procedure in a current (or previous) active beam (TCI state) or a current (or previous) active BWP (or the previously used beam or BWP is configured as (or is reconfigured as or is changed to) another new beam or another new BWP), when the RRC layer device indicates to perform a MAC layer device reset procedure, the procedure (of resetting all beam failure counter parameters (BFI_COUNTER)) may be performed as one operation of the MAC layer device partial reset procedure (this is because when the beam or BWP is changed, when the reset procedure is not performed, beam failure or RLM detection may occur too early due to maintaining of a counter parameter value). As another method, all the beam failure counter factors (BFI_COUNTER) may be always reset as one operation of the MAC layer device partial reset procedure. As another method, when an RRC message which includes an indicator indicating deactivation of a cell group (or in which the cell group state is configured as a deactivated state) is received, the previous cell group state is an activated state, the terminal is in an RRC-connected mode, the cell group (or PSCell or MAC layer device) is deactivated, the RRC message includes configuration information indicating to perform an RLM procedure or a BFD procedure, or the RRC message includes configuration information indicating to perform an RLM procedure or a BFD procedure, and the RLM procedure or beam failure detection procedure-related configuration information is configured to continuously perform the RLM procedure or the beam failure detection procedure in a current (or previous) active beam (TCI state) or a current (or previous) active BWP (or the previously used beam or BWP is not configured as (or is not changed to) another new beam or another new BWP), when the RRC layer device indicates to perform a MAC layer device reset procedure, a procedure of not resetting a beam failure counter parameter (BFI_COUNTER) for the cell group (or PSCell or serving cell for which the beam failure detection procedure is configured) (or a procedure of excluding the beam failure counter parameter (BFI_COUNTER) for the cell group (PSCell)) or a procedure of resetting other beam failure counter parameters (BFI_COUNTER) (or beam failure counter parameters for other cells (e.g., SCell or serving cell) except for the PSCell or a cell (serving cell) for which the beam failure detection procedure is not configured) may be performed as one operation of the MAC layer device partial reset procedure (this is because when the beam or BWP is continuously used, when the reset procedure is not performed, beam failure or RLM detection may be delayed due to resetting of a counter parameter value). However, in the above description, when an RRC message which includes an indicator indicating deactivation of a cell group (or in which the cell group state is configured as a deactivated state) is received, the previous cell group state is an activated state, the terminal is in an RRC-connected mode, the RRC message does not include configuration information indicating to perform an RLM procedure or a BFD procedure, or the RRC message includes configuration information indicating to perform an RLM procedure or a BFD procedure, and the RLM procedure or beam failure detection procedure-related configuration information is not configured to continuously perform the RLM procedure or the beam failure detection procedure in a current (or previous) active beam (TCI state) or a current (or previous) active BWP (or the previously used beam or BWP is configured as (or is reconfigured as or is changed to) another new beam or another new BWP), when the RRC layer device indicates to perform a MAC layer device reset procedure, the procedure (of resetting all beam failure counter parameters (BFI_COUNTER)) may be performed as one operation of the MAC layer device partial reset procedure (this is because when the beam or BWP is changed, when the reset procedure is not performed, beam failure or RLM detection may occur too early due to maintaining of a counter parameter value). In the above description, all beam failure count parameters may mean beam failure count parameter related to the PScell, SCell, or serving cell.

All LBT counter parameters (LBT_COUNTER) are reset.

When the MAC layer device reset procedure is performed, or when the MAC layer device partial reset procedure indicator is not included, indicated, or performed, the terminal may perform the entire MAC layer device reset procedure, and accordingly, the terminal may flush all of a configured normal HARQ process, an MBS HARQ process, and a system information HARQ process.

Hereinafter, as proposed above, MAC layer device procedures to be performed by a terminal in which DC technology is configured when a cell group (or SCG) is configured as a deactivated state, a beam failure detection procedure is configured, or an RLM procedure is configured, for the terminal via an RRC message, are proposed. For example, performing different beam failure detection procedures or beam failure recovery procedures by the terminal according to whether the cell group state configured in the RRC message is a deactivated state or an activated state is proposed.

1> If the terminal has received an RRC message and a beam failure detection procedure, a first BFR procedure, or a second BRF procedure is configured in the RRC message, or if a cell (PSCell or SCell) or cell group in which the beam failure detection procedure is configured is not configured as a deactivated state (or is configured as an activated state), ■ 2> the terminal performs the beam failure detection procedure.

■ 2> if beam failure for the cell (PSCell or SCell) or cell group is detected,

♦ 3> the first BFR procedure or the second BRF procedure is performed.

■ 2> if a random access procedure problem due to beam failure is detected,

♦ 3> the terminal reports the random access procedure problem due to beam failure to the base station.

1> Otherwise (if the terminal has received an RRC message and a beam failure detection procedure, a first BFR procedure, or a second BRF procedure is configured in the RRC message, if a cell (PSCell or SCell) or cell group (or SCG) in which the beam failure detection procedure is configured is configured as a deactivated state and the beam failure detection procedure, the first BFR procedure, or the second BFR procedure is configured in the cell group, or if a cell or cell group in which the beam failure detection procedure is configured is configured as a deactivated state, ■ 2> the terminal performs the beam failure detection procedure.

■ 2> if beam failure for the cell (PSCell) or cell group (SCG) is detected from, ♦ 3> the first BFR procedure or the second BRF procedure is not performed. This is because an unnecessary random access procedure may be triggered for the deactivated cell group. The MAC layer device may indicate or report, to an upper layer device (or RRC layer device), that the beam failure has been detected.

■ 2> if beam failure for the deactivated cell (PSCell or SCell), cell group, or MAC layer device is detected, ♦ 3> the terminal reports the beam failure to the base station (or MCG). For example, the terminal may transmit and report the beam failure to the base station by including the same in an SCG failure report message (SCGFailureInformation).

■ 2> if a random access procedure problem due to beam failure is detected,

♦ 3> the terminal reports the random access procedure problem due to beam failure to the base station.

Disclosed above is a detailed procedure of the beam failure detection procedure of the MAC layer device of the terminal, when a beam failure detection procedure is configured in the RRC message.

1> If an indication indicating that beam failure has occurred is received from a lower layer device, ■ 2> a beam failure detection timer (BeamFailureDetectionTimer) may start or restart (the timer may be configured via the RRC message).

■ 2> a parameter (BFI_COUNTER) value for counting the number of times of beam failure is increased by 1.

■ 2> if the parameter value for counting the number of times of beam failure is equal to or greater than a beam failure maximum count (beamFailureInstanceMaxCount) (wherein, the beam failure maximum count may be configured via the RRC message), ♦ 3> if the serving cell (the cell in which the beam failure has occurred) is an SCell, ● 4> a BFR procedure may be triggered or performed for the cell.

♦ 3> otherwise (if the serving cell (the cell in which the beam failure has occurred) is a PSCell, or if the cell group (or PSCell) is deactivated (or is not activated or is in a deactivated state) (that is, the next procedure is a procedure applicable only to a PSCell (a procedure not applicable to a PCell)), ● 4> the beam failure for the cell may be indicated to an upper layer device (e.g., RRC layer device).

● 4> it may be considered that a TAT timer corresponding (or related) to the cell group, the PSCell, or a primary timing advance group (PTAG) has expired. Alternatively, a TAT timer related to the cell group, the PSCell, or the PTAG may be stopped. This is because the TAT timer does not need to be necessarily operated since it may be determined that a TA value is no longer valid when the beam failure has occurred for the deactivated cell group or cell. Alternatively, an RLM procedure may be also stopped, or RLF may be declared. This is because it may be considered that a radio link is no longer valid when the beam failure has occurred for the deactivated cell group or cell.

♦ 3> otherwise (if the serving cell (the cell in which the beam failure has occurred) is an SPCell (PCell or PSCell), or if the cell group (or SPCell (PCell or PSCell)) is not deactivated (or is activated or is in an activated state) (that is, the next procedure is a procedure applicable only to each of the PCell and the PSCell), ● 4> a random access procedure may be started or performed for the SPCell.

1> If a beam failure detection timer has expired,

1> Or if a beam failure detection timer, a beam failure detection count, or an RS, which is used for beam failure detection connected to (or configured in) the cell (or cell group), is reconfigured by an upper layer device (RRC layer device), if an RRC message which includes an indicator indicating deactivation of the cell group (or in which the cell group state is configured as a deactivated state) is received, if the previous cell group state is an activated state, if the terminal is in an RRC-connected mode, if configuration information indicating to perform an RLM procedure or a BFD procedure is included in the RRC message, of if an RLM procedure or a BFD procedure is included in the RRC message and the RLM procedure or beam failure detection procedure-related configuration information is not configured to continuously perform the RLM procedure or the beam failure detection procedure in a current (or previous) active beam (TCI state) or a current (or previous) active BWP (or if the previously used beam or BWP is configured as (or is changed to) another new beam or another new BWP), ■ 2> beam failure counter parameters (BFI_COUBTER) may be reset (or set to a value of 0).

A BFR procedure proposed in an embodiment is as follows:

A first BFR procedure (e.g., Rel-15 BFR) according to various embodiments is only possible for a PCell or an SPCell. That is, when beam failure occurs in a terminal in a connected mode, a random access procedure is performed. The random access procedure varies according to whether a preamble for BFR is configured in the RRC message. The preamble may be configured for each beam. In addition, when the preamble for BFR is configured, a search space for BFR is also configured. As described above, when the preamble for BFR is configured, CFRA is performed. That is, when failure occurs in beam 1, a beam is searched for, when the beam is determined as valid in beam 3, whether a preamble for BFR is configured in beam 3 is identified, and if configured, CFRA is performed by using the preamble. The terminal waits for a response and monitors a PDCCH the configured search space. When the terminal performs random access in the preamble, the base station identifies that there is beam failure and provides scheduling (DL assignment or UL grant) to the terminal through the PDCCH. Then, the terminal continuously transmits or receives data in the corresponding beam, and the beam is recovered (in the CFRA, the base station exactly identifies the beam failure, and thus an RAR for TA reconfiguration does not need to be transmitted).

If there is no preamble for BFR is configured in the RRC message, CBRA is performed. That is, when failure occurs in beam 1, a beam is searched for, when the beam is determined as valid in beam 3, whether a preamble for BFR is configured in beam 3 is identified, and if not configured, CBRA is performed. The terminal waits for a response and an RAR. The base station provides the RAR without knowing the reason why the terminal suddenly performs random access, and the random access procedure ends. Then, terminal performs PDCCH indication and data transmission or reception in the beam, and the beam is recovered.

The first BFR procedure (e.g., Rel-15 BFR) or BeamFailureRecoveryConfig for the SPCell is configured in a UL BWP. This is because when BFR is triggered, the UL BWP may configure a BFR dedicated preamble.

A second BFR procedure (Rel-16 BFR procedure) of the disclosure is possible for not only an SPCell but also an SCell. A dedicated SR (or a PUCCH transmission resource) for BFR may be configured for each cell or BWP through the RRC message. If beam failure occurs for a BWP of an SCell, a BFR MAC CE is generated. If beam failure occurs for the BWP and the dedicated SR is configured (PCell or PUCCH SR), the SR is transmitted via a PUCCH. When the dedicated SR continuously fails to perform beam failure reporting, a CBRA random access procedure is performed. When an SR count exceeds, only CBRA may be performed even when BSR is transmitted also in the legacy. The random access procedure is performed in a PCell. Accordingly, when a MAC CE is transmitted through the PCell for the SCell, when the terminal has identified an SCell in which the failure occurs and a valid beam among RRC-configured TCI sets (or TCI states), the terminal may optionally report the valid beam for each SCell. When the terminal perform transmission by including the valid beam and the MAC CE for the SCell, when a HARQ-ACK is received for a MAC PDU including the MAC CE is received, the terminal and the base station use the valid beam for the SCell. If the MAC CE does not include the MAC CE for the SCell, the base station may designate a beam via DCI OF PDCCH or the TCI state MAC CE, as a response.

In addition, in the second BFR procedure (Rel-16 BFR procedure), a BFR procedure for an SPCell may be also enhanced.

For example, the second BFR procedure (Rel-16 BFR procedure) is possible for a PCell or an SPCell like in Rel-15. That is, when beam failure occurs, a random access procedure is performed. The random access procedure varies according to whether a preamble for BFR is configured. The preamble may be configured for each beam. When the preamble for BFR is configured, a search space for BFR is also configured. As described above, when the preamble for BFR is configured, CFRA is performed by using the preamble. That is, when failure occurs in beam 1, a beam is searched for, when the beam is determined as valid in beam 3, whether a preamble for BFR is configured in beam 3 is identified, and if configured, CFRA is performed. The terminal waits for a beam response, and monitors a PDCCH in the configured search space. When the terminal performs random access in the preamble, the base station identifies that there is beam failure and provides scheduling (DL assignment or UL grant) to the terminal through the PDCCH. Then, the terminal continuously transmits or receives data in the corresponding beam, and the beam is recovered (in the CFRA, the base station exactly identifies the beam failure, and thus an RAR for TA reconfiguration does not need to be transmitted).

If there is no preamble for BFR is configured in the RRC message, CBRA is performed. That is, when failure occurs in beam 1, a beam is searched for, when the beam is determined as valid in beam 3, whether a preamble for BFR is configured in beam 3 is identified, and if not configured, CBRA is performed. The terminal waits for a response and an RAR. The base station provides the RAR without knowing the reason why the terminal suddenly performs random access, and the terminal receives the RAR, generates a BFR MAC CE, and transmit the same in Msg3. However, the MAC CE cannot include a valid beam for the SPCell. This is because for BFR occurring in the PCell, the PCell transmits the BRF MAC CE, unlike the SCell.

That is, when beam failure occurs in the PCell, the terminal searches for a valid beam and transmits a preamble for the valid beam, and thus the base station and the terminal already identify the valid beam for the PCell in the random access procedure. That is, the valid beam is already included. Accordingly, once the random access procedure is completed, the terminal performs data transmission or reception in beam 3, and the beam is recovered.

That is, when BFR is triggered for the Rel-16 SPCell, random access is unconditionally triggered without the SR, and a BFR MAC CE is configured (if a preamble for BFR is not configured) and transmitted. In addition, Rel-16 BFR or BeamFailureRecoverySCellConfig in the RRC message for the SCell is configured in a DL BWP. This is to configure a candidate RS which can be included in the BFR MAC CE is configured when BFR is triggered. The dedicated SR for SCell BFR is included in MAC-CellGroupConfig in the RRC message. The dedicated SR for SCell BFR is configured in schedulingRequestConfig.

In addition, the base station may configure a beam failure RS for the terminal via the RRC message so that the terminal can identify beam failure. When the RS all fails, the terminals detect beam failure and performs a random access procedure.

When the base station configures a preamble for beam failure recovery in advance, the CFRA random access procedure is performed, and the base station may identify whether the terminal performs the random access procedure for beam recovery by identifying the preamble.

However, when the base station does not configure a preamble for beam failure recovery in advance, the terminal performs CBRA. The base station does not distinguish between a case where BSR is triggered for UL data transmission in the state the SR is not configured and a case where a random access procedure is triggered. However, the terminal may determine one of the two cases by identifying that the terminal suddenly performs the random access procedure, receive BSR information if there is BSR, recognize BFR if there is no BSR, read the BSR even when two cases simultaneously occur, and make implicit determination by identifying the preamble. When the terminal identifies an SSB, the terminal may know the number of beams, a beam to be transmitted, and a beam transmission cycle and time/frequency resource. The terminal may measure the strength of a beam, and perform a random access procedure for a beam exceeding a predetermined reference. When a beam is selected, the terminal may perform a random access for the beam in consideration of the time/frequency resource or cycle.

Hereinafter, procedures to be performed by the terminal when the cell group state of the terminal is configured as an activated state or a deactivated state or when the state of a PSCell of a cell group is configured as an activated state or a deactivated state are proposed. In the above description, for a cell group or cell (PSCell), the terminal may receive an indication for the activated state or the deactivated state via an RRC message (RRCReconfiguration or RRCResume), MAC control information, or DCI OF PDCCH. For example, when the deactivated state is configured via the RRC message (RRCReconfiguration or RRCResume), MAC control information, or DCI OF PDCCH, the cell group (or SCG) or cell (or PSCell) may be deactivated, and when the deactivated state is not configured (or the activated state is configured) via the RRC message (RRCReconfiguration or RRCResume), MAC control information, or DCI OF PDCCH, the cell group or cell may be activated.

When the terminal receives an indication indicating activation of a cell group or a cell (for when the terminal does not receive an indication indicating deactivation), when the previous cell group state is a deactivated state, or when the terminal is in an RRC-connected mode, the terminal may perform the following operations:

If an indication indicating activation of a cell group (or SCG) or a cell (or PSCell) of the terminal is received through DCI OF PDCCH (L1 control signal), a MAC CE, or an RRC message (or if an indication indicating deactivation is not received), if the previous cell group state is a deactivated state, or if the terminal is in an RRC-connected mode, one or multiple of the following operations may be performed:
　　■ The cell group or cell is activated.
　　■ Switching to or activation as a UL BWP or a DL BWP configured via the RRC message (e.g., the first active DL BWP or the first active UL BWP) is performed. As another method, if a random access procedure is performed (or if reconfigurationWith-Sync is configured, if beam failure is detected, if RLF is detected, or if a TAT timer is not running (or has expired)) so that the cell group or the cell is to be activated, switching to or activation as the UL BWP or the DL BWP configured via the RRC message (e.g., the first active DL BWP, the first active UL BWP, or a newly defined BWP) may be performed. In addition, if a random access procedure is performed, the random access procedure may be performed in the BWP. However, if the random access procedure is not performed (or if it is configured that the random access procedure is not to be performed, if beam failure is not detected, if RLF is not detected, or if the TAT timer is running (or has not expired)), the terminal may activate the lastly (previously) activated BWP.

■ To allow the base station to perform channel measurement for a UL in the activated BWP, an SRS is transmitted. For example, the SRS may be periodically transmitted.

■ A PUCCH is configured in the activated BWP, PUCCH transmission is performed.

■ When there is a type-1 configuration transmission resource which is not in use, a stored type-1 transmission resource may be reset to the original configuration and used. The type-1 configuration transmission resource is a periodic transmission resource (UL or DL) pre-allocated via an RRC message, and means a transmission resource which is activated by the RRC message and may be used.

■ A PHR is triggered for the BWP. The PHR may be triggered for the MCG or the SCG. In addition, the PHR may be reported to the MCG or the SCG.

■ In the activated BWP, the terminal may report a channel measurement result (CSI, COI, PMI, RI, PTI, CRI, or the like) for the DL according to a base station configuration.

■ In the activated BWP, the terminal monitors a PDCCH to identify (acquire) an indication of the base station.

■ In the activated BWP, the terminal monitors a PDCCH to identify (acquire) cross scheduling.

■ In the above description, a BWP inactivity timer starts or restarts. As another method, only when a BWP hibernation timer is not configured, the BWP inactivity timer may start or restart. When the BWP hibernation timer may be configured via the RRC message, the BWP may be switched to a dormancy or dormant BWP when the timer expires. For example, the BWP inactivity timer may be configured to start or restart only for the dormant BWP.

A terminal operation when an indication indicating deactivation of a cell group or a cell is received is as follows:
　If an indication indicating deactivation of a cell group (or SCG) or a cell (or PSCell) of the terminal is received through DCI OF PDCCH (L1 control signal), a MAC CE, or an RRC message, if the previous cell group state is an activated state, or if the terminal is in an RRC-connected mode, one or multiple of the following operations may be performed.
　　■ The cell group, the cell, or the above-indicated UL or DL BWP is deactivated.
　　■ A TAT timer (e.g., TA timer connected to (or configured with) primary timing advance group (PTAG) or secondary timing advance group (STAG)) related to the cell (PSCell) or cell group may not be stopped and continuously maintained so that the terminal can promptly activate the cell or cell group without a random access procedure when re-activating the cell or cell group. If a TAT timer related to the cell group expires in the deactivated cell or cell group, a MAC layer device may indicate to an upper layer device (e.g., RRC layer device) that the TAT has expired. Alternatively, if a TAT timer related to the cell group expires in the deactivated cell or cell group, the terminal may suspend a beam failure detection procedure or an RLM procedure (or consider that beam failure has occurred or consider that a radio link is not valid). As another method, when the terminal has detected beam failure, the terminal may stop the TAT timer related to the cell group (or consider that the TAT timer has expired) or suspend the RLM procedure. As another method, when the terminal has detected RLF, the terminal may stop the TAT timer related to the cell group (or consider that the TAT timer has expired) or suspend the beam failure detection procedure (or consider that beam failure has occurred).

■ The terminal stops a BWP inactivity timer (e.g., inactivity timer for a DL BWP) which is configured and running in the cell or BWP.

■ The terminal may clear a periodic DL transmission resource (DL SPS or configured DL assignment) or a period UL transmission resource (UL SPS or configured UL grant type 2) configured in the cell or BWP. The clearing means that configuration information such as periodic information configured via the RRC message is stored in the terminal, but periodic transmission resource information indicated or activated via L1 signaling (e.g., DCI) is cleared and no longer used. The periodic transmission resource may be called a type-2 configuration transmission resource. In addition, the clearing of the periodic transmission resource may be performed only when the SCell is transitioned from an activated state to a deactivated state. This is because when the SCell is transitioned from a dormant state to a deactivated state, there is no periodic transmission resource in the dormant state, and thus the clearing operation is not required. As another method, only when the periodic DL transmission resource or the periodic UL transmission resource is configured or is configured to be used, the periodic transmission resources may be cleared.

■ The periodic UL transmission resource configured in the cell or BWP (configured UL grant Type 1 configured via RRC) may be suspended. In the above description, suspending means that transmission resource configuration information configured via the RRC message is stored in the terminal, but is no longer used. The periodic transmission resource may be called a type-1 configuration transmission resource. In addition, the suspending of the periodic transmission resource may be performed only when the SCell is transitioned from an activated state to a deactivated state. This is because when the SCell is transitioned from a dormant state to a deactivated state, there is no periodic transmission resource in the dormant state, and thus the suspending operation is not required. As another method, only when the periodic DL transmission resource or the periodic UL transmission resource is configured or is configured to be used, the periodic transmission resources may be suspended.

■ All HARQ buffers configured for the cell or BWP are flushed.

■ If there is a PUSCH transmission resource configured for periodic channel measurement reporting (semi-persistent CSI reporting) for the cell or BWP, the PUSCH transmission resource is cleared.

■ The terminal does not transmit an SRS for the cell or BWP.

■ For the cell or BWP, the terminal neither performs nor reports DL channel measurement (CSI, CQI, PMI, RI, PTI, CRI, or the like).

■ In the cell or BWP, UL data is not transmitted via UL-SCH.

■ A random access procedure is not performed for the cell or BWP.

■ The terminal does not perform PDCCH monitoring in the cell or BWP.

■ The terminal does not perform PDCCH monitoring for the cell or BWP. In addition, even in a case of cross scheduling, the terminal does not perform PDCCH monitoring for the cell in the scheduled cell.

■ The terminal does not perform PUCCH or shortened PUCCH (SPUCCH) transmission in the cell or BWP.

The first PDCP suspension (or resumption) procedure proposed herein may include one or multiple terminal operations among the following procedures. The above-proposed procedure may be applied to or configured for a bearer using an RLC UM mode or a bearer using an RLC AM mode, or the terminal may perform the proposed procedure for a bearer using an RLC UM mode or a bearer using an RLC AM mode.

A transmission PDCP layer device of the terminal may reset a transmission window parameter, set the same to an initial value, or discard stored data (e.g., PDCP PDU or PDCP SDU). As another method, to prevent data loss above, only a PDCP PDU may be discarded. This is a procedure for preventing old data from being transmitted or retransmitted when an SCG is activated or resumed later.

If a reordering timer (t-reordering) (timer for ordering data in ascending order, based on a PDCP serial number or a COUNT value) is running, a reception PDCP layer device of the terminal may stop or reset the reordering timer. Alternatively, the reception PDCP layer device may perform a header compression release procedure for stored data (e.g., PDCP SDU), and transfer the data to an upper layer device in ascending order of a COUNT value. The reception PDCP layer device of the terminal may reset a reception window parameter, or set the same to an initial value.

The second PDCP suspension (or resumption) procedure proposed herein may include one or multiple terminal operations among the following procedures. The above-proposed procedure may be applied to or configured for a bearer using an RLC UM mode or a bearer using an RLC AM mode, or the terminal may perform the proposed procedure for a bearer using an RLC UM mode or a bearer using an RLC AM mode.

A transmission PDCP layer device of the terminal may not reset a transmission window parameter, or may not set the same to an initial value and maintain a parameter value as it is. The reason why the transmission PDCP layer device maintains the parameter value (e.g., COUNT value) is to solve a problem of a security issue, which occurs when different data pieces are transmitted by using the same security key (e.g., COUNT value) when an SCG is activated or resumed. The transmission PDCP layer device of the terminal may discard stored data (e.g., PDCP PDU or PDCP SDU). As another method, to prevent data loss above, only a PDCP PDU may be discarded. This procedure prevents old data from being transmitted or retransmitted when an SCG is activated or resumed later. As another method, the transmission PDCP layer device may store values of transmission window parameters, and reset the window parameters (e.g., set to 0). When a cell group is resumed or activated, if security configuration information is changed, if a message indicating cell group resumption or activation includes security configuration information, or if a security key change is indicated, the reset window parameters may be used, or when the cell group is resumed or activated, if the security configuration information is not changed, if the message indicating cell group resumption or activation does not include the security configuration information, or if the security key change is not indicated, the stored values of the transmission window parameters may be recovered, or values of the transmission window parameters may be configured, reconfigured, or reset by using the stored values of the transmission window parameters, and used.

If a reordering timer (t-reordering) (timer for ordering data in ascending order, based on a PDCP serial number or a COUNT value) is running, a reception PDCP layer device of the terminal may stop or reset the reordering timer. Alternatively, the reception PDCP layer device may perform a header compression release procedure for stored data (e.g., PDCP SDU), and transfer the data to an upper layer device in ascending order of a COUNT value. The reception PDCP layer device of the terminal may not reset a reception window parameter, or may not set the same to an initial value and maintain a parameter value as it is. The reason why the reception PDCP layer device maintains the parameter value (e.g., COUNT value) is to solve a problem of a security issue, which occurs when different data pieces are transmitted by using the same security key (e.g., COUNT value) when an SCG is activated or resumed. As another method, to prevent the reordering timer from being triggered even when there is no COUNT value or a PDCP serial number gap when an SCG is activated or resumed and data is received, the terminal may configure or update an RX_NEXT window parameter (parameter indicating a COUNT value of a data expected to be received next) by using a value of an RX_DELIV window parameter (parameter indicating a COUNT value corresponding to next data of data transferred to a UL layer device) or a COUNT value of data initially received by the terminal. As another method, when a reordering timer value is configured in the message or an indicator is received from an upper layer device, the terminal may configure or update an RX_REORD window parameter (parameter indicating a COUNT value of next data of data having triggered the reordering timer) by using a value of an RX_NEXT window parameter, or stop or restart the reordering timer. As another method, the reception PDCP layer device may store values of reception window parameters, and reset the window parameters (e.g., set to 0). When a cell group is resumed or activated, if security configuration information is changed, if a message indicating cell group resumption or activation includes security configuration information, or if a security key change is indicated, the reset window parameters may be used, or when the cell group is resumed or activated, if the security configuration information is not changed, if the message indicating cell group resumption or activation does not include the security configuration information, or if the security key change is not indicated, the stored values of the reception window parameters may be recovered again, or values of the reception window parameters may be configured, reconfigured, or reset by using the stored values of the reception window parameters, and used.

In the above description, when the terminal receives, (via DCI OF PDCCH, MAC control information, or an RRC message), configuration information or an indicator for releasing, deactivating, reconfiguring, or suspending DC technology, a cell group (e.g., SCG), or a cell, and performs the above-proposed terminal operation, if data to be transmitted via a UL by the terminal occurs or is generated, the terminal may transmit an SR or MAC control information (or report an indicator, the amount of buffer, and the state of buffer) from a PUCCH transmission resource configured via the RRC message, to a master base station or a secondary base station to request a UL transmission resource, or may request to configure, add, activate, resume, change, or reconfigure the DC technology, the cell group (e.g., SCG), or the cell. As another method, when the terminal receives, (via DCI OF PDCCH, MAC control information, or an RRC message), configuration information or an indicator for releasing, deactivating, reconfiguring, or suspending DC technology, a cell group (e.g., SCG), or a cell, and performs the above-proposed terminal operation, if data to be transmitted via a UL by the terminal occurs or is generated, the terminal may generate an RRC message, transmit the same to a master base station or a secondary base station to request a UL transmission resource, or may request to configure, add, activate, resume, change, or reconfigure the DC technology, the cell group (e.g., SCG), or the cell.

The procedures proposed above may be extended to multi-connectivity technology. For example, configuration information of multiple cell groups may be configured for the terminal via an RRC message, one or multiple of the multiple configured cell groups may be activated or resumed via a PDCCH indicator, MAC control information, or an RRC message, or one or multiple cell groups may be suspended or deactivated.

Hereinafter, proposed is a terminal operation for re-activating or resuming a cell group or a cell when an SCG or a PSCell of an SCG is in a deactivated cell or a suspended state by the cell group or cell deactivation or suspension procedure proposed above, when UL data for the SCG (or in bearers belonging to the SCG) is generated or occurs in the terminal.

As disclosed above, if the cell group or cell is deactivated or suspended, the terminal cannot transmit or receive data, and thus the cell group or the cell needs to be activated again and resumed if UL data is generated in the SCG (or in the bearers belonging to the SCG) of the terminal. The procedure of requesting to reactivate or resume the cell group or the cell from the base station (master base station or secondary base station) by the terminal may be performed by using one of the following methods, or an extended method through a combination and application of the following methods:

First method: The terminal configures a message (e.g., RRC message) for requesting to reactivate or resume the SCG or the cell, and transmits the same to the master base station. When receiving the message, the master base station may, as in the first signaling procedure in FIG. 11, request a resumption procedure from the secondary base station, receive a response, configure a message (e.g., RRC message) indicating reactivation or resumption of the SCG, and transmit the same to the terminal. As another method, as in the second signaling procedure of FIG. 12, the master base station may configure a message (e.g., RRC message) indicating reactivation or resumption of the SCG, transmit the same to the terminal, and then indicate activation or resumption to the secondary base station. As another method, as in the third signaling procedure of FIG. 13, the terminal may configure a message (e.g., RRC message) requesting to reactivate or resume the SCG or the cell, and transmit the same to the secondary base station through SRB3, and the secondary base station may configure a message (e.g., RRC message) indicating reactivation or resumption of the SCG, transmit the same to the terminal, and then indicate activation or resumption to the master base station.

Second method: The terminal configures a message (e.g., MAC control information) for requesting to reactivate or resume the SCG or the cell, and transmits the same to the master base station. When receiving the message, the master base station may, as in the first signaling procedure in FIG. 11, request a resumption procedure from the secondary base station, receive a response, configure a message (e.g., RRC message or MAC control information) indicating reactivation or resumption of the SCG, and transmit the same to the terminal. As another method, as in the second signaling procedure of FIG. 12, the master base station may configure a message (e.g., RRC message or MAC control information) indicating reactivation or resumption of the SCG, transmit the same to the terminal, and then indicate activation or resumption to the secondary base station. As another method, as in the third signaling procedure of FIG. 13, the terminal may configure a message (e.g., MAC control information) requesting to reactivate or resume the SCG or the cell, and transmit the same to the secondary base station through SRB3, and the secondary base station may configure a message (e.g., RRC message or MAC control information) indicating reactivation or resumption of the SCG, transmit the same to the terminal, and then indicate activation or resumption to the master base station. When cell group activation or resumption is requested or indicated via MAC control information, the MAC control information may be newly defined and designed, and as another method, from the existing MAC control information (e.g., buffer state report), a new field (or indicator) may be defined or a new value (field value or ID value) may be defined to be indicated.

Third method: The terminal configures a message (e.g., physical signal of a PHY layer device) for requesting to reactivate or resume the SCG or the cell, and transmits the same to the master base station. When receiving the message, the master base station may, as in the first signaling procedure in FIG. 11 proposed herein, request a resumption procedure from the secondary base station, receive a response, configure a message (e.g., RRC message or physical signal of a PHY layer device) indicating reactivation or resumption of the SCG, and transmit the same to the terminal. As another method, as in the second signaling procedure of FIG. 12, the master base station may configure a message (e.g., RRC message or physical signal of a PHY layer device) indicating reactivation or resumption of the SCG, transmit the same to the terminal, and then indicate activation or resumption to the secondary base station. As another method, as in the third signaling procedure of FIG. 13, the terminal may configure a message (e.g., physical signal of a PHY layer device) requesting to reactivate or resume the SCG or the cell, and transmit the same to the secondary base station through SRB3, and the secondary base station may configure a message (e.g., RRC message or physical signal of a PHY layer device) indicating reactivation or resumption of the SCG, transmit the same to the terminal, and then indicate activation or resumption to the master base station. When the cell group activation or resumption is requested or indicated by using a physical signal of the PHY layer device, the physical signal of the PHY layer device may be defined and designed as a new transmission resource (e.g., a new SR transmission resource for the SCG (e.g., PUCCH transmission resource for a PCell or a PSCell) or a new field of DCI OF PDCCH (PDCCH transmission resource transmitted from the PSCell or the PCell)), and as another method, from the existing physical signal of the PHY layer device (e.g., an SR transmission resource (e.g., PUCCH transmission resource of the PCell or the PSCell) or DCI OF PDCCH field (PDCCH transmission resource transmitted from the PSCell or the PCell)), a new field (or indicator) may be defined, or a new value (field value or ID value) may be defined and indicated. As another method, when the terminal applies second DRX configuration information, has a long cycle, and performs PDCCH monitoring for the PSCell of the SCG, or the SCG of the terminal is in a deactivated state or a suspended state, if a random access procedure is triggered in the PSCell for the terminal via DCI OF PDCCH, the terminal may interpret the indication as SCG activation or resumption. The physical transmission resource may mean a transmission resource for random access, and the terminal may perform a random access procedure when UL data for the SCG occurs while the SCG is in the suspended or deactivated state. As another method, when UL data for the SCG occurs while the SCG is in the suspended or deactivated state, if an SR transmission resource is configured (or if a TA timer is running), the SR transmission resource may be transmitted to the MCG or the SCG, and if the SR transmission resource is not configured (or if the TA timer has expired), the random access procedure may be performed. In the above description, as the random access procedure, a CBRA procedure may be performed. As another method, if dedicated random access configuration information (dedicated RACH config or dedicated preamble) is configured (or included) in a message (or previously received message) indicating suspension or deactivation of the cell group, a CFRA procedure may be performed, or if the dedicated random access configuration information (dedicated RACH config or dedicated preamble) is not configured (or included) in a message (or previously received message) indicating suspension or deactivation of the cell group, a CBRA procedure may be performed. In the above description, an indicator (e.g., buffer state report (MAC control information (MAC CE))) indicating that UL data has occurred during the random access procedure or after the completion of the random access procedure may be included and indicated to the base station, and when the indicator is received or the random access procedure is completed, the base station (e.g., secondary base station or master base station) may transmit, to the terminal, a message indicating resumption or activation of the SCG to the terminal, resume or activate the SCG, and perform data transmission or reception again.

As disclosed above, when the terminal activates or resumes a cell group (e.g., SCG) or a cell (e.g., PSCell) by an indicator of a PDCCH, MAC control information, or an RRC message, the terminal may complete the activation or resumption of the cell group or cell at a first time point. The first time point may be configured via the RRC message as disclosed above. For example, the RRC message may include time information (e.g., information (e.g., X) indicating a timing, time unit, subframe, time slot, or symbol unit) indicating when to activate, resume, deactivate, or suspend DC technology, a cell group (e.g., SCG), or a cell (PSCell or SCG SCell).

For example, when receiving the PDCCH, the MAC control information, or the RRC message indicating activation, resumption, deactivation, or suspension of the cell group (e.g., SCG) or the cell (e.g., PSCell) in an $n^{th}$ time unit, time information indicating activation, resumption, deactivation, or suspension of the cell group or the cell may be configured in the n+$X^{th}$ cell. As another method, the time information (e.g., X) is not configured by the base station, but is appointed and defined in advance, and may be used a fixed value. In another example, when random access is started (preamble is transmitted) or random access is successfully completed in an $n^{th}$ time unit after a PDCCH, MAC control information, or an RRC message indicating activation, resumption, deactivation, or suspension of the cell group (e.g., SCG) or the cell (e.g., PSCell) is received, time information indicating when to complete the activation, resumption, deactivation, or suspension of the cell group or the cell may be configured in the n+$X^{th}$ cell. As another method, the time information (e.g., X) is not configured by the base station, but is appointed and defined in advance, and may be used a fixed value. When completing the activation, suspension, deactivation, or resumption of the cell group or the cell, the terminal may perform the proposed terminal operation according to the state of each cell or BWP (e.g., activated, dormant, or deactivated), proposed. In addition, when the activation or resumption of the cell group or the cell is completed, a terminal DRX operation may be started or restarted, or when the deactivation or suspension of the cell group or the cell is completed, the terminal DRX operation may be suspended or deactivated.

In addition, when the terminal activates a cell (e.g., PSCell or SCell) of a cell group (e.g., MCG or SCG) by an indication of MAC control information, the activation of the cell may be completed at a second time point. The second time point may be configured via an RRC message as proposed above. For example, the RRC message may include time information (e.g., information (e.g., X) indicating a timing, time unit, subframe, time slot, or symbol unit) indicating when to activate or deactivate CA technology, DC technology, a cell group (e.g., MCG or SCG), or a cell (MCS SCell or SCG SCell). For example, when receiving the MAC control information indicating activation or deactivation of the cell (e.g., SCell) in an $n^{th}$ time unit, time information indicating when to complete the activation or deactivation of the cell may be configured in the n+$X^{th}$ cell. As another method, the time information (e.g., X) is not configured by the base station, but is appointed and defined in advance, and may be used a fixed value. In another example, when random access is started (preamble is transmitted) or random access is successfully completed in an $n^{th}$ time unit after MAC control information indicating activation or deactivation of the cell (e.g., SCell or PSCell) is received, time information indicating when to complete the activation or deactivation of the cell may be configured in the n+$X^{th}$ cell. As another method, the time information (e.g., X) is not configured by the base station, but is appointed and defined in advance, and may be used a fixed value. When completing the activation, suspension, deactivation, or resumption of the cell group or the cell, the terminal may perform the proposed terminal operation according to the state of each cell or BWP (e.g., activated, dormant, or deactivated), proposed. In addition, when the activation or resumption of the cell group or the cell is completed, a terminal DRX operation may be started or restarted, or when the deactivation or suspension of the cell group or the cell is completed, the terminal DRX operation may be suspended or deactivated.

In addition, when the terminal activates a cell (e.g., PSCell or SCell) of a cell group (e.g., MCG or SCG) by an indication of an RRC message, the activation of the cell may be completed at a third time point. The third time point may be configured via an RRC message as proposed above. For example, the RRC message may include time information (e.g., information (e.g., X) indicating a timing, time unit, subframe, time slot, or symbol unit) indicating when to activate or deactivate CA technology, DC technology, a cell group (e.g., MCG or SCG), or a cell (MCS SCell, SCG SCell, or PSCell). For example, when receiving the RRC message indicating activation or deactivation of the cell (e.g., SCell) in an n'h time unit, time information indicating when to complete the activation or deactivation of the cell may be configured in the n+$X^{th}$ cell. As another method, the time information (e.g., X) is not configured by the base station, but is appointed and defined in advance, and may be used a fixed value. In another example, when random access is started (preamble is transmitted) or random access is successfully completed in an $n^{th}$ time unit after an RRC message indicating activation or deactivation of the cell (e.g., SCell or PSCell) is received, time information indicating when to complete the activation or deactivation of the cell may be configured in the n+$X^{th}$ cell. As another method, the time information (e.g., X) is not configured by the base station, but is appointed and defined in advance, and may be used a fixed value. In the above description, X may be configured or appointed with reference to a slot number, or may be configured or appointed with reference to the shortest slot length among the configured PCell, PSCell, or SCell. When completing the activation, suspension, deactivation, or resumption of the cell group or the cell, the terminal may perform the proposed terminal operation according to the state of each cell or BWP (e.g., activated, dormant, or deactivated), proposed. In addition, when the activation or resumption of the cell group or the cell is completed, a terminal DRX operation may be started or restarted, or when the deactivation or suspension of the cell group or the cell is completed, the terminal DRX operation may be suspended or deactivated.

The concept of the cell group disclosed above may be extended to a sub cell group. For example, to configure DC technology for the terminal, a first cell group and a second cell group are configured, an MCG and an SCG are applied so that DC technology is configured, whereby data transmission or reception with two base stations is enabled. However, if the concept of the cell group is extended to the sub cell group, with respect to the terminal connected to a single base station, multiple sub cell groups may be configured for the cell group, or a sub cell group ID may be configured for each sub cell group. In addition, the terminal performs data transmission or reception with the single base station, but the activation, suspension, resumption, or deactivation procedure by the PDCCH, MAC control information, or RRC message may be extended and applied to different frequencies or cells for each cell group. For example, when the terminal performs communication with the single base station and multiple frequencies or cells, the base station may configure, for the terminal, multiple sub cell groups for the multiple frequencies or cells of the base station, which correspond to the cell group (MCG), so that the terminal applies CA technology, and may define fields indicating the respective sub cell groups via the PDCCH, MAC control information, or RRC message, so that each of the fields indicates activation, deactivation, suspension, or resumption of each sub cell group of each sub cell group. In addition, the terminal may apply the activation, suspension, resumption, or deactivation procedure by the PDCCH, MAC control information, or RRC message to different frequencies or cells of each sub cell group. As another method, the sub cell group proposed in the description above may be also implemented through introduction of DL or UL logical channel restriction for each cell. For example, configuration information restricting logical channels belonging to one cell group so that data transmission or reception can be perform only for a specific frequency or cell may be configured for the terminal by including the same in an RRC message. As described above, the logical channels (e.g., logical channel IDs) are configured to be mapped to each cell or frequency, the logical channels are grouped and considered as the above-disclosed sub cell group, and fields indicating the respective cells are defined by the PDCCH, MAC control information, or RRC message, so that the respective fields indicate activation, deactivation, suspension, or resumption of each cell.

In addition, when the terminal for which DC technology is configured performs data transmission or reception with an MCG or an SCG, or the SCG is suspended or deactivated, if the MCG detects RLF, the terminal may report the RLF to the SCG or the MCG through the SCG. For example, the terminal may configure an RRC message for RLF reporting, and transmit and report the same through split SRB1 or SRB3. In the description above, when split SRB1 is configured, the terminal may always report the RLF through split SRB1. As another method, when the terminal for which DC technology is configured performs data transmission or reception with the MCG or the SCG, or the SCG is suspended or deactivated, if the MCG detects RLF, the terminal may declare RLF, and perform an RRC connection re-establishment procedure.

In addition, when the terminal for which DC technology is configured performs data transmission or reception with an MCG or an SCG, or the SCG is suspended or deactivated, if the MCG detects RLF, the terminal may report the RLF to the MCG or the SCG through the MCG. For example, the terminal may configure an RRC message for RLF reporting, and transmit and report the same through split SRB1 or SRB3. In the description above, when SRB1 or split SRB1 is configured, the terminal may always report the RLF through split SRB1.

Releasing an SCG when DC technology is configured for the terminal means releasing a connection (data transmission or reception) with the SCG, or discarding or releasing SCG configuration information (or bearer configuration information or protocol layer device configuration information (PHY, MAC, RLC, PDCP, or SDAP layer device)). On the other hand, suspending or deactivating the SCG means releasing or suspending a connection (data transmission or reception) with the SCG, but maintaining, suspending, or storing the SCG configuration information (or bearer configuration information or protocol layer device configuration information (PHY, MAC, RLC, PDCP, or SDAP layer device)), or promptly resuming or activating the connection with the SCG later, based on the configuration information stored in the SCG.

Hereinafter, the terminal reports a frequency measurement report through SRB3 by prioritizing SRB3, and reports the frequency measurement result through SRB1 (or SRB or MCG) if a frequency measurement procedure or a frequency measurement report procedure is configured for the terminal via the RRC message (e.g., RRCReconfiguration), if DC technology is configured for the terminal, or if the frequency measurement procedure or the frequency measurement report procedure is configured for the cell group (or SCG). However, the terminal does not perform measurement reporting through SRB3 when the cell group (SCG) is deactivated. For example, a procedure of performing the frequency measurement result reporting by the terminal through SRB3 if SRB3 is configured is proposed only when the cell group is not deactivated, or a procedure of reporting the frequency measurement result through SRB1 (or SRB of MCG) is proposed when the cell group is deactivated. This is because when the frequency measurement result is transmitted through SRB3 while the cell group (SCG) is deactivated, the cell group is to be unnecessarily activated. A detailed procedure of method performed by the terminal is as follows:

1> If a frequency measurement procedure or a frequency measurement report procedure is configured for the terminal, ■ 2> if the terminal is configured as (NG)EN-DC (or if the frequency measurement procedure or the frequency measurement report procedure is configured for a cell group (or SCG)), ♦ 3> if SRB3 is configured for the terminal and the state of the cell group (SCG) is not configured as a deactivated state, ● 4> the terminal transfers a frequency measurement result report message to a lower layer device to transmit the same through SRB3.

● 3> otherwise,

● 4> the terminal transfers the frequency measurement result report message to the lower layer device to transmit the same through SRB1 (or SRB of MCG (E-UTRA)).

■ 2> if the terminal is configured as NR-DC or if the frequency measurement procedure or the frequency measurement report procedure is configured for a cell group (or SCG), ♦ 3> if SRB3 is configured for the terminal and the state of the cell group (SCG) is not configured as a deactivated state, ● 4> the terminal transfers a frequency measurement result report message to a lower layer device to transmit the same through SRB3.

● 3> otherwise,

● 4> the terminal transfers the frequency measurement result report message to the lower layer device to transmit the same through SRB1 (or SRB of MCG (E-UTRA)).

Figure 14:
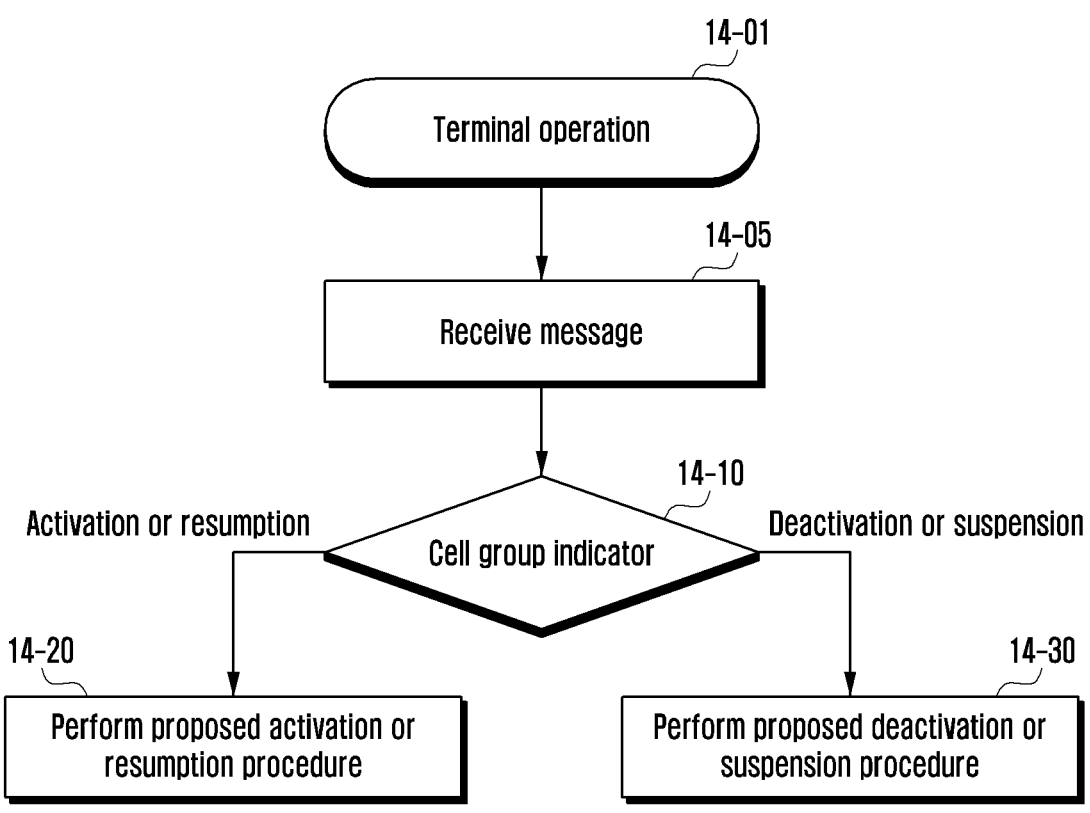
FIG. 14 is a flowchart illustrating operation of a terminal according to an embodiment.

FIG. 14 illustrates an operation of a terminal according to various embodiments.

In step 14-01 of FIG. 14, a terminal may operate and, in step 14-05, receive a message (e.g., DCI of a PDCCH, MAC control information, or an RRC message) from a base station. In step 14-10 a determination is made of whether the message includes cell group continuation information, a cell group state, or a cell group indicator, the terminal may identify whether cell group configuration, addition, activation, or resumption has been indicated or whether cell group releasing, deactivation, or suspension has been indicated. If the cell group configuration, addition, activation, or resumption has been determined in step 14-10 to have been indicated, the cell group configuration, addition, activation, or resumption process is performed in step 14-20. If the cell group releasing, deactivation, or suspension has been determined in step 14-10 to have been indicated, the cell group releasing, deactivation, or suspension process is performed in step 14-30.

Figure 15:
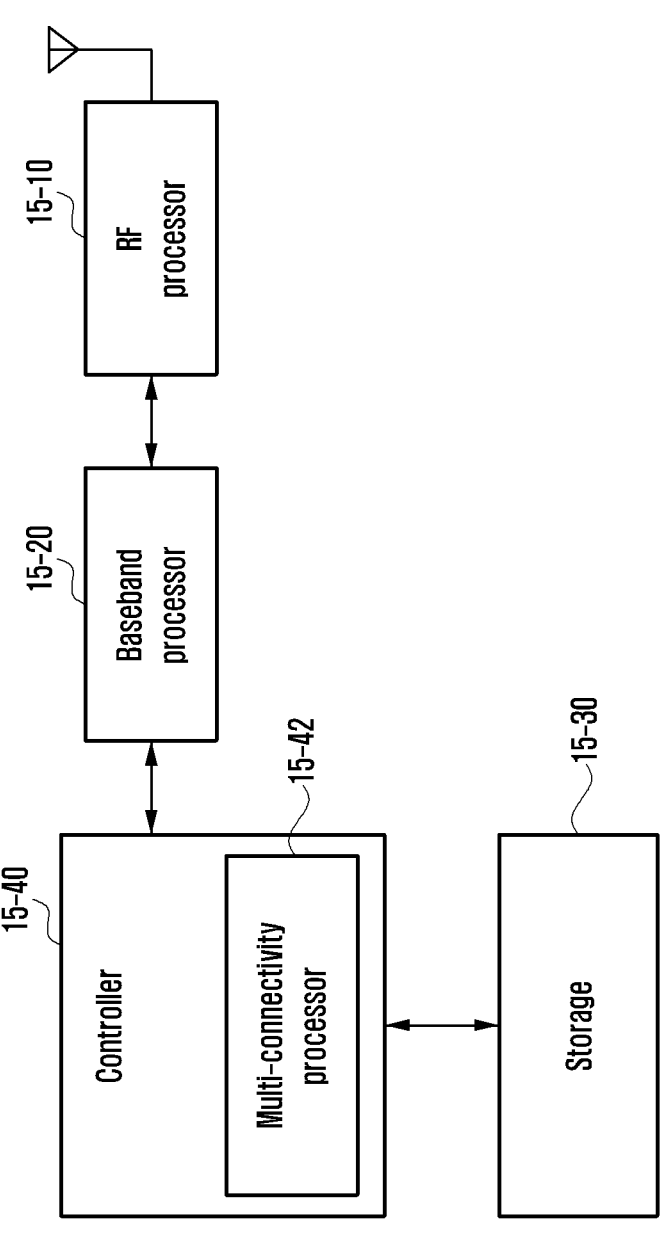
FIG. 15 illustrates a terminal according to an embodiment.

FIG. 15 illustrates a structure of a terminal to which various embodiments are applicable.

Referring to FIG. 15, the terminal may include a radio frequency (RF) processor 15-10, a baseband processor 15-20, a storage 15-30 (memory), and a controller 15-40. The controller 15-40 may further include a multi-connectivity processor 15-42.

The RF processor 15-10 performs a function for transmitting or receiving a signal through a radio channel, such as signal band conversion, amplification, and the like. That is, the RF processor 15-10 up-converts a baseband signal provided from the baseband processor 15-20 to an RF-band signal and then transmits the RF-band signal through an antenna, and down-converts an RF-band signal received through an antenna into a baseband signal. For example, the RF processor 15-10 may include a transmission filter, a reception filter, an amplifier, a mixer, an oscillator, a digital-to-analog converter (DAC), an analog-to-digital converter (ADC), and the like. Although only a single antenna is illustrated in FIG. 15, the terminal may include multiple antennas. In addition, the RF processor 15-10 may include multiple RF chains. Further, the RF processor 15-10 may perform beamforming. For beamforming, the RF processor 15-10 may adjust the phases and amplitudes of signals transmitted or received through multiple antennas or antenna elements. In addition, the RF processor may perform MIMO and may receive multiple layers during the MIMO operation. The RF processor 15-10 may perform reception beam sweeping by appropriately configuring multiple antennas or antenna elements under the control of the controller, or may adjust the orientation and width of a reception beam such that a reception beam is coordinated with a transmission beam.

The baseband processor 15-20 performs a function of conversion between a baseband signal and a bitstream according to the physical layer specifications of a system. For example, during data transmission, the baseband processor 15-20 generates complex symbols by encoding and modulating a transmission bitstream. In addition, during data reception, the baseband processor 15-20 reconstructs a received bitstream by demodulating and decoding a baseband signal provided from the RF processor 15-10. For example, according to an OFDM scheme, during data transmission, the baseband processor 15-20 generates complex symbols by encoding and modulating a transmission bitstream, maps the complex symbols to subcarriers, and then configures OFDM symbols by performing inverse fast Fourier transformation (IFFT) operation and cyclic prefix insertion. In addition, during data reception, the baseband processor 15-20 segments a baseband signal provided from the RF processor 15-10 into units of OFDM symbols, reconstructs signals mapped to subcarriers through fast Fourier transformation (FFT), and then reconstructs a received bitstream through demodulation and decoding.

The baseband processor 15-20 and the RF processor 15-10 transmit and receive signals as described above. Accordingly, each of the baseband processor 15-20 and the RF processor 15-10 may also be referred to as a transmitter, a receiver, a transceiver, or a communication unit. Further, at least one of the baseband processor 15-20 and the RF processor 15-10 may include multiple communication modules to support multiple different radio-access technologies. In addition, at least one of the baseband processor 15-20 and the RF processor 15-10 may include different communication modules to process signals of different frequency bands. For example, the different radio-access technologies may include an LTE network, an NR network, and the like. In addition, the different frequency bands may include a super-high frequency (SHF) (e.g., 22.5 GHz or 5 GHz) band and a millimeter-wave (mmWave) (e.g., 60 GHz) band.

The storage 15-30 stores data such as basic programs, applications, configuration information, or the like for the operation of the terminal. The storage 15-30 provides the stored data upon a request from the controller 15-40.

The controller 15-40 controls the overall operation of the terminal. For example, the controller 15-40 transmits or receives signals through the baseband processor 15-20 and the RF processor 15-10. In addition, the controller 15-40 records and reads data on or from the storage 15-30. To this end, the controller 15-40 may include at least one processor 15-42. For example, the controller 15-40 may include a communication processor (CP) for controlling communication and an application processor (AP) for controlling an upper layer such as an application. In addition, the controller 15-40 may control the operation of the terminal according to various embodiments.

FIG. 16 illustrates a structure of a base station in a wireless communication system to which various embodiments are applicable.

Referring to FIG. 16, the base station includes an RF processor 16-10, a baseband processor 16-20, a communication unit 16-30, a storage 16-40 (memory), and a controller 16-50. The controller 16-50 may further include a multi-connectivity processor 16-52.

The RF processor 16-10 performs a function of transmitting or receiving a signal through a radio channel, such as signal band conversion and amplification. That is, the RF processor 16-10 up-converts a baseband signal provided from the baseband processor 16-20 to an RF-band signal and then transmits the converted RF-band signal through an antenna, and down-converts an RF-band signal received through an antenna to a baseband signal. For example, the RF processor 16-10 may include a transmission filter, a reception filter, an amplifier, a mixer, an oscillator, a DAC, an ADC, and the like. Although only a single antenna is illustrated in FIG. 16, the first access node may include multiple antennas. In addition, the RF processor 16-10 may include multiple RF chains. Further, the RF processor 16-10 may perform beamforming. For beamforming, the RF processor 16-10 may adjust phases and amplitudes of signals transmitted or received through multiple antennas or antenna elements. The RF processor 16-10 may perform a DL MIMO operation by transmitting one or more layers.

The baseband processor 16-20 performs conversion between a baseband signal and a bitstream according to the physical layer specifications of a first radio-access technology. For example, during data transmission, the baseband processor 16-20 generates complex symbols by encoding and modulating a transmission bitstream. In addition, during data reception, the baseband processor 16-20 reconstructs a received bitstream by demodulating and decoding a baseband signal provided from the RF processor 16-10. For example, according to an OFDM scheme, during data transmission, the baseband processor 16-20 generates complex symbols by encoding and modulating a transmission bitstream, maps the complex symbols to subcarriers, and then configures OFDM symbols by performing IFFT operation and cyclic prefix insertion. In addition, during data reception, the baseband processor 16-20 segments a baseband signal provided from the RF processor 16-10 into units of OFDM symbols, reconstructs signals mapped to subcarriers by performing FFT operation, and then reconstructs a received bitstream through demodulation and decoding. The baseband processor 16-20 and the RF processor 16-10 transmit and receive signals as described above. Accordingly, each of the baseband processor 16-20 and the RF processor 16-10 may also be referred to as a transmitter, a receiver, a transceiver, a communication unit, or a wireless communication unit.

The communication unit 16-30 provides an interface for performing communication with other nodes in a network.

The storage 16-40 stores data such as basic programs, applications, configuration information, or the like for the operation of the primary base station. Specifically, the storage 16-40 may store information on a bearer allocated to a connected terminal, a measurement result reported from the connected terminal, and the like. In addition, the storage 16-40 may store information which serves as criteria for determining whether to provide or stop providing multi-connectivity to the terminal. In addition, the storage 16-40 provides the stored data upon a request from the controller 16-50.

The controller 16-50 controls the overall operation of the base station. For example, the controller 16-50 transmits or receives a signal through the baseband processor 16-20 and the RF processor 16-10 or through the communication unit 16-30. In addition, the controller 16-50 records and reads data on or from the storage 16-40. To this end, the controller 16-50 may include at least one processor 16-52. In addition, the controller 16-50 may control the operation of the base station according to various embodiments.

Accordingly, a control signal processing method is provided in a wireless communication system that includes receiving a first control signal transmitted from a base station; processing the received first control signal; and transmitting a second control signal generated based on the processing to the base station.

Accordingly, a method is provided for supporting cell group activation or deactivation in a wireless communication system, in which a new dormant or suspension mode or a deactivated mode is provided so that an RRC-connected terminal having a connection configured with a network in a next-generation mobile communication system can promptly activate or deactivate CA technology or DC technology. Also, a method is provided for managing a new hibernation (dormancy or suspension) mode at a BWP level or in units of cells or cell groups (e.g., for an SCG), thereby promptly activating CA technology or DC technology, and saving the battery of the terminal.

When the terminal indicates to activate a cell (PCell, PSCell, or SCell) to the terminal, the base station temporally configures, allocates, or transmits many transmission resources for allowing the terminal to perform channel measurement, whereby the terminal can promptly activate a cell or a cell group, based on the channel measurement, or by promptly reporting a result of the channel measurement to the base station.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a wireless communication system, the method comprising:

receiving a radio resource control (RRC) message including first information on a deactivation of a secondary cell group (SCG) and second information on a configuration of beam failure detection and radio link monitoring;

resetting a medium access control (MAC) of the SCG based on the RRC message, and stopping all timers, except a beam failure detection timer associated with a primary SCG cell (PSCell) and a timing alignment timer (TAT) based on the deactivation of the SCG and the configuration of beam failure detection and radio link monitoring.

2. The method of claim 1, wherein the beam failure detection timer associated with the PSCell continues to run regardless of reset of the MAC of the SCG.

3. The method of claim 2, wherein, in case that the configuration of beam failure detection and radio link monitoring is not configured for the SCG, the beam failure detection timer associated with the PSCell is stopped.

4. The method of claim 1, wherein the TAT associated with the SCG continues to run regardless of reset of the MAC of the SCG.

5. The method of claim 4, wherein, in case that the configuration of beam failure detection and radio link monitoring is configured for the SCG, the beam failure indication counter associated with the PSCell is not reset.

6. The method of claim 1, wherein, in case that the configuration of beam failure detection and radio link monitoring is not configured for the SCG, a beam failure indication counter associated with the PSCell is reset.

7. A terminal in a wireless communication system, the terminal comprising:

a transceiver; and at least one processor coupled to the transceiver and configured to:

receive a radio resource control (RRC) message including first information on a deactivation of a secondary cell group (SCG) and second information on a configuration of beam failure detection and radio link monitoring, reset a medium access control (MAC) of the SCG based on the RRC message, and stop all timers, except a beam failure detection timer associated with a primary SCG cell (PSCell) and a timing alignment timer (TAT) based on the deactivation of the SCG and the configuration of beam failure detection and radio link monitoring.

8. The terminal of claim 7,
wherein the beam failure detection timer associated with the PSCell continues to run regardless of reset of the MAC of the SCG.

9. The terminal of claim 8,
wherein, in case that the configuration of a beam failure detection and radio link monitoring is not configured for the SCG, the beam failure detection timer associated with the PSCell is stopped.

10. The terminal of claim 7,
wherein the TAT associated with the SCG continues to run regardless of reset of the MAC of the SCG.

11. The terminal of claim 10,
wherein, in case that the configuration of beam failure detection and radio link monitoring is configured for the SCG, the beam failure indication counter associated with the PSCell is not reset.

12. The terminal of claim 7,
wherein, in case that the configuration of beam failure detection and radio link monitoring is not configured for the SCG, a beam failure indication counter associated with the PSCell is reset.

\* \* \* \* \*